US011782997B2

(12) United States Patent
Marsh et al.

(10) Patent No.: US 11,782,997 B2
(45) Date of Patent: Oct. 10, 2023

(54) INFORMATION PLATFORM SYSTEMS AND METHODS

(71) Applicant: Verity Platforms Inc., Acton, MA (US)

(72) Inventors: Jeffrey Carroll Marsh, Acton, MA (US); Eugene Emelyanov, Acton, MA (US); Salar Satti, Lawrence, MA (US); Mark Stephan, Hopkinton, MA (US)

(73) Assignee: Verity Platforms Inc., Acton, MA (US)

( * ) Notice: Subject to any disclaimer, the term of this patent is extended or adjusted under 35 U.S.C. 154(b) by 0 days.

(21) Appl. No.: 17/174,835

(22) Filed: Feb. 12, 2021

(65) Prior Publication Data

US 2021/0256084 A1    Aug. 19, 2021

Related U.S. Application Data

(60) Provisional application No. 63/068,469, filed on Aug. 21, 2020, provisional application No. 62/976,225, filed on Feb. 13, 2020.

(51) Int. Cl.
*G06F 16/9538* (2019.01)
*G06F 16/9537* (2019.01)
(Continued)

(52) U.S. Cl.
CPC ........ *G06F 16/9538* (2019.01); *G06F 16/951* (2019.01); *G06F 16/9535* (2019.01);
(Continued)

(58) Field of Classification Search
CPC ............... G06F 16/9538; G06F 16/951; G06F 16/9535; G06F 16/9537; G06N 5/022
See application file for complete search history.

(56) References Cited

U.S. PATENT DOCUMENTS 9,047,345 B1 *  6/2015  Liu ................... G06F 16/9535
9,501,585 B1 * 11/2016  Gautam ........... G06F 16/24522
(Continued)

OTHER PUBLICATIONS

International Search Report and Written Opinion dated May 3, 2021 in connection with International Application No. PCT/US2021/017899.

*Primary Examiner* — Dangelino N Gortayo
(74) *Attorney, Agent, or Firm* — Wolf, Greenfield & Sacks, P.C.

(57) ABSTRACT

Various aspects describe an information platform for consistently integrating and/or quantifying the underlying principles of ESG into financial analyses, analytical tools, metrics, and/or available information on reviewed companies, business entities, etc. . . . , and further provide integration of analysis with community-based insight, contextual information and tools for readily understanding both. Various embodiments implement machine learning tools for curating data sources and incorporating the data sources into the knowledge platform. The incorporation of AI moderated information sources enables succinct views of often massive information pools, and further provides for transitions between types of information (e.g., qualitative, quantitative, and interactive data source (e.g., engagements, collaborative information, etc.)). The platform facilitates user understanding and can eliminate the need to design and execute complicate queries by allowing users to transition between data types and view to develop better understanding and context of various information sources.

26 Claims, 44 Drawing Sheets

(51) Int. Cl.
  *G06F 16/951* (2019.01)
  *G06F 16/9535* (2019.01)
  *G06N 5/022* (2023.01)
  *G06Q 40/06* (2012.01)

(52) U.S. Cl.
  CPC ......... *G06F 16/9537* (2019.01); *G06N 5/022* (2013.01); *G06Q 40/06* (2013.01)

(56) References Cited

U.S. PATENT DOCUMENTS

| | | |
|---|---|---|
| 2003/0220912 A1 | 11/2003 | Fain et al. |
| 2009/0089264 A1 | 4/2009 | Lavine |
| 2011/0191316 A1* | 8/2011 | Lai .......................... G06F 7/10 707/706 |
| 2011/0191318 A1 | 8/2011 | Gilbey et al. |
| 2012/0233161 A1 | 9/2012 | Xu et al. |
| 2013/0041717 A1 | 2/2013 | Ratterman et al. |
| 2017/0220652 A1* | 8/2017 | Kazi ................. G06F 16/24578 |
| 2019/0018849 A1* | 1/2019 | Dong ................. G06F 16/24578 |
| 2019/0121811 A1* | 4/2019 | Cherukuri ............. H04L 67/535 |
| 2020/0050623 A1* | 2/2020 | Hartlaub ................ G06N 20/00 |

* cited by examiner

✈ VERITY (Apple Inc.)

☐ All  ▢ Data  ▢ Documents  ▢ Entities
       202    204   206

▢ Data

208 — ⊙ Market Capitalization
      Apple Inc.
      USD: 1,105,306,601,400
      Source Quandl    Updated ⊙ 2019-10-31

210 — ⊙ Earnings per Basic Share (USD)
      Apple Inc.
      USD/Share: 3.05    Updated ⊙ 2019-10-31
      Source Quandl 212 — ⊙ Net Cash Flow from Investing
      Apple Inc.
      currency: -798,000,000    Updated ⊙ 2019-10-31
      Source Quandl 214 — ⊙ Issuance (Repayment of Debt)
      Securities
      Apple Inc.
      currency: -293,000,000    Updated ⊙ 2019-10-31
      Source Quandl ▢ Documents ⊙ Form 8-K — 216
Apple Inc.
Source SEC    Updated ⊙ 2019-09-13

⊙ Form 8-K — 218
Apple Inc.
Source SEC    Updated ⊙ 2019-09-11

⊙ Form FWP — 220
Apple Inc.
Source SEC    Updated ⊙ 2019-09-05

⊙ Form 424B2 — 222
Apple Inc.
Source SEC    Updated ⊙ 2019-09-05

⊙ Form 424B2 — 224
Apple Inc.
Source SEC    Updated ⊙ 2019-09-04

▢ Entities
Apple Inc.

Contextual Overlay    📈 Quantitative    ⊕ Subscribe    Communications ⊗

Earnings per Basic Share(ISD)

Description — 402
Originator statement

Curabitur dignissim facillsis ortio facilisis. Curabitur facilisis euismod dui eu dignissim. Duis quis torotor magna. Morbi nec porta felis. Nulla gravida, libero vel congue tristique, velit leo mattis diam, condimentum ultricies dolor est et libero. Nunc tincidunt tortor et nulla sodales, in imperdiet felis gravida. Maecenas ullamcorpor finibus dapibus. Nam ut ipsum efficitur ultrices. Mauris congue dui ipsum, vitae scelerisque

Date Type: — 404
Unit: USD/share
Value: 3.05
Year: 2019
Source: Quandl

Measures on: 2018/10/31
Reported on: 2018/10/31
External Audit: yes
Value Amended: no
Custom 1:...
Custom 1:...

Background — 406

Curabitur rutrum elementum ex nec tristque. Fusce in augue pulvar, aliquet sapien sit ametm dictum enim...Proin placerat, enim vitae
> In hac habitasse platea dictumst. Supendisse sodales, nulla nec portitor concallis, nunc arcu pretium lectus, ac marttis ex felis et lorem. In hac
> Curabitur rutrum elementum ex nec tristque. Fusce in augue pulvar, aliquet sapien sit amet, dictum enim. Curabitur rutrum elementum ex
> Proin veistibulum nisi eget nibh songue pretium..Nam fringilla lectus ut eros pharetra condimentum. Proin placerat, enim vitae tempor lacreet
> Vestibulum pretium leo ac egestas sollicitudin.. In hac habitasse platea odio ultricies at.

Contact Info

Nancy Paxton
Investor Relations
✉ paxton1@apple.com   (Contact)
📞 4089745420

Tejas Gala
Investor Relations
✉ tgala@apple.com   (Contact)
📞 6692272402

Top 3 Comments
No comments found

*Relevant Engagements* — 408
Apple Carbon Iniatives

FIG. 4

US GPE unveils world's most powerful supercomputer, beats China GPE . The US GPE has unveiled the world's most powerful supercomputer called 'Summit', beating the previous record-holder China GPE 's Sunway TaihuLight ORG . With a peak performance of 200,000 CARDINAL trillion calculation per second ORDINAL , it is over twice as fast as Sunway TaihuLight ORG , which is capable of 93,000 CARDINAL trillion calculations per second. Summit has 4,608 CARDINAL servers, which reportedly take up the size of two CARDINAL tennis courts

Contextual Overlay ☑ Time Series Analysis ⊕ Susbcribe

Description
Inc., Q3 2020 Earnings Call, Oct 21, 2020
Transcript

Document Details:
Company: I | 7 Inc.
Source: S&P
Website:
Themes Covered:  ← *1402*

Measured On: 2020-10-21 12:00:00
Reported On:
External Audit: N/A
Value Amended: N/A

Communications

Contact Info
Company
Ed  Di
Investor Relations
✉ edu  e@1  l.com
☎ (212)401-

Vine
Investor Relations

Research Source
Doi
Investor Relations
☎ (212)
Ro
Investor Relations
☐ Chip
☎ (212)

aal.com (Add Comment)

Top 3 Comments
No comments found

Background
No additional information at this time

Audit Trail
| Date | Action | Value | Price Value | Author | Explanation |
|---|---|---|---|---|---|
| 2020-10-21 12:00:00 | ☐ Create | | | | Record Creation |

Supplemental

*FIG. 14*

New Features and Research Added Weekly
Check out our development calendar for more details
FIG. 17

★ VERITY   (Apple Inc)   ⌕   ◇ ⚭ ⓙ

☑ All  ☑ Data  ☑ Documents  ☑ Entities

⊙ Data — 1804

◯ Revenue (USD)
Apple Inc
USD: 58,313,000,000    Updated ⓠ 2020-03-31
Source Quandl ◯ Share Price (Adjusted Close)
Apple Inc
USD/share: 289.07    Updated ⓠ 2020-03-31
Source Quandl ◯ Research and Development Expense
Apple Inc
USD: 4,565,000,000    Updated ⓠ 2020-03-31
Source Quandl ◯ Shares (Basic)
Apple Inc
units: 4,334,335,000    Updated ⓠ 2020-03-31
Source Quandl ◯ Tangible Asset Book Value per

⊡ Documents — 1806

◯ Form 4
Apple Inc
Statement of changes in beneficial
ownership of securities - general
instructions
Source SEC    Updated ⓠ 2020-05-12

◯ Form 8-K
Apple Inc
Current Report Pursuant to Section
13 or 15(d)
Source SEC    Updated ⓠ 2020-05-11

◯ Form 424B2
Apple Inc
Prospectus for Primary Offering of
Securities (Delayed Basis)
Source SEC    Updated ⓠ 2020-05-05

◯ Form FWP
Apple Inc
Free Writing Prospectus
Source SEC    Updated ⓠ 2020-05-05

⊡ Entities — 1808

Apple Inc
AAPL (NasdaqGS)
Close: 379.24
Source Quandl    Updated ⓠ 2020-07-27

Contextual Overlay

Gross Global Scope 2 emissions, location based

☑ Time Series Analysis   ⊕ Subscribe

Communications

Contact Info
Peter Dannenbaum
✉ (908) 740-1-37

Terri Loxam
✉ (212) 821-0110

Top e Comment
No comments found ( Add Comment )

Description

Scope 2 Emissions: Indirect Emissions - Emissions from the generation of purchased or acquired electricity, steam, heating, or cooling consumed by the reporting company.

Data Point Details:

Unit : metric tons CO2e
Value: 424,600
Source: CDP
Themes Covered:
    GHG Emissions
Link: https://www.cdp.net Measured On: 2018-12-31
Reported On: 2019-07-31
External Audit: N/A
Value Amended: N/A

Background

› Board Oversight (Climate-Related)
› Management Responsibility (Climate-Related)
› Employee Incentives (Climate Related)

*FIG. 23*

Background

∨ Board Oversight(Climate-Related)
  Yes

∨ Board Position with Oversight
  Other C-Suite Officer

Explanation
  The Executive Vice President and General Counsel is directly responsible for climate-related goals. This position is a direct report to the Chairman of the Board and Chief Executive Officer and is one of the eleven (11) Executive Committee members.

∨ Governance Mechanisms into which Climate-Related Issues are Integrated
  Monitoring and overseeing progress against goals and targets for addressing climate-related issues

Explanation
  Our Vice President, Safety and Environment updates the board at least annually on our environmental, health and safety performance, including progress vs. our climate-related goals.

∨ Management Responsibility (Climate-Related)
  The Environmental Health and Safety (EHS) Council, composed of senior-level executives representing all business units, is responsible for overall EHS governance, as well as leading and driving enterprise-wide excellence in EHS management and performance. The Council's responsibilities include: Establishing EHS strategy, policy and standards. Providing company-wide oversight of environmental and employee safety issues, risk mitigation and control strategies. Monitoring performance, establishing continuous-improvement targets, and recognizing and promoting EHS excellence. Allocating resources and/or sponsoring projects to address specific EHS concerns. This EHS Council approved the current Environmental Sustainability goals and strategy and oversees that these policies are being followed within their business units.

Highest Level Management Position with Climate-Related Oversight
  Safety, Health, Environmental and Quality committee ∧ Employee Incentives (Climate-Related)

∧ Scope 1 and Scope 2 Emissions (Reason for Change)

VERITY  Search

← Back
○ Bank of America Corporation (BAC) (NYSE)  $24.14

1D -0.9% | 5D -0.7% | 1Y -27.5% | 3Y 0.1%  Open: $24.22 | Volume: 54,690,453  Close: 2020-07-27
1M -4.1% | YTD 45.9% | 5Y 26.8% | 10Y 41.2%  High: $24.27 | Low 23.87

☐ About ☐ Feed ☐ Governance ☐ Cohort Analysis ☐ Data ☑ Engagements ☐ Filings ☐ Publications ☐ Standards ☐ Contacts

| Fossil Fuel Financing at Bank of A... Collective engagement | Fossil Fuel Financing at Bank of America<br><br>Overview: Bank of America has been identified as one of the top four financial institutions responsible for financing $1.9 trillion of fossil fuel projects between 2016 abd 2018. Change Finance urges Bank of America to elevate its risk analysis of loans extended to the natural gas industry in the interest of protecting shareholders and stakeholders from economic, environmental, and social losses..<br><br>Purpose: The investment team at Change Finance is contacting Bank of America management to express our concerns regarding the organization's lending of $20.21 billion for natural gas production, and transportation (2016-2018). We believe that lending practices related to natural gas exploration, production, and infrastructure expose investors and stakeholders to undue risk as those loans may be subject of premature write-downs for the following reasons: Major fossil fuel companies have cut their commodity price forecasts resulting in the revaluation of shale assets. In may cases, the revised values will be insufficient to repay debts in the event of bankruptcy. Credit to shale drilling projects is expected to tighten by 10% which may force many operators into insolvency. Clean energy portfolios consisting of wind, solar, battery storage, and demand response are...<br><br>Participant Profile: Advisors, asset managers, and all in BAC investors<br>Relevant organizations:<br>Bank of America Corporation<br>Status: Open, days     33:33.26 |

*FIG. 27*

| VERITY | Search | | | | | |
|---|---|---|---|---|---|---|
| ☐ About ☐ Feed ☐ Governance ☐ Cohort Analysis ☐ Data ☐ Engagements ☐ Filings ☐ Publications ☐ Standards ☐ Contacts | | | | | | |

| | Brian Moynihan<br>Chief Executive Officer | Brian Moynihan<br>President | Paul Donofrio<br>Chief Financial Officer | Thomas Montag<br>Co-Chief Operating Officer |
|---|---|---|---|---|
| 2019 2020 | | | | |
| Name: | | | | |
| Position: | | | | |
| ∨ Ratios | | | | |
| % of Total Compensation - Cash | 7 % | 7 % | 46.5 % | 46 % |
| % of Total Compensation - Non-Cash | 93 % | 93 % | 53.5 % | 54 % |
| CEO to Employee (Median) Pay Ratio | 276.1 | 276.1 | | |
| Total Compensation | $23,039,213 | $23,039,213 | $12,595,312 | $19,494,788 |
| Base Salary | $1,500,000 | $1,500,000 | $1,000,000 | $1,250,000 |
| Bonus | | | $4,800,000 | $7,700,000 |
| ∨ Short-Term Non-Equity Incentive | | | | |
| Threshold     as a % of Base Salary | | | | |
| Target        as a % of Base Salary | | | | |
| Maximum       as a % of Base Salary | | | | |
| > Long-Term Equity Performance Incentive | $11,787,539 | $11,787,539 | $3,280,475 | $5,262,394 |
| > Long-Term Equity Retention Incentive | $11,787,566 | $11,787,566 | $3,380,475 | $5,262,394 |
| > Awarded Options Value | | | | |
| > Change in Pension Plan/Non-Qualified Deferred Comp Earnings | $632,250 | $632,250 | $182,239 | |
| All Other Compensation | $331,858 | $331,858 | $52,124 | $20,000 |
| > Charge-In-Control/Termination Arrangements | | | | |
| > Cumulative Equity Awards Summary | | | | |

*FIG. 28*

![VERITY interface mockup]

VERITY | Search

← Back (JM) Jeffrey Marsh

📄 Subscription Feed   📄 Data Management   📄 Notebooks   📄 Notifications

Search [   ]

Companies
- Apple Inc.
- Alphabet

Stakeholders
Ranking Digital Rights

Themes
GHG Emissions

Other

Notes are automatically classified and organized for the user as Companies, Investors, Stakeholders, Coalitions, Themes and Other. The SASB framework can be added for grouping purposes should Note could grow and more organization is needed. Users can also Search for a note.

Only Notes contained with the selected Notebook will appear in this column.

2018-11-01   2019-09-29

Note appears in the following Notebooks

Apple's GHG Mitigation Plan/Transition ot Solar (JM)

Jeffrey Marsh   Note's Author

Verity Platforms Inc.   Author's Company

The Note defaults to a formal Research Note format, however it can be collapsed to a single screen if it's not intended for external use.

Summary...
Summary of the Note

A Verity label, should the author PDF and distribute the note elsewhere

✦ Written on Verity

About Us   How to Use Verity   Contact Us

★ VERITY  Search  ⌕ ⌖ (JM) ⌄

← Back
○ Bank of America Corporation (BAC) (NYSE)                    $24.14

1D -0.9% | 5D -0.7%  1Y -27.5% | 3Y 0.1%    Open $24.22 | Volume: 54,690,453    Close: 2020-07-27
1M 4.1% | YTD -45.9%  5Y 26.8% | 10Y 41.2%  High: $24.27 | Low 23.87

☐About  ☐Feed  ☐Governance  ☐Cohort Analysis  ☐Data  ☐Engagements  ☐Filings  ☐Publications  ☐Standards  ☐Contacts

Profile

SICS Sector     Financials
SICS Industry   Commercial Banks
Founded         1784
Location        Charlotte NC
Website         www.bankofamerica.com

Description

Bank of America is one of the world's leading financial institutions, serving individual consumers, small and middle-market businesses and large corporations with a full range of banking, investing, asset management and other financial and risk management products and services. The company provides unmatched convenience in the United States, serving approximately 66 million consumer and small business clients with approximately 4,300 retail finance centers, including approximately 2,200 lending centers, 2,400 financial centers with a Consumer investment Financial Solutions Advisor and 1,700 business centers; approximately 16,000 ATMs, and award-winning digital banking with more then 37 million active users, including approximately 28 million mobile users. Bank of America is a global leader in wealth management, corporate and investment banking and trading across a broad range of asset classes, serving corporations, governments, institutions and individuals around the world. Bank of America offers industry leading support to

*FIG. 33A*

| Financial | Value | 1Y | Extra-Financial | Value | 1Y | Board | | |
|---|---|---|---|---|---|---|---|---|
| Price/Earnings (TTM) | 9.34 | 22.22% | Gross Global Scope 1 emissions | 82,298.00 | 0.00% | Chairman of the Board | Brian Moynihan | |
| Price/Book (TTM) | 0.736 | — | Gross Global Scope 2 emissions, location-based | 791,166.00 | 0.00% | Board-level Oversight of Climate Issues: | N/A | |
| Price/Sales (TTM) | 2.23 | -50% | Gross Global Scope 2 emissions, market-based | 108,614.00 | 0.00% | Board-level Oversight of Water Issues: | N/A | |
| EV/EBITDA (TTM) | 3.05 | -133.33% | Gross Global Scope 3 emissions | 5,248,277.00 | 0.00% | Board-level Oversight of Forest Issues: | N/A | |
| Data/Equity Ratio: | 8.89 | 12.50% | Gross Global Combined Scope 1 and 2 Emissions Intensity | 2.10 | 0.00% | Management | | |
| EBITDA Margins: | 21.80 | -85.71% | Total Volume of Water Withdrawals | 8,139.00 | 0.00% | Chief Executive Officer | Brian Moynihan | |
| Gross Margin: | 100.00 | — | Total Volume of Water Discharges | 6,375.00 | 0.00% | Chief Financial Officer | Paul Donofrio | |
| Net Profit Margin: | 15.60 | -93.33% | Total Volume of Water Consumption | 1,764.00 | 0.00% | | | |
| Cash Flow Margin: | 0.84 | — | Percentage of Withdrawals from Water Stressed Areas | 51.00 | 0.00% | | | |
| Unlevered Free Cash Flow Margin: | — | — | Proportion of Total Water Use Recycled/Reused | Less than 1% | — | CEO-to-Employee Median) Pay Ratio | 276:1 | |
| Div Yield: | 3.00 | 66.67% | | | | Mgmt Pos with Oversight of Climate Issues: | N/A | |
| Payout Ratio: | 45.00 | 53.33% | | | | | | |
| Return on Average Assets: | — | — | | | | | | |

*FIG. 33B*

Data

Financial

- Price to Book Value
  Apple Inc.
  ratio: 34.75
  Source Quandl  ⊙ 2020-12-31

- Earning Before Interest & Taxes (USD)
  Apple Inc.
  USD: 33,579,000,000
  Source Quandl  ⊙ 2020-12-31

- Enterprise Value over EBITDA
  Apple Inc.
  ratio: 27.95
  Source Quandl  ⊙ 2020-12-31

- Foreign Currency to USD Exchange Rate

Extra-financial

- Penalties from Financial-Offenses
  Apple Inc.
  USD: 466,912
  Source Good jobs first  ⊙ 2019-12-31

- Penalty Violation Total
  Apple Inc.
  USD: 466,912
  Source Good jobs first  ⊙ 2019-12-31

- Financial Cost of Managing Climate Change Risks
  Apple Inc.
  USD: 2,503,090,000
  Source CDP  ⊙ 2019-07-19

Discussion, Policy & Process — 3402

- Estimated Financial Impact of Climate Risks
  Apple Inc.
  Material, Company Identified Climate Risks
  Source CDP  ⊙ 2019-07-19

INFORMATION PLATFORM SYSTEMS AND METHODS

RELATED APPLICATIONS

This patent application claims priority to and the benefit of U.S. Provisional Patent Application Ser. No. 62/976,225, filed Feb. 13, 2020 and entitled "INFORMATION PLATFORM SYSTEMS AND METHODS," which is hereby incorporated herein by reference in its entirety. This patent application also claims priority to and the benefit of U.S. Provisional Patent Application Ser. No. 63/068,469, filed Aug. 21, 2020 and entitled "INFORMATION PLATFORM SYSTEMS AND METHODS," which is hereby incorporated herein by reference in its entirety.

BACKGROUND

Current trends in investing and researching entities have started to focus on the impact a particular company has on the global environment. Such approaches may focus on a company's environmental impact, social issues, corporate governance and the materiality of those factors as it pertains to the company's finances or a stakeholder's well-being. Responsible investing goals and approaches have been dubbed "ESG," and typically balance and integrate at least three factors into more traditional financial analyses when considering an investment opportunity, ultimately targeting investments that foster environmental improvements and/or social agendas.

In this context, E represents an environmental component that includes evaluation of a company's impact on the Earth, in both positive and negative ways. S represents a social component that includes evaluation of people-related concerns, and may include company culture, issues that impact employees, customers, consumers, and suppliers—both within the company and in broader society. G represents a corporate governance component that relates to company management, and may include, for example, a board of directors, other company oversight, as well as analysis of whether the company is shareholder-friendly versus management-centric. In some examples, the governance component provides analysis of whether the corporate incentives align with the business's success and/or other components (e.g., environmental and/or social).

SUMMARY

The inventors have realized that although current investment trends are beginning to consider environmental targets, social targets, and corporate governance targets, there are no conventional approaches or analytical tools that enable investors and/or researchers to consistently integrate and/or quantify the underlying principles of ESG into more traditional financial analyses, and leverage them into actionable and/or auditable metrics. Stated broadly, various aspects provide an information platform for consistently integrating and/or quantifying the underlying principles of ESG into financial analyses, analytical tools, metrics, and/or available information on reviewed companies, business entities, etc. . . . , and for integrating such analysis with community-based insight, contextual information and tools for readily understanding both. Various embodiments implement machine learning tools for curating data sources and incorporating the data sources into the knowledge platform. The incorporation of AI moderated information sources enables succinct views of often massive information pools, and can include standardized initial views, coupled with community-based information to ensure proper context is displayed to any user.

According to one embodiment, the information platform is configured to provide a search interface and linked search workspace that allows a user to access various information analysis tools. The search interface is specially configured to present large volumes of information in contextual displays and that are optimized for various data types (e.g., quantitative information, qualitative information, interactive and/or collaborative information, etc.) and respective displays of information analysis tools. Various implementation enables the platform to track, integrate, and automatically associate relevant contextual information for respective users. In various examples, the platform is able to reduce the number of queries and/or searches the platform must execute to provide a user with relevant and understandable information when compared to many conventional search systems.

Moreover, the platform produces contextual based collections of information integrated into search workspaces that are unavailable in many conventional systems. For example, in conventional search spaces users must build their own queries to access an information target then construct further queries to bridge in the various information sources. Various embodiments are configured to identify such related information automatically and include such information as part of search outputs, which can be organized on respective data types. In further embodiments, the information platform enables user to access and review information of a respective data type, and then transition to information of other data types while preserving a current context. Many conventional search systems have no implementation that permits user to transition between data type information spaces (e.g., qualitative, quantitative, and interactive, etc.), thus the information platform allows user to focus their search, improve access, and facilitate understanding of large volumes of information. Some embodiments provide an information platform that streamlines access and usability of financial and sustainability information to link actionable research into effective collaboration tools that further decision making for interested parties, even novices. Additionally, embodiments of the information platform enable cooperative communication between stakeholders, investors, and the companies via novel engagement tools. According to various embodiments, the information platform enables the synergy between quantitative analysis, qualitative analysis, and community curation of both, so that even novice users can readily understand and benefit from contextual analysis of the information being reviewed on the platform. The platform also enables and fosters a level interaction between interested users and the companies they wish to invest in, which are unavailable in many conventional approaches.

According to various embodiments, the information platform incorporates improvements over conventional search approaches by capturing and filtering information into material relevant to respective users and their goals for investment, including, for example, sustainability investing. For example, the information platform is configured to simplify search operation, and target both search inputs and outputs towards the information needed to develop investment strategy, and additionally to provide context so as to enable the user to understand the information being presented in a more meaningful way. Underlying these broad functions, various embodiments provide novel views of company analysis data that focuses and educates the user on sustainability investing and/or ESG analysis. Further, the platform provides quantitative tools for reviewing such information with integrated contextual assistance. Thus, embodiments of the information platform provide easily searchable financial and sustainability information in conjunction with social analytical tools that deliver both a historical and forward-looking lens for improved understanding. In some embodiments, data on companies can be organized into quantitative, time series tools integrated with comment/contextual overlay features and/or community engagement that individual users can use to drill down into individual data points (e.g., accessing contextual overlay or user comments for improved understanding).

Many conventional search systems simply provide quantitative information in response to company-specific requests. The inventors have realized that in such settings, the requestor is simply unable to understand the importance, or unimportance, of information being returned on a company. The volumes of data provided by conventional approaches make finding relevant quantitative information a needle in a haystack task, and generally provide no ability to consider or integrate information more qualitative in nature. In various embodiments, the information platform resolves many issues associated with conventional approaches based on how query results are organized and displayed, additionally or alternatively, by introducing contextual overlays into the displayed results, additionally or alternatively, by introducing community-based information into the displayed results, and/or additionally or alternatively, based on the functional organization of the search interface. In some embodiments, the information platform is configured to manage transitions between qualitative, quantitative, and interactive data source (e.g., engagements, collaborative information, user comments, system comments, etc.) to facilitate user understand and, in other examples, to eliminate the need to design and execute complicate queries by users to obtain the information provided in the respective transitions.

In further embodiments, the information platform can also include tools to manage direct engagement with a particular entity. For example, the platform can also include an engagement component to manage interactions between stakeholders, investors, and companies. Conventional approaches fail to provide tools or vehicles for managing engagement between interested parties and given entities, and further fail to provide quantitative approaches for auditing such exchanges. Various embodiments provide functionality to define and execute engagement opportunities between companies and any interested parties with little more than a single click of a mouse. Conventional attempts to provide engagements between interested parties and companies often take months to set up and even more time to conduct. In further embodiments, the discourse that occurs during an engagement is maintained as an auditable dialog, and various ESG related messages can be captured and maintained as part of a company's profile (for the benefit of stakeholders, investors and the company, alike). In some example, text from the dialog can be analyzed, tagged, and surfaced as part of search results, comments on existing information objects, or linked for access in different information views available on the platform.

According to some aspects, the information platform can include a reputation component configured to manage information contributions by a user population. The user population can include stakeholders, investors, and companies, among other examples. Each user and/or user segment can have scoring algorithms for determining a reputation associated with a respective user or user segment. The reputation information can be displayed as part of any comment, contextual overlay associated with the user, and/or any information made available through the information platform. According to some embodiments, users can provide endorsements to information presented on the system. Such endorsements are based on having a system assigned value in a user repository. In one example, the system can manage reputation by debiting some stored value. According to various embodiments, the system ensures that users do not improperly gain reputation scores or overly endorse users to the detriment of the value of the socially endorsed information.

In further embodiments, the system is also configured to analyze a given user's activity and derive information recommendations. In some embodiments, the system is configured to model user behavior with artificial intelligence, and system recommendations (e.g., for information sources, companies to review, engagements to subscribe to, etc.) can be output by intelligent models. In further embodiments, the system can track information accessed and/or saved in a research workspace. The system can develop models for user behavior that reflect information connections, and automatically generate queries or information retrieval to capture new data based on the user models for subsequent searches or addition to the research workspace. In some examples, the system can predict user desired information base on the respective model, retrieve the information automatically, and surface that information in contextual displays or additional data structures (e.g., documents, notebooks, and/or punchcards, among other options).

According to one aspect, an information platform is provided. The system comprises at least one processor operatively connected to a memory, the at least one processor configured to generate a search display for accessing information associated with a plurality of companies, accept user input and search an information knowledge base responsive to the user input, accept user input to curate any data element shown as a result of the search of the information knowledge base, and integrate display of curated information into returned results or within the elements of the returned results.

According to one embodiment, the at least one processor is configured to generate a side bar display for integrating community moderated information (e.g., social information available on the platform, etc.) into search result displays. According to one embodiment, the at least one processor is configured to accept user input identifying an information item in the user interface display, accept user submitted content to associate with the information item, and create a contextual overlay for any subsequent view of the information item associated with the user content. According to one embodiment, the information item includes a data point in a time series display, and the user content includes an explanation for the context of the data point. According to one embodiment, the at least one processor is configured to manage an engagement between a user and a respective stakeholder entity and/or representative users of the respective stakeholder entity.

According to one embodiment, the information platform further comprises a plurality of information views for accessing information returned as search results based on a type of information returned. According to one embodiment, the at least one processor is configured to adjust a user reputation score responsive to activity on the information platform. According to one embodiment, the at least one processor is configured to increase a reputation score responsive to a user generating curated content. According to one embodiment, the curated content includes posting a comment associated with a data point in a result display.

According to one embodiment, the information platform further comprises an engagement component configured to manage creation of a communication session between a current user and a stakeholder entity and/or stakeholder entity representative. According to one embodiment, the at least one processor is further configured to generate an engagement display configured to accept identification of a company, and/or contact, and one or more users as participants on a communication thread. According to one embodiment, the current user can specify an access permission of the communication thread. According to one embodiment, responsive to selection of a public access permission, the communication thread, topic, and company are queryable as results on the information platform. According to one embodiment, returned results include at least contact information for a company in the returned results.

According to one embodiment, the information platform further comprises an engagement component configured to standardize and manage creation of a communication session between a current user and a stakeholder entity and/or stakeholder entity representative. According to one aspect a computer implemented method for managing search execution on an information platform is provide. The method comprises generating, by at least one processor, a search display for accessing information associated with a plurality of companies or entities; accepting, by the at least one processor, user input and search an information knowledge base responsive to the user input; accepting, by the at least one processor, user input to curate any data element shown as a result of the search of the information knowledge base; organizing, by the at least one processor, search output into at least three data types including qualitative, quantitative, and interactive information; transitioning, by the at least one processor, between respective data type displays of the qualitative, quantitative, and interactive information and maintain a current search state in the respective data type display; and integrating, by the at least one processor, display of curated information into returned results or within the elements of the returned results regardless of data type display.

According to one embodiment, the method comprises generating a side bar display for integrating community moderated information (e.g., social information available on the platform, etc.) into search result displays. According to one embodiment, the method comprises accepting user input identifying an information item in the user interface display; accepting user submitted content to associate with the information item; and creating a contextual overlay for any subsequent view of the information item associated with the user content. According to one embodiment, the information item includes a data point in a time series display, and the user content includes an explanation for the context of the data point. According to one embodiment, the method comprises managing an engagement between a user and a respective stakeholder entity and/or representative users of the respective stakeholder entity.

According to one embodiment, the method comprises displaying a plurality of information views for accessing information returned as search results based on a type of information returned. According to one embodiment, the method comprises adjusting a user reputation score responsive to activity on the information platform. According to one embodiment, the method comprises increasing a reputation score responsive to a user generating curated content. According to one embodiment, the method comprises posting a comment associated with a data point in a result display. According to one embodiment, the method comprises managing creation of a communication session between a current user and a stakeholder entity and/or stakeholder entity representative. According to one embodiment, the method comprises generating an engagement display configured to accept identification of a company, and/or contact, and one or more users as participants on a communication thread.

According to one embodiment, the method comprises enabling the current user to specify an access permission of the communication thread. According to one embodiment, the method comprises storing responsive to selection of a public access permission, the communication thread, topic, and company as queryable results on the information platform. According to one embodiment, the returned results include at least contact information. According to one embodiment, the method comprises standardizing and managing creation of a communication session between a current user and a stakeholder entity or representative. According to one embodiment, the method comprises collecting and displaying user selected or authored data items is the search workspace.

According to one embodiment, the method comprises generating a navigation option displayed in a community menu for accessing a notebook object related to the page or data in question, or associated with a related entity, collective, or theme. According to one embodiment, the method comprises generating a punchcard object associated with at least one of an entity, collective, or theme. According to one embodiment, wherein generating the punchcard object includes displaying a summary of information on selected targets based on user input (e.g., selected information, search criteria), or artificial intelligent modeling of a topic relevant to or selected by a current user. According to one embodiment, the method comprises ingesting data objects and extrapolating information targets matching entity governance issues or thematic issues, based processing through an AI model.

According to one embodiment, the method comprises defining a search workspace based on the current search state; and displaying a search output not directly responsive to the user's query within the search workspace. According to one embodiment, the method comprises accessing and integrating into the search workspace relevant information based on matching the current search state to artificial intelligent ("AI") tags made on information sources stored on the information platform. According to one embodiment, the method comprises executing AI models on information source documents; tagging unstructured text contained in the information source documents; and storing the unstructured text documents and associated AI tags for responding to user searches.

Still other aspects, embodiments, and advantages of these exemplary aspects and embodiments, are discussed in detail below. Any embodiment disclosed herein may be combined with any other embodiment in any manner consistent with at least one of the objects, aims and needs disclosed herein, and references to "an embodiment," "some embodiments," "an alternate embodiment," "various embodiments," "one embodiment" or the like are not necessarily mutually exclusive and are intended to indicate that a particular feature, structure or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 2 is an example screen capture of query results, according to one embodiment;

FIG. 4 is an example screen capture of an overlay display, according to one embodiment;

FIG. 12 is an example of tagged unstructured text, according to one embodiment;

FIG. 13 is an example screen shot of a document view user interface, according to one embodiment;

FIG. 14 is an example screen shot of a context overlay view, according to one embodiment;

FIG. 17 is an example screen shot of an initial screen and query interface, according to one embodiment;

FIG. 18 is an example screen shot of a search result view, according to one embodiment;

FIG. 19-28 are example screen shot of user interfaces, according to one embodiment;

FIG. 29A-B are a right side and left side of a user interface and respective functionality, according to one embodiment;

FIGS. 32A-B are a right side and left side capture of a user interface and respective functionality, according to one embodiment;

FIGS. 33-35 are example screen shots of user interfaces, according to one embodiment.

DETAILED DESCRIPTION

Figure 1:
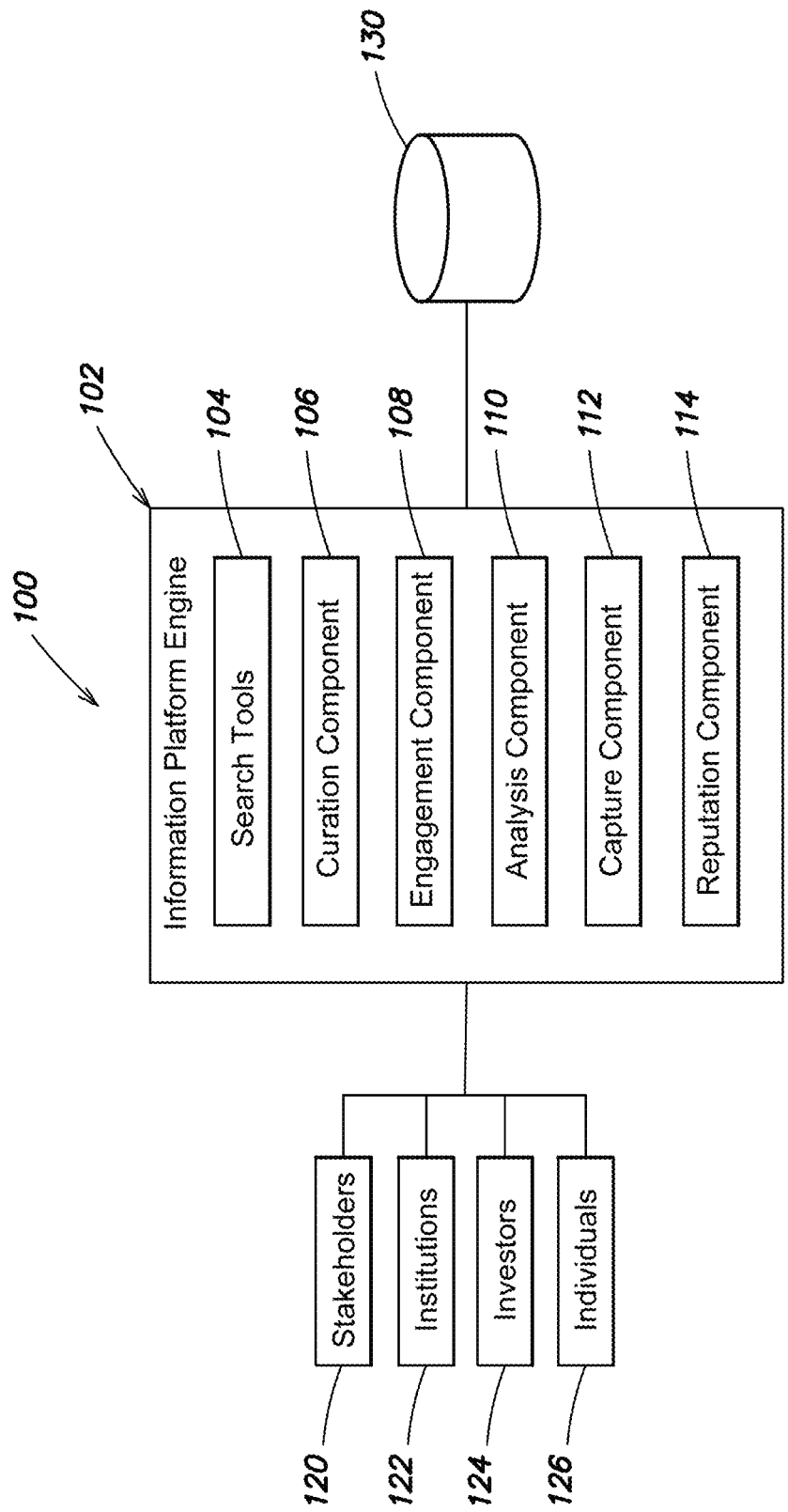
FIG. 1 is a block diagram of an example information platform, according to one embodiment.

Stated generally, various aspects and embodiments provide an information platform for delivering targeted information results on entities to facilitate investment strategy, and for example, to support ESG investing. Various embodiments provide for targeted search functionality that enables even investment neophytes to access and understand the information needed to quantitatively assess a given company or entity. In further embodiments, the information platform can include a curation component to establish context information for any given data point for information displayed on the information platform. In some examples, the user population actively curates data points/information displays to include an explanation of why a particular piece of information is relevant or how it is related to stated company goals (e.g., ESG goals), among other options. In further example, intelligent models can provide context information for respective data and/or displays.

Various embodiments of the information platform integrate a variety of functionality to ensure that displayed information is targeted to the user's needs, and to facilitate ready understanding of the responsive information displayed. In some embodiments, this can include curated information made accessible in contextual overlay displays. In further embodiments, contextual overlay displays can include social or community-based information that provides additional insight into a given data portion or a search result shown on a respective company. In some examples, curated information and/or community-based information can be managed based on reputation scores of the users providing the information. The higher the reputation score the more likely a given piece or information and/or comment is relevant, useful, and/or accurate.

According to some embodiments, the information platform improves data access and understandability by incorporating social feedback into displayed information, and various aspects of the information platform. The integrated social aspects provide both forward looking and historical perspectives, as well as providing both an "insider" and "outsider" view on any given piece of information. Integrated community information and respective displays enable any user to have a more holistic view of a company and to understand how the information relates to ESG.

Any user who accesses the information platform can benefit from the tailored information provided. For example, the user population can include institution users who manage or direct operations for a company, investors (e.g., typically professional investors), and stakeholders who have an interest in the company and/or objectives associated with a particular data point. Each user and/or user segment can be given a bank or wallet to use for awarding reputation tokens. For example, useful context information can be endorsed by users accessing the information at a nominal cost to the endorsing user from their wallet. The posting user then receives reputation points that can be associated with a given post and/or any post by that user. In some embodiments, reputation scores can be used to filter context information displays and/or to order associated information displays.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Shown in FIG. 1 is a block diagram of an example information platform 100. According to various embodiments, the information platform is configured to provide subscribing users with targeted information coupled with curated information sources that enables easy access and limits the volume of information returned to user queries. In addition and/or in the alternative, the information platform further provides information context for available data points. In some examples, the platform users can curate any information data point to provide additional context that facilitates understanding and/or use of the displayed information. In other embodiments, reputation scoring further ensures that the curated information is the most relevant and/or useful to subsequent users.

According to various embodiments, the platform 100 can include and/or instantiate an information engine 102 that may perform any of the functions described for the information platform. In some alternatives, the information engine 102 can be configured to call and/or instantiate a variety of platform components, wherein the platform components can be configured to execute specialized functions. In yet other embodiments, any of the functions disclosed can be executed by the platform 100 and/or engine 102 without calling or instantiating the additional components.

According to some embodiments, the platform and/or engine can include a search component 104. The search component 104 can be configured to provide streamlined search functionality to a user population. The streamlined functionality can include user interface displays for inputting a free text search to identify a company or entity of interest. In some examples, the system is configured to analyze a user profile once a user logs into the platform. In response to identifying matches to the user profile, the platform can provide search suggestions that relate to past searches, searches conducted by similar users, searches on information likely to be of interest to the user, among other options. For example, the user interface can include a text box and a search icon. The text box can be configured to accept any free text input, and can also be configured to provide type ahead matches, for example, to companies or entities based on the user profile and/or alphabetic matching to the user input.

According to some embodiments, the search component can specifically exclude prior search activity as a factor to use in presenting search results. The inventors have realized that prior searches and/or results can incorporate user bias and limit the ability of the user to access relevant and/or important information. Various embodiments of the information platform and/or the search component can be designed to deliver the single best result or results to satisfy a given query without any user bias and thus minimizes the echo chamber effects plaguing much of the internet and conventional search approaches. As discussed below however, recommendations and analysis can incorporate prior user history in generating recommendations and/or identifying information sources that complement the user's unique approach to research (and may, for example, uncover information they would not have found on their own).

Various embodiments of the search component are configured to deliver unique and superior results compared to existing search implementations. For example, search in its current iteration simply delivers results to the user, the results are clicked on and the user follows the link often to a different website. Each website that is visited has its own formatting structure with information organized in its own way and requires the user to orient and familiarize themselves with whatever format and structure presented in order to obtain the information they seek. According to some embodiments, before clicking on a result display on the information platform the user can select a contextual overlay or comments to receive critical contextual information (e.g., from domain experts) and if further information is needed, the user can choose to click on the result. A user is far more likely to understand information presented to them—and at a faster rate—when the user already knows the context for the information being selected. Further, since platform results are delivered in a consistent format based upon information type, the user spends less time orienting themselves in order to access the information needed.

According to some embodiments, the search component provides a simple design to facilitate user interaction with a knowledge base (e.g., 130) of companies, investment information, including ESG data stored on the platform. Responsive to a user query, the search component is configured to return search results that are related to companies and/or entities. According to various embodiments, search results are presented on likely matches to a company and/or entity being requested. In some examples, the search results are provided in a standard format that provides, for example, a listing of potentially matching companies as an initial set of search results.

Shown in FIG. 2 is an example of query results for search on Apple Inc. In this example, a single match is returned in the standard display format, and is shown for Apple Inc. the company. The same data can be displayed for any matching company. The results shown for a matching company can be organized to include information on market capitalization, earnings per basic share, net cash flow, insurance of debt securities, among other options for displaying data relevant to the company. The results can also be organized on categories of information (e.g. data, documents, entity, etc.). In some embodiments, the categories of information are associated with navigable options in the user interface (e.g. data 202, documents 204, and entities 206).

Returning to FIG. 1, the information platform 100 and/or engine 102 can include a curation component 106. According to one embodiment, the curation component can be configured to accept user input to associate with specific data, data selections, and/or data points shown in the display. Referring again to FIG. 2, each of the information items associated with an online query enables access to a contextual overlay that provides information context and/or community information on a given data item. According to some embodiments, responsive to user input the curation component 106 tags or stores user comments and/or community information in association with the data item or data point. For example, shown at 208 through 224 are information context displays which can include a visual icon having a negative space "i," and when the visual icon is selected is configured to trigger and a contextual overlay displayed.

Figure 3:
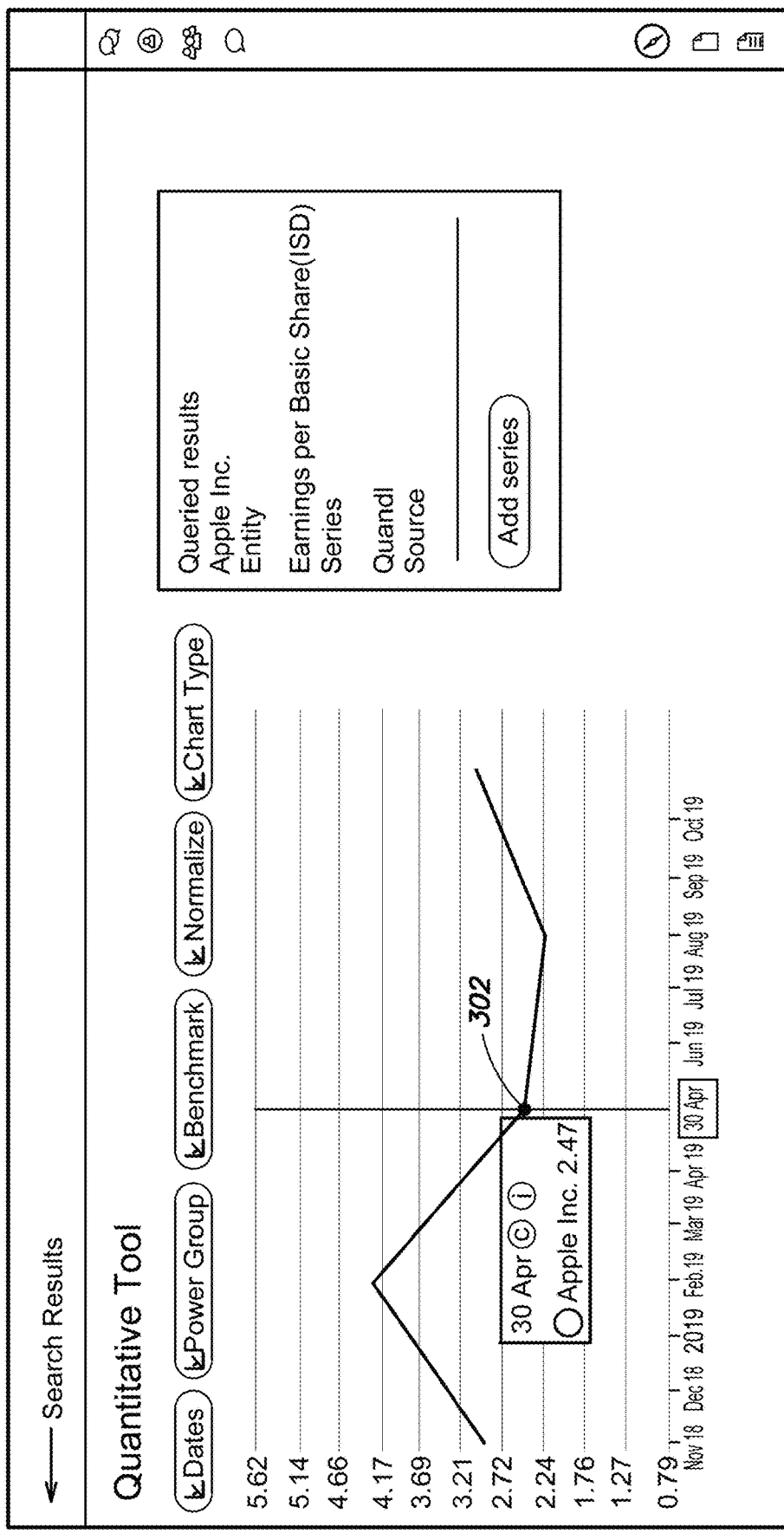
FIG. 3 is an example screen capture of a quantitative tool, according to one embodiment.

According to some embodiments, contextual overlay displays are unique to the information platform and both represent and enable functionality unavailable in conventional systems. FIG. 3 illustrates an example screen capture of a quantitative display screen including overlay access tool 302 displayed in line with the quantitative display/tool 300. For example, selection of data at 202 is configured to bring a user to the display of FIG. 3 to provide additional detailed information. Within the display of FIG. 3, any data point can be curated by users registered and/or permissioned on the information platform. In some examples, reputation scores may be used to limit curation functions to users having a threshold reputation. Shown at 302 an example overlay access tool 302 indicative of additional content for understanding, using, or appreciating the information displayed. In various embodiments, the work done by other users in analyzing information on various companies, including identification of interesting or salient data points, can be captured in the form of contextual overlay information, and can be displayed in the context of the data that make it relevant. Additionally, the capture and propagation of such data is seamless on the information platform. According to some embodiments, contextual overlays displays enables distribution of both an "insider" and "outsider" perspective on a given piece of information, and having such information in context allows even novice users to have a more holistic view. For example, an insider perspective can be delivered via curated information (e.g., based on operation of the curation component) provided by either users, experts, and/or an owner/creator of the information shown.

Responsive to selection of an overlay access tool (e.g., 302), the platform can be configured to display screen capture 400 on top of and/or in conjunction with an underlying information display (e.g., 300). FIG. 4 illustrates an example overlay display 400 that can be shown in conjunction with the underlying data being explained and/or reviewed by a user. According to one embodiment, contextual overlay displays can be configured to provide (e.g., at 402) description/definition/statement describing the selected piece of information (data point, document, etc.). Contextual overlays displays can also include additional values (e.g., at 404) to help define the selected piece of information (date of measurement, units, etc.), reasons for the importance of the data and/or data point (e.g., outlier, consistent measure with ESG goal, etc.). Contextual overlay displays can also include background information (e.g., at 406) that, for example, contain contextual information in paragraph/text form to help the user better understand the selected information and project/look forward as to how it may change/evolve; audit trail information (e.g., documented ESG goals, prior data to support current data point, etc.); supplemental information that provides next steps or suggestion/identification of other related data points, documents, entities or collective engagements (e.g., at 408) likely to be relevant to the user or that may help better understand the data or broader topic that the data implicates; contacts (e.g., that provides contact information for the owner/creator of the data so the user can reach out to them for further information); and/or outsider perspective (e.g., provided by other users on the platform that are not administrator of the information platform or the owner/creator of the information); comments (e.g., captured users comments on a data item/point).

Figure 8:
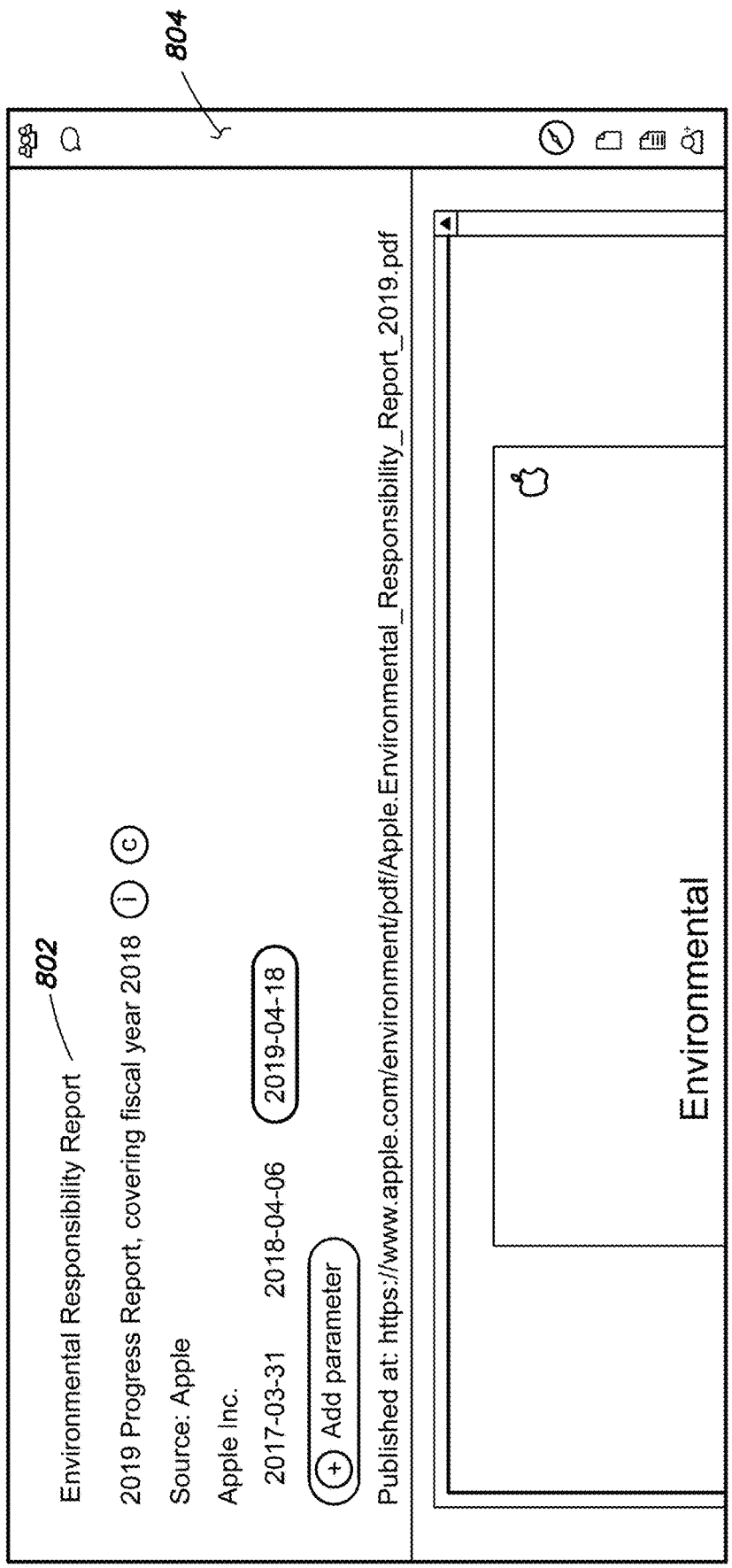
FIG. 8 is an example screen capture of a qualitative tool, according to one embodiment.

In further embodiments, any user or reviewer on the platform can access additional information on a given company or topic. For example, FIG. 8 illustrates a qualitative tool 800 for reviewing information on a company. In this example, documents related to a company or particular issue can be accessed, read, and/or commented on in the user interface. In various embodiments, existing comments from other users can be surfaced upon accessing any commented report. For example, the side bar display 904 is configured to display navigation options for selecting and reviewing comments. Additionally, the user interface can highlight sections of any report (e.g., "Environmental Responsibility Report" 802) that has been commented to provide community-based information and/or information from other users, providing access to insider and outsider views on the reported information.

According various aspects, the ability to access comment information from other users in the context of the report being reviewed enables the current user to identify and focus on important information faster than conventional systems, and enables the current user to learn and appreciate the information in the report faster than conventional systems allow. Moreover, the unique display structure, integrated contextual information displays, and community information accessing in the sidebar, put analysis tools into the hand of each reviewer that are not available in conventional systems. In addition, users investigating a company can transition readily between quantitative information views (e.g., time series data and/or contextual overlay displays within the time series data (e.g., FIG. 3)) and the qualitative reports and any associated comments (e.g., FIG. 8), and may even directly engage the company being reviewed.

The inventors have realized that often, individuals that are not too close to a topic—or are viewing it with "fresh eyes"—can provide a differentiated opinion or perspective on it. Providing such outside views in context with the underlying data enables understanding unavailable in conventional systems. In further embodiments, the information platform can be configured to highlight and/or limit information shown in a contextual overlay display. According to one example, a comments section in the display can be configured to highlight the top 3 value-add comments (as determined by the community, for example, via reputation scoring) by users of the platform tied to this piece of information.

Returning to FIG. 1, any platform user (e.g. stakeholders 120, institutions 122, investors 124, and/or individuals 126) can access the system, search the knowledge base and access curated content. The various users may also create curated content that can be associated with any information stored in the knowledge base (e.g. 130). For example, a platform user can highlight information in the user interface and select an option to add a comment for review. In some embodiments, the user may select the data item provided by another user to add reputation points. For example, a user who finds a particular comment helpful or useful may tip the commenting user from their account. As discussed in greater detail below, a reputation component 114 can be configured to calculate a reputation score based off of a user's activity, tips, and/or other reputation scoring actions.

Shown in FIG. 1, the information platform and/or information engine 102 can also include an engagement component. According to some embodiments the engagement component is configured to enable interactions between users and the company and/or institution. For example, the user can access a sidebar shown at 240 in FIG. 2 to select an engagement function. In the context of FIG. 2, the engagement function will trigger an engagement dialogue with Apple Inc. The user selecting the engagement function can also specify additional users to participate in the engagement. According to some embodiments an engagement is an interactive discourse between one or more users and a company or entity. The one or more users can engage the company on any number of topics. For example, the user can ask the company to comment on their environmental impact or other social issues (e.g. water use, solar commitment, fossil fuel position, waste management, child labor, fair wage commitment, among other options). Through such dialogues the user population can obtain information on the company that may be difficult to access or be unattainable through public sources.

According to some embodiments, the engagement component can be configured to audit interactions between users and the company. In one example, the engagement component 108 is configured to maintain the exchange communications between the user and the company. The exchange can be made accessible to a broader user community who access the information platform. According to one embodiment, company engagements are searchable on the platform and any user on the platform may request access to a live engagement and/or view of historical engagement. In some embodiments, the engagement component 108 is configured to parse information exchanged during an engagement, and capture ESG commitments or ESG related information discussed in engagement. The platform and/or engagement component 108 can be configured to create information links to the ESG commitments or ESG related information as part of a company display of information items (e.g., similar to FIG. 2).

In conjunction with the search component 104 the platform may include an analysis component 110. The analysis component can be configured to analyze a user's activity and/or a user's profile to determine information sources and/or companies that may be of interest to the user. For example, the analysis component 110 can be configured to match a given user and their search activity (e.g. companies with no or minimal water waste) to similar searches by other users and their results. According to one embodiment, searches by other users and/or results from other users can be shown in a search display, and which can be executed by a search component (e.g. 104). In some embodiments the analysis component includes intelligent models of other user behavior and/or searches. For example, a learning model can be trained on user activity from the user population and matched to the activity of a current user. Based on any matches search suggestions can be provided and/or suggestions of companies to review. In further embodiments, the system may match current user activity to engagements that are currently live on the system. In one example, the platform may automatically request access to a live engagement on behalf of the current user based on a match determined by an intelligent model.

In addition to matching on user activity and/or user profiles, the analysis component 110 can be configured to model information and/or information sources reviewed on companies. In some embodiments, the analysis component 110 can work in conjunction with a capture component 112 to identify and retrieve public information on companies stored in the knowledge base (e.g. 130).

According to some embodiments, the analysis component can be configured to define or establish rules on information to capture for companies stored in the knowledge base 130. The defined rules can be executed by a capture component 112 to obtain the information. According to some embodiments the capture component can retrieve SEC filings for a given company and store them in the knowledge base for curation and/or community comments.

As discussed above, curated and/or community information can be managed on the platform using reputation scoring. According to one embodiment, the platform can include a reputation component 114 configured to score users and/or user activity and associate respective users' comments with their reputation score. In some examples, the system uses reputation score as a filter and will only display comments or community information having a baseline reputation score. In other embodiments, the platform uses reputation score to order the display of comments or community information.

According to some embodiments, engagement functions, curated and/or community moderated information can be accessed through a sidebar display (e.g., 240) that is persisted through multiple views on the information platform.

Figure 5:
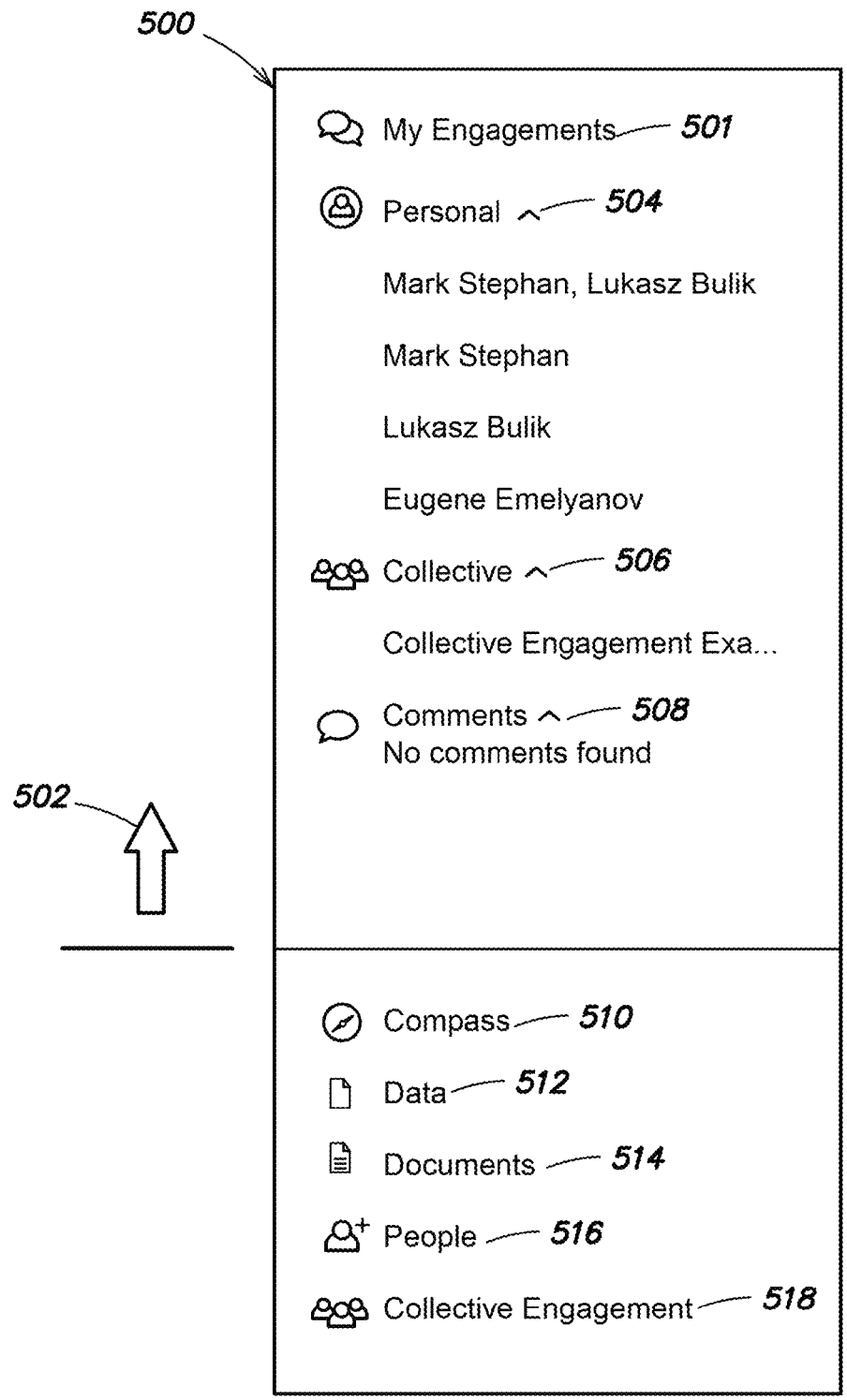
FIG. 5 is an example screen capture of an expanded view of the sidebar and associated functions, according to one embodiment.

FIG. 5 illustrates an expanded view of the sidebar and associated functions made available for a given user. According to some embodiments, the sidebar is configured to maintain a persistent presence on screen whether in an expanded (e.g., 500) or unexpanded view (e.g., 240). In further embodiments, the platform is configured to make the sidebar available to users to enable the user to access and/or inject social elements (e.g., provide comments, context, and next-step guidance into any workspace via the displayed functionality). The sidebar can include multiple function set, and for example, Engagements (e.g., at 501) and Compass AI (e.g., at 510). The engagement options shown (e.g., at 501-508) provide access to personal engagements which can be private or public one on one interactions, group conversations (private or public), collective engagements with companies based on participation requests/invites that can include public comment (e.g., available and/or searchable on the platform), and may provide access to any related comments made public. Engagement functionality is discussed in greater detail below.

According to various embodiments, the platform provides the ability to minimize the displayed sidebar—and any social elements. In such settings, the platform allows any user to access and/or eliminate contextual information display and eliminate potential distractions or noise in the event they need to deeply focus on a given analysis. Further, with a single click the user can reintroduce those social elements when needed.

In further embodiments, the sidebar 500 can also provide access to a compass AI at 510. The compass AI can be part of the analysis component and be configured to model prior users' activity behavior to derive matches/suggestions on a current user's activity. According to some embodiments, the compass AI tool can be accessed responsive to selection at 510. The compass AI tool can be configured to provide guidance on next steps. For example, the compass tool can be configured to identify relevant/related data points and display such options for selection/navigation, other relevant documents, other relevant users or other relevant collective engagements (e.g., at 512, 514, 516, and/or at 518).

According to various embodiments, the compass AI generates suggestions from subject matter the user is researching, the user's profile, and/or the activity they are participating in at the time the compass AI functionality is selected. Such activity can include the series of searches, selections or actions in a given research session and/or the content of an engagement or comment trail accessed on the platform. According to some embodiments, the compass AI can be trained on numerous years of earnings transcripts, conference transcripts and annual shareholder meetings, and the data, questions, and event identified/highlighted therein—as those particular events tend to highlight the most important issues and drivers for companies/industries uncovered/asked by analysts. Additionally, transcripts of quarterly conference calls can be used to model information that is identified as important to any investor and further to specifically identify and highlight information important to ESG investments.

In further embodiments, system-based recommendations can be provided and/or displayed separately from the sidebar and/or information views. In some embodiments, the AI recommendation (e.g., Compass AI) can be provided as a separate window that can dynamically present recommendations based on a user's current context.

Figure 6:
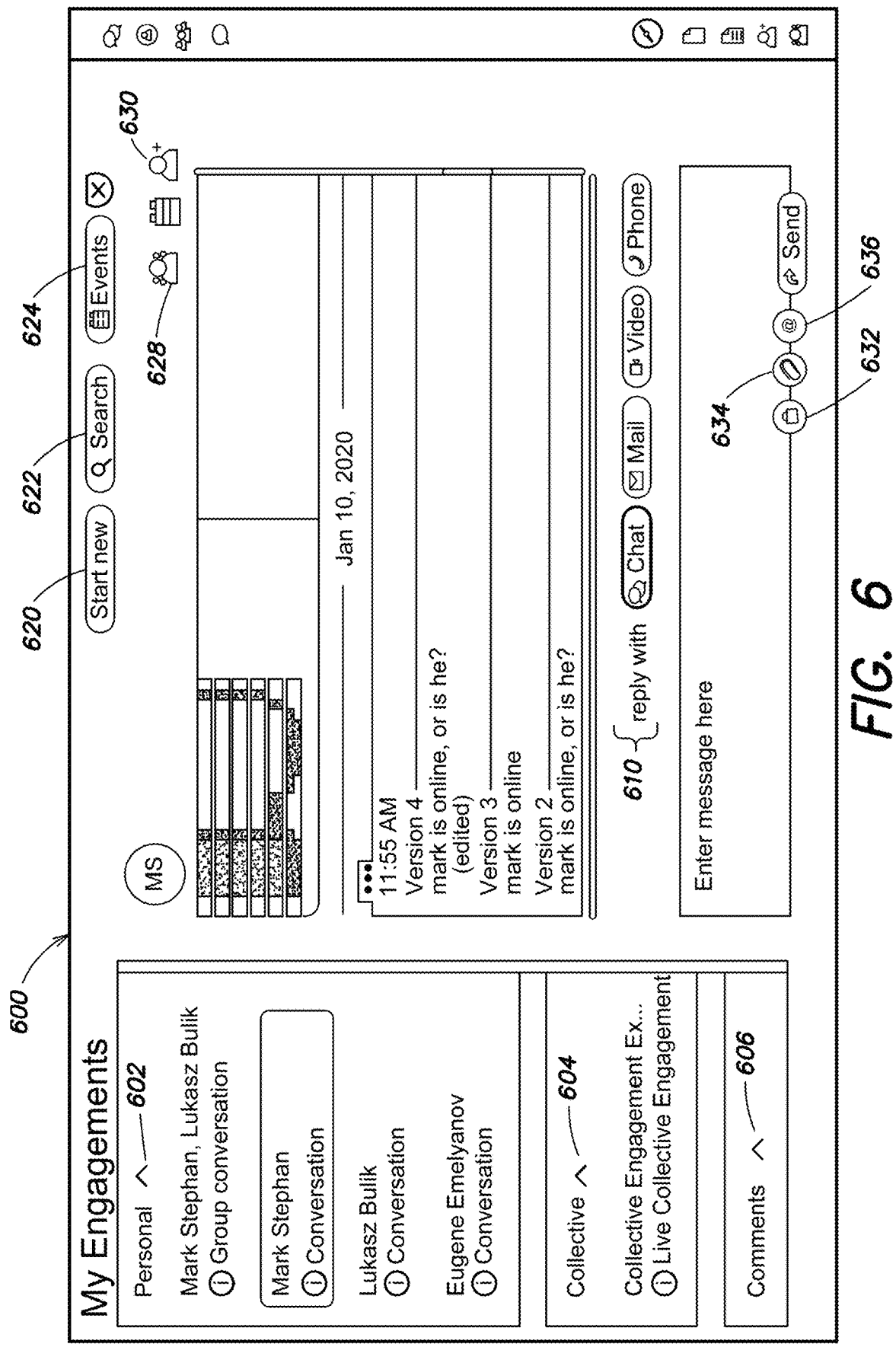
FIG. 6 is an example screen capture of an engagement tool, according to one embodiment.

According to some embodiments, engagements can be accessed through a sidebar display and/or can be accessed via an engagement tool display. FIG. 6 illustrates an example engagement tool display 600. According to some embodiments, engagements on the information platform are configured to establish a communication exchange between the originator and target companies, invited users, and/or other participants. Various engagements can be classified and organized based on respective classification. For example, engagements can be classified based on personal engagements, collection and/or comment types of engagement, among other options. Personal engagements can be defined between two individuals or a group of individuals and are private and only available to participating persons. Collective engagements can be defined as public conversations between more than one user. Comments can include all of the comments a user has left on various data points or documents throughout information hosted on the platform.

As shown in the display, the user interface can be organized into sections based on engagement class—at 602 personal engagements (e.g., current and historical) can be shown; at 604 live and completed collected engagements can be accessed as a drop down list; and at 606 any comments can be accessed.

According to some embodiments, collective engagements can be "hidden" or require an invitation from a creator or another participant. In other embodiments, collective engagements can be designated "Discoverable"—searchable and/or joinable by request. In some embodiments, discoverable collective engagements can be found via search at 622, or via the Compass AI tool (e.g., 510 of FIG. 5) or within the engagement tab of an entity's profile (discussed in greater detail below). In further embodiments, the information platform can provide additional functions to access collective engagements. For example, the platform can include engagement widgets which are configured to provide an executable link to access a collective engagement.

According to some embodiments, engagements can be created either by clicking the "Start New" (e.g., at 620), button or by clicking the "multi-person" icon (e.g., 628) above the text of any personal conversation. For example, clicking the "multi-person" icon or "Start New" button to create a Collective Engagement presents the user with a form to complete the engagement. For example, the form can include one or more of the following fields: name, overview, purpose (of engagement), participants (that would help make the engagement a success), relevant organizations (entities that will be discussed in engagement), relevant themes, relevant data, archive days (makes the transcript publicly available the entered number of days after the engagement has been closed), status (discoverable or hidden), among other options. In further embodiments, the displayed form can include a display section with existing participants, which, in some examples, will be populated if a user is creating a collective engagement as an extension of a pre-existing conversation.

In further embodiments, the user creating the collective engagement is assigned as the moderator for the engagement. The moderator is responsible for accepting new participants or observers, and the moderator can be given permission on the platform to maintain an associated contextual overlay describing the engagement. In some embodiments, other users that have discovered a collective engagement can request to join as a participant (e.g., if they believe they can add value to the engagement) or as an observer (e.g., if they simply wish to learn from the dialog). In various embodiments, the platform is configured to make collective engagement publicly available to the platform users once closed (and, for example once they have exceeded the number of designated archive days). In further embodiments, a transcript of the collective engagement becomes public and is available to all users on the platform to provide the highest level of transparency, inform users and/or act as the foundation of a future collective engagement on a similar topic.

In some examples, audit trails can be generated based on collective engagement transcripts, and in yet other examples, auditable/verifiable copies of engagement discourse and/or interactions can be saved and maintained on the platform. In one example, a public ledger or blockchain implementation can freeze the contents of any engagement as an auditable/unalterable copy of the engagement. In some examples, text inputs on any engagement vehicle includes auditing/versioning to ensure complete transparency and to prevent nefarious use of the platform. In various embodiments, the platform generates unique uniform resource locators "urls" to access collective engagements and any auditable information: past, current, and future.

Display 600 can include a comments grouping (e.g., at 606). According to some embodiments, the comments section includes any comments a user has left on various data points or documents throughout the platform. In some examples, the platform is configured to display a brief description (e.g., name, value, unit, source, date, etc.) for each commented item. Selection of any commented item is configured to transition the user interface to a display of an entire comment trail for a selected data item. In some embodiments, a user can respond to other comments or add another comment to any item from within the engagement tool display 600.

The engagement tool display 600 can provide access to at least one or more of the following functions: at 630 additional users can be added by clicking the "Person+" icon and then either searching for their name or dragging the icon of a contacts into the conversation; at 622 clicking the "Search" button allows the user to search within the conversation/engagement currently displayed; at 624 clicking the "Events" button allows users to either schedule a new event or review scheduled events applicable to currently viewed conversation/engagement; at 632 clicking the "briefcase" icon allows the user to load a saved screen/template to an existing conversation/engagement; at 634 clicking the "paperclip" icon allows the user to attach an external document that is not native to the platform; at 636 clicking the "@" button allows the user to search for a user participating in the conversation/engagement and then select and address them in the message box; for any given conversation/engagement the user can communicate via Chat/text, Email, Phone and Video (e.g., at 610) and any selected content/media is displayed within one engagement session or "room."

In various embodiments, the information platform provides additional functionality over conventional approaches in this space. For example, collective engagements are traditionally clunky, formal processes with extended (~90 days) sign-up periods, often exclusive to various member organizations (PRI, CERES, etc.) and carried out across disparate systems such as email, spreadsheets, phone calls, etc., which result in missed information, lack of transparency, and minimal (if any) participation. With various functions provided by the engagement tools of the information platform any user can create or participate in an engagement, instantly create an engagement, and manage all facets of the engagement with only a few selections in the user interface.

Further embodiments of the information platform can enable additional integration. For example, users and/or administrators of the information platform can generate engagement widgets configured to link information platform content, including collective engagements, to external sites. According to some embodiments, users can create an engagement widget configured to transition website browsers from a third party website to an associated profile and engagement tab made available on the information platform. According to one embodiment, this allows a given user the ability to review past, present and upcoming collective engagements in which the originator/entity is a participant. For example, the given user is a subscriber to the information platform, the given user can request to join any collective engagement displayed as an observer or participant.

In further embodiments, the engagement widget can be configured to allow a given user to visualize current collective engagements on the third party website, for example, the website of the organization participating in the collective engagement. In further example, the organization may also use the widget to allow users to directly interact with members of the organization, which can also occur in real-time in a "customer service" capacity. When displayed on the third party web-site, links within the engagement widget and/or displays can be configured to transition a given user to an engagement tab associated with an organization's profile page on the information platform. As discussed above, the engagement tab can provide a complete collection of the entity's collective engagements, including for example, past and upcoming engagements.

In addition and/or in the alternative, engagement widgets can be configured to enable participants to interact with platform content and/or and respective engagement on the third party website. For example, users can access and interact with platform content displayed on the third party website. According to some embodiments, the information platform is configured to generate and display a plurality of views to simplify access to information stored in the platform knowledge base. According to various embodiments, the user interface and associated displays can be tailored to respective users and/or classes of users. For example, entity or company based displays can include information and visualization designed to make information more accessible for evaluating companies and/or compliance with ESG goals. According to one example, the platform can generate and display a variety of entity based views. In further example, an engagement display for an entity can include all past, present, and upcoming collective engagements associated with that entity. Registered users can become participants and observers of such engagements.

According to some embodiments, the information platform may also control access to information based on subscription within registered users. For example, general or aggregate information may be made available to registered users who have not subscribed for access to detailed information views, and/or who have not subscribed to information feeds provided by a respective entity. In one example, the platform enables non-subscribers to review contextual overlays to get information on engagements. In some embodiments, the platform may provide additional access control based on subscription—if an engagement is closed a full transcript may be made available for all users, however any subsequent comments by users that was not part of the original engagement itself is limited to subscribers. In other embodiments, access to any information on the information platform can be associated with access controls that require subscription, and/or permission of the user/entity who originated the context on the platform. In further example, some information is provided regardless of subscription, and may include evidence of a fiduciary duty of an entity or governing body of an entity to investors, shareholder engagement or evidence of impact to donor organizations (depending on the entity type), among other options.

According to another aspect, the information platform can facilitate user understanding of underlying information by leveraging activity of users. For example, the information platform can employ an analysis component (e.g., 110, FIG. 1) configured to provide cohort analysis of other user behavior. In some embodiments, the platform is configured to review what data/documents/information is being utilized on the platform, and the platform can also model such use based on a user type or class. For example, company employees, investors and/or stakeholders can be grouped together on the platform. The activity and/or information associated with each type of user can be used to model related information and/or suggest information that is determined to be relevant to a particular search, company, engagement, etc. In some embodiments, the cohort analysis can be provided as contextual overlays within drilled down views for more specific information. Additional organization can be analyzed for the user groups or user classes to provide more detailed models and suggestions. The additional organization can include groupings based on a type of company, buy side v sell side investors, type of stakeholder organization, etc.

In various embodiments, the user modelling and/or cohort analysis enables the information platform to answer the questions of what output or information should be reviewed or focused on (a very common question) during an evaluation. The same information can also be used to prepare users for engagements with these counterparties (i.e. a company walking into a meeting with a buy side investor can now leverage cohort analysis of what other investors found relevant to analyzing the company.

Example Search Flow

Figure 9:
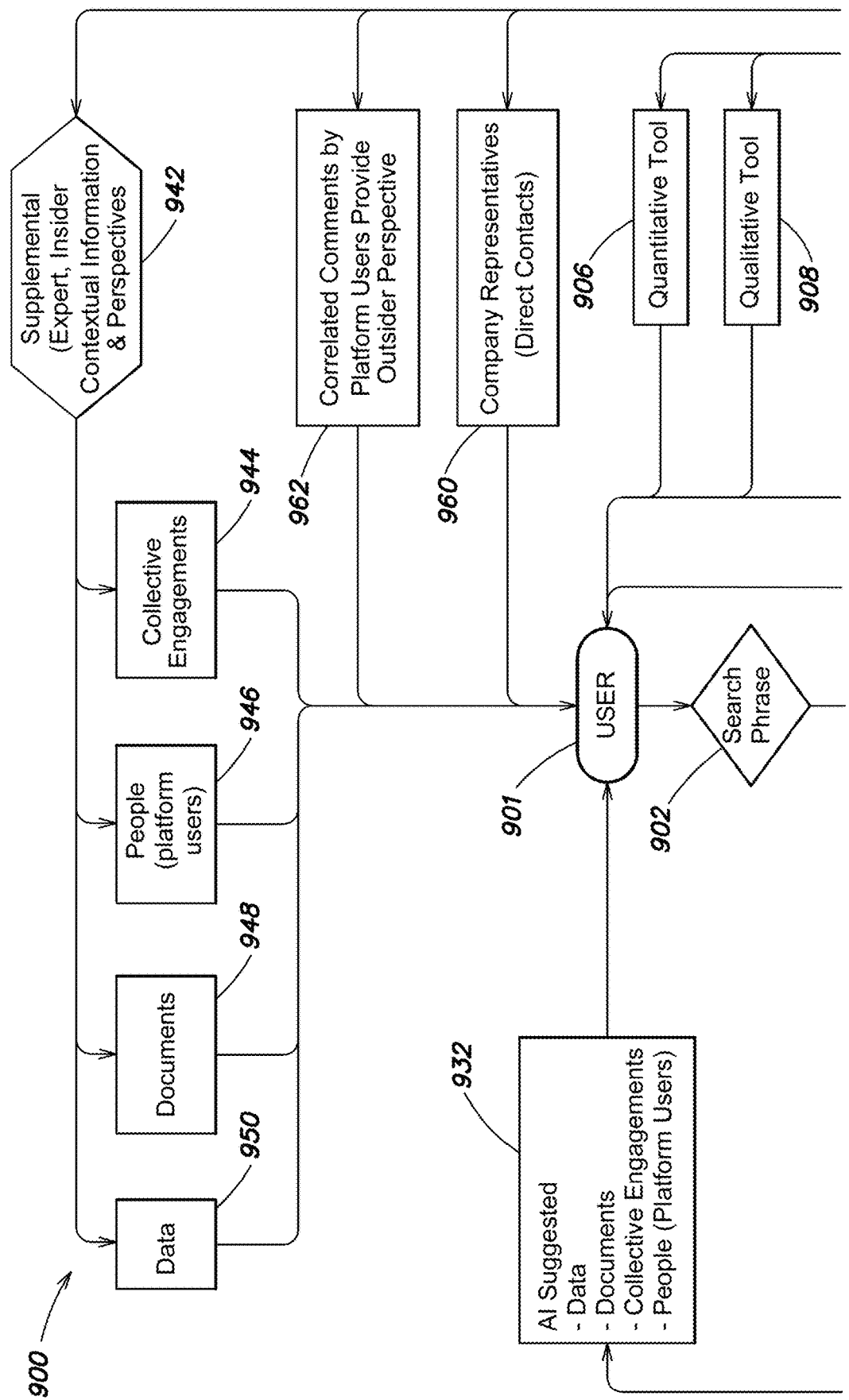
FIG. 9 is an example process flow, according to one embodiment.
Figure 9:
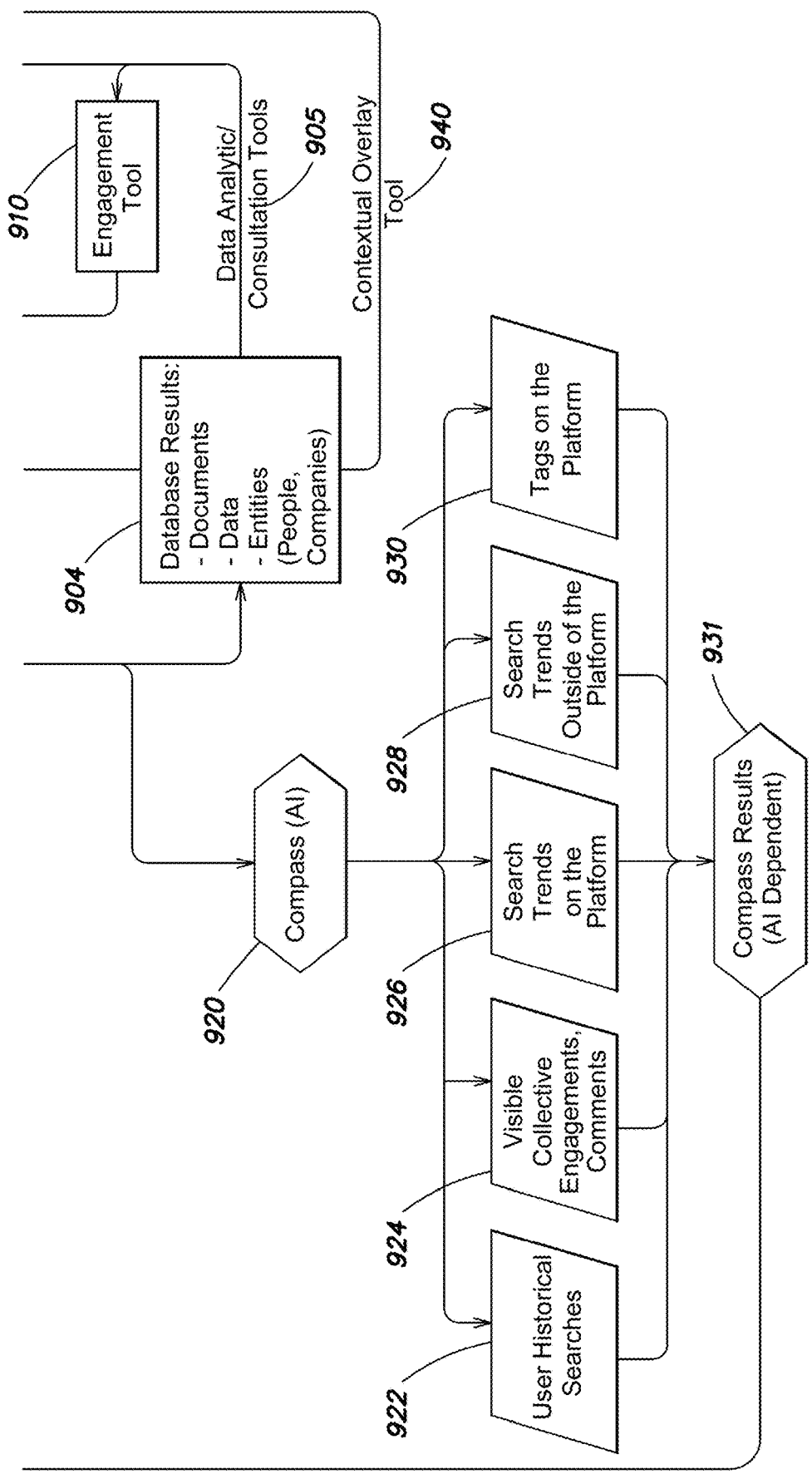

FIG. 9 illustrates an example search process flow and platform components that support the search flow 900. As shown flow 900 begins with a user 901 accessing the information platform to research a company. At 902 the platform receives a search phrase or search input from the user and accesses the database 904 to return results which can include documents, data, entities (e.g., people, companies, engagements, etc.). According to various embodiments, the user can interact with the database results through a series of data analytic tools (e.g. 905). For example the user can access a quantitative tool 906 to review time series data on the company, a qualitative tool 908 to access reports or other documents on the company, for an engagement tool for creating interactions or discourse with a given company and/or groups of users. As shown the user driven search flow can be based on user inputs, which can influence system-based search levels. In various examples, the information platform can be referred to as the system.

For example, contextual overlay tools 940 can be introduced into database results returned from user search. According to some embodiments, the contextual overlay tools 940 present supplemental information (e.g. 942), which can include expert comments, insider comments, outsider comments, additional user perspectives, among other options. In some examples, the supplemental information can be presented within organized groups (e.g. data 950, documents 948, identified users 946 (e.g. people, entities, contacts etc.). According to some embodiments, contextual overlay tools can be invoked to provide information on correlated comments 962, and/or provide information on company representatives associated with the search results (e.g. at 960).

According to some embodiments, additional information sources which can include suggestions on research topics, engagements, companies, people, etc., to review can be presented during a search session for a given user. For example, responsive to user searching a compass AI can be invoked on the platform to generate search suggestions for a user. According to one embodiment a compass AI 920 can match information on the current user and/or current users of searches to provide suggestion results (e.g. 931). The compass AI 920 can be configured to model historical search information 922, engagement information 924, search trends on the platform 926, search trends external to the platform 928 (e.g. Google searches, industry searches, industry review, published searches, researcher publications, etc.), tag information on the platform 930, among other options. According to some embodiments the compass AI 920 can include a plurality of intelligent models each configured to match various user information, activity on the platform, and even external information. According to one example, the compass AI includes a model trained on user historical searches that can be matched to a current user's activity. In another example, the compass AI can be trained on common search trends on the platform which can be matched to current user activity. In yet other examples, the compass AI can be trained on related activity identifying additional searches that often result from an initial set of queries or actions.

According to some embodiments, the results generated from the intelligent models can be presented to a user 901 in the form of company data, documents, engagements, people, and/or entities (e.g. at 932). In some examples, the compass AI suggestions can be displayed in a sidebar as discussed above or included as contextual overlay information. In various embodiments, the suggestions generated and displayed by the compass AI can be modified over the course of the user session. For example, initial searches may be matched by intelligent models, but subsequent activity in searches may yield different outputs from the intelligent models which can be displayed dynamically.

Figure 10:
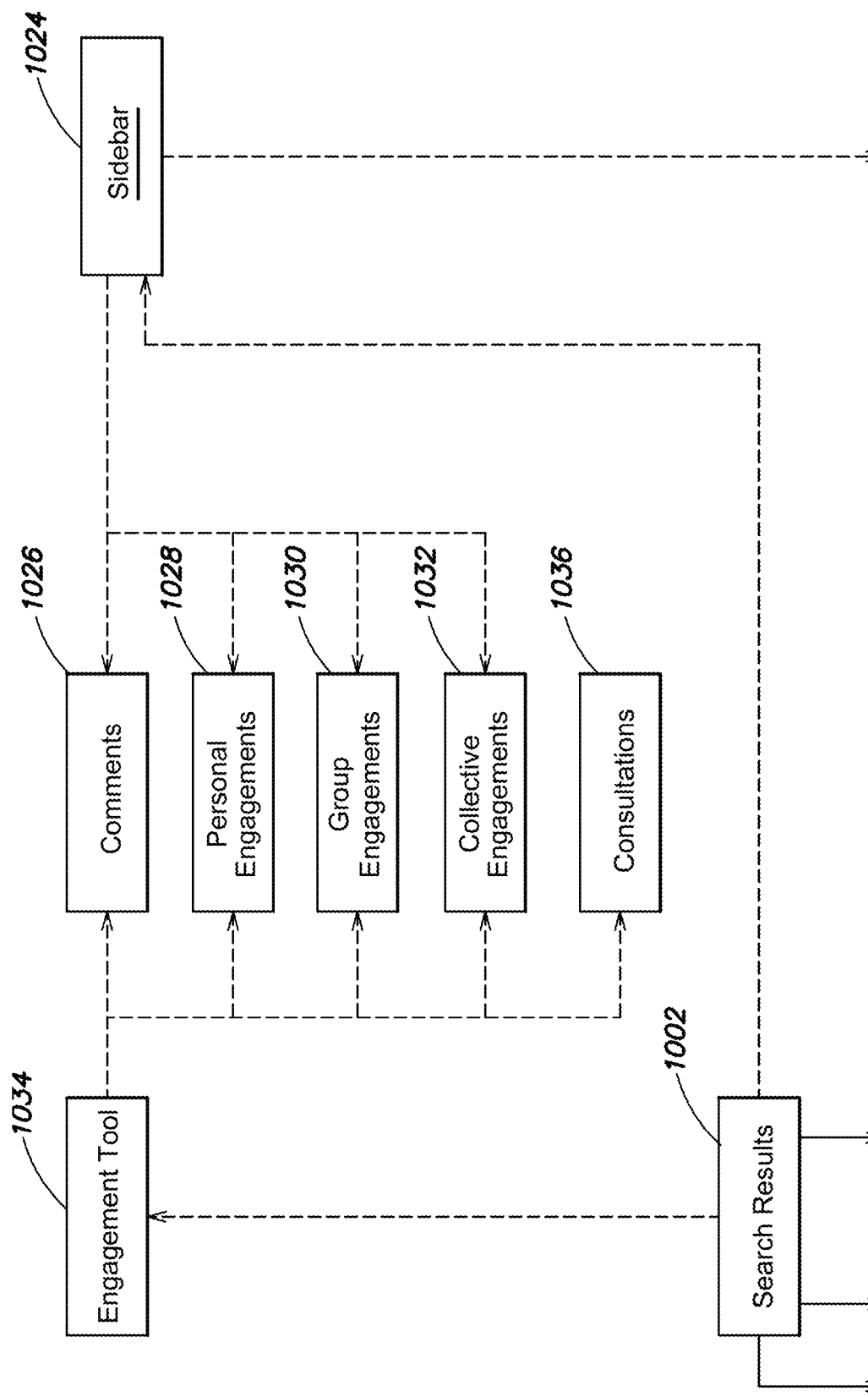
FIG. 10 is an example access flow, according to one embodiment.
Figure 10:
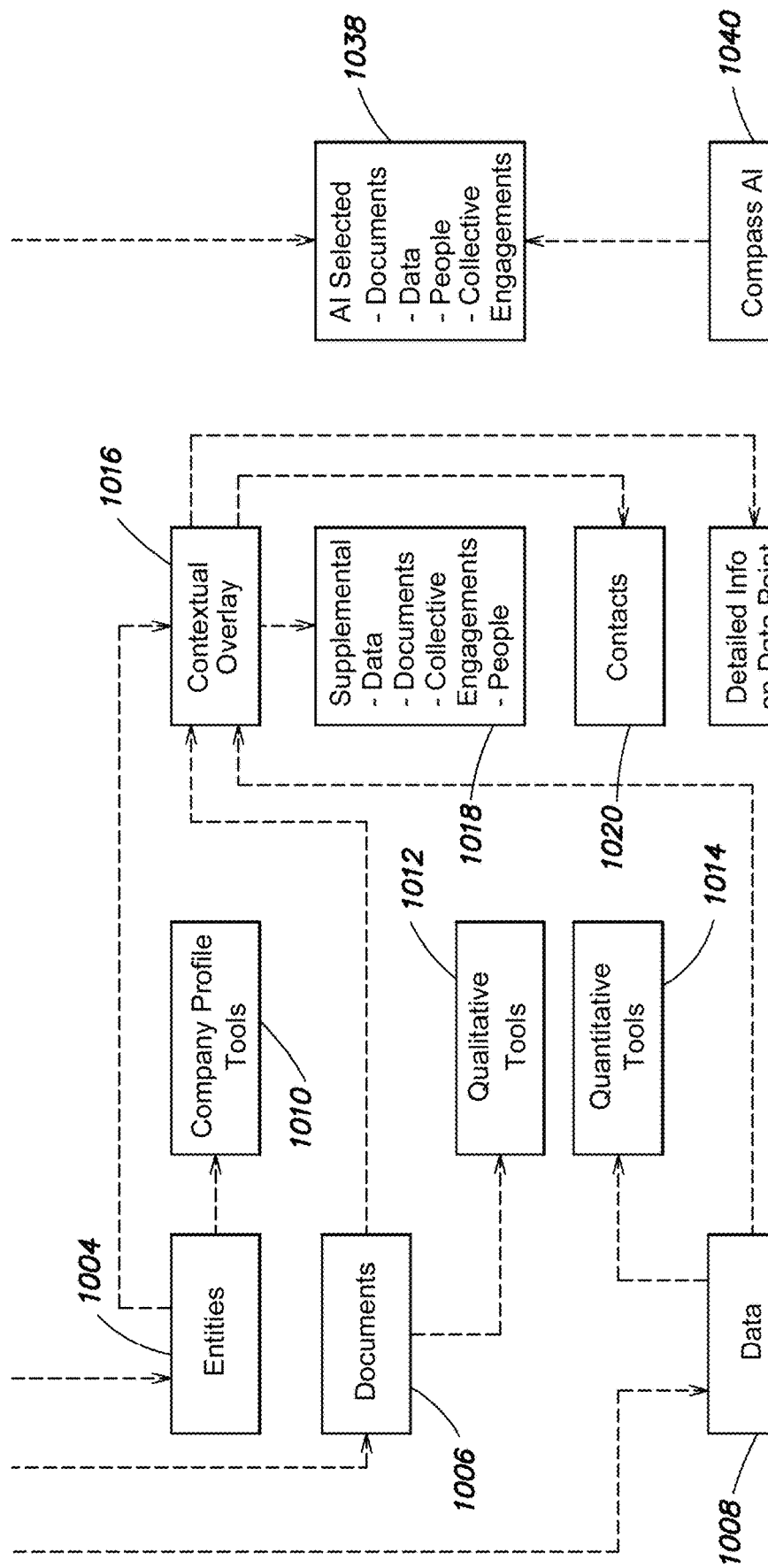

FIG. 10 is an example access flow for data and information on an information platform. At 1002 search results can be presented to a user and the various search results can include information on entities 1004, documents 1006, and/or data 1008. When reviewing the entity results 1004, the user may access a company profile tool 1010, documents can be drilled into using a qualitative tool 1012 (e.g. as shown in FIG. 8), and data 1008 can be drilled into using a quantitative tool 1014 (e.g. as shown in FIG. 3).

Within each of the data types (e.g., organized by entities, documents, data, etc.) contextual overlays 1016 may be presented. In some examples, the contextual overlay can include supplemental information 1018 (e.g. data, documents, engagements, people and/or contacts, etc.), contact information 1020, and/or detailed information on respective data 1022.

According to some embodiments, search results are shown in the main portion of the display which can also include a sidebar display for providing access to community information, other user information, engagement information, expert information, consultation information, among other options. For example, sidebar 1024 can be presented in conjunction with search results 1002 and provide access to user comments 1026, personal engagements 1028, group engagements 1030, collective engagements 1032, among other examples. In further embodiments, search results 1002 and/or sidebar 1024 may provide access to an engagement tool 1034. In some examples the engagement tool 1034 is configured to enable the user to create an engagement with the company and/or groups of users. The engagement tool 1034 can also be configured to provide access to request consultation or to select an offer to consult 1036.

In further embodiments, the sidebar 1024 can also include displays of system generated information. In one example, an AI model can provide related information based on the user's current activity. In some embodiments, AI selected information (e.g. documents, data, people, collective engagements, etc.) can be presented in the sidebar display 1024. In further embodiments, a compass AI is configured to generate outputs based on matching the current user context, activity, operations, etc., on the information platform. The outputs can be presented via the sidebar to facilitate user review, among other options.

Various embodiments of the information platform integrate AI models into the suite of tools offered. In some embodiments, AI is configured to uncover material information within any set of unstructured text, regardless of source. The AI signals are used on the system to weave together functionality in holistic research operation, to support analysis tools, and to support various engagement tools. In various embodiments, system generated connections facilitate a seamless user experience within the tools and platform, and also establishes a consistent framework to analyze sustainability (and other) research across information types (e.g., qualitative data type, quantitative data type, source or document data type, etc.). In various environments, the system integration and generated connections can be especially useful that are without universally agreed upon reporting standards, which include in many examples, sustainability reporting and/or auditing.

In further embodiments, the system is configured to leverage Sustainability Accounting Standards Board's (SASB's) standards to organize sustainability information on the platform. The SASB framework has 4 grouping levels: dimensions, general issue categories, disclosure topics and accounting metrics. The system can be configured to map information at the disclosure topic and accounting metric level so that the system is configured to roll up the review data to more comparable levels as needed. For example, given the fragmented nature of sustainability reporting, the system is configured to bridge fragmented data into "thematic" levels to allow for improved comparisons.

According to some embodiments, the platform is configured to execute a string matching approach to identify material signals within unstructured text. In various examples, the string matching approach is executed to leverage conceptual simplicity and expansibility coupled with reasonable performance and results. In further embodiments, the system uses AI Libraries that are derived from three key inputs: SASB, word2sense models, and subject matter experts (SMEs). In some examples, the library creation process has three distinct stages: seeding, expert insights and testing and revisions.

Figure 11A:
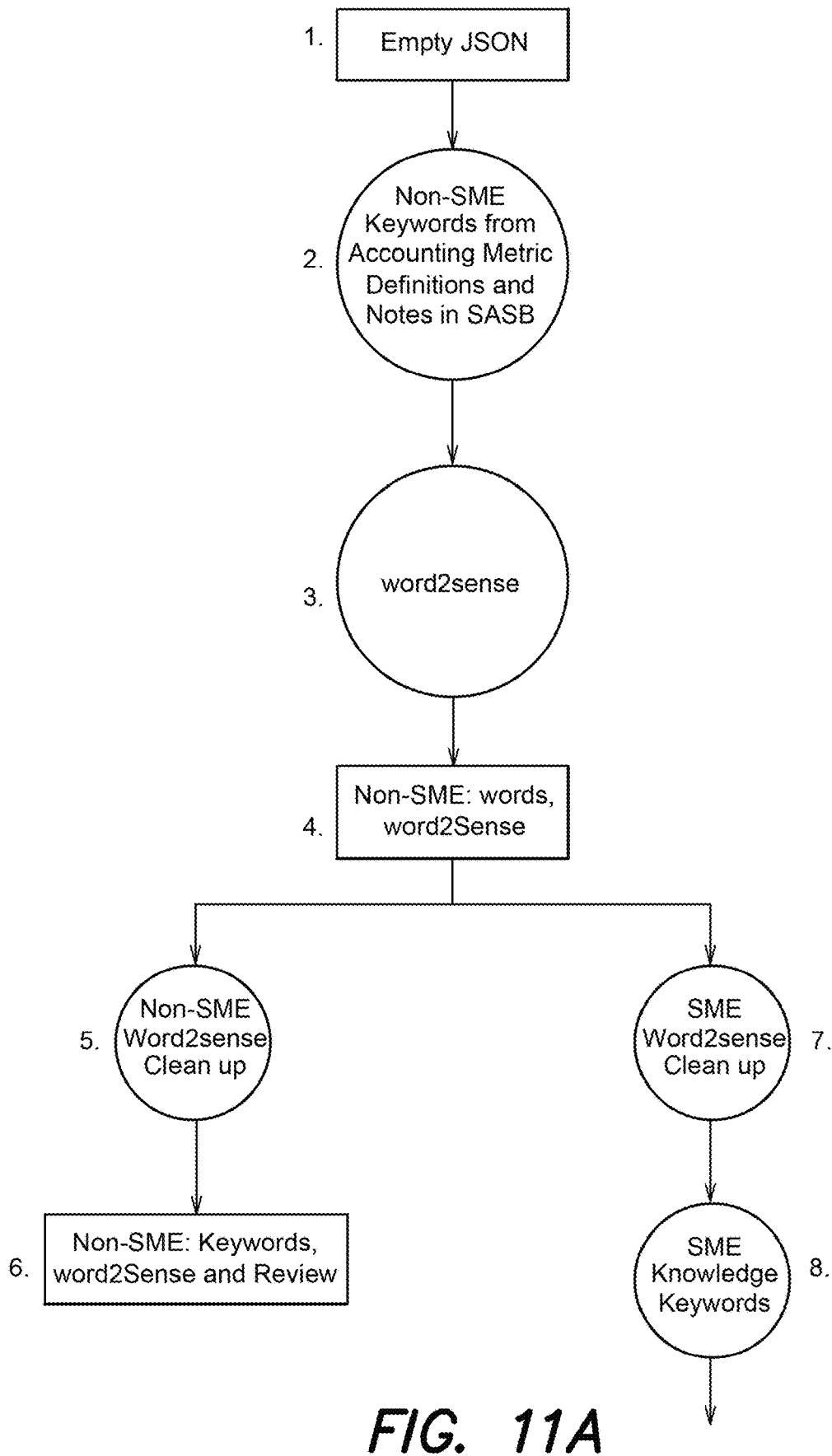
FIGS. 11A-B illustrate an example process flow for library generation, according to one embodiment.
Figure 11B:
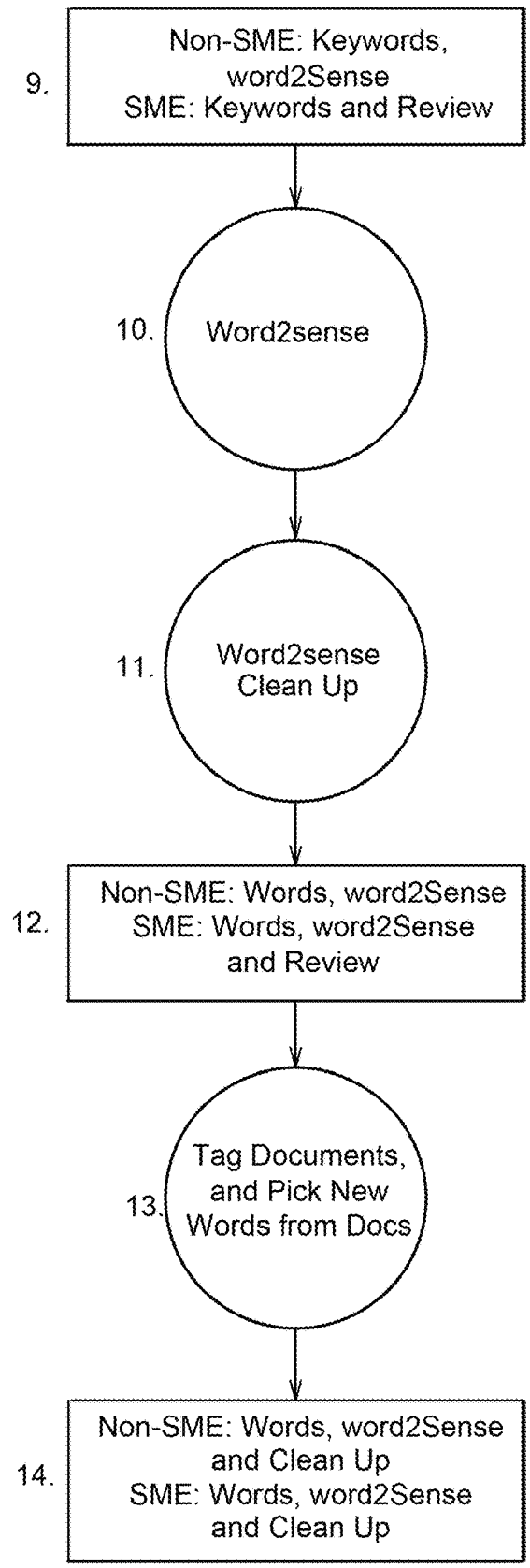

FIGS. 11A-B illustrate an example approach for library construction, which can include steps for seeding a library for the information platform using a procedural approach. According to one embodiment, a new .json file (or other data file format) is created for respective disclosure topics, and the files are used to manage a library of keywords (e.g., FIG. 11A at 1). The process continues with seeding the file with keywords from SASB disclosure topics and accounting metric guidance notes (e.g., at 2). According to one embodiment, the process executes a sting matching model (e.g., the word2sense model) to the library to produce related words at 3. Shown at 4, is an output library of keywords with words from SASB and string matched words.

In some examples, the execution at 3 introduces some irrelevant words, however the system can tolerate a number of irrelevant words and maintain seamless operation.

In some executions, human review can be used to clean up the library (e.g., remove nonsensical terms) and then pass the file off once cleaned. In one example, human guided review can be performed at 5 by any user and does not require a SME. In other embodiments, various word processing algorithms can be executed to identify and clean irrelevant words from the library, alone or in combination with human assisted review. Shown at 6 is the output library of keywords with words from human review and cleaned up words from sting matching operations (e.g., word2sense output). The library shown at 6 or 4 can also be subject to expert human assisted review. According to one embodiment, the process can continue at 7, wherein expert users (e.g., SMEs) review the file and remove any terminology from the library that is not specifically related to respective disclosure topics.

The SMEs can also infuse the library with expert input at 8 providing additional terms, words, or phrases known to the subject matter experts. In various embodiments, the SMEs provide: a posteriori knowledge based on their prior work and experience to establish a baseline of domain expertise; research on respective topics and add relevant terminology to the library; and can include review industry leaders, where the SMEs review the output from industry leaders in the field to ensure inclusion of new topics and that best practices are incorporated. The output at 6 and from 8 can be used to produce the output library of 9. The process can then re-execute the string matching model (e.g., word2sense model) to the updated library to produce additional related words and terminology at 10. Human assisted review can be used again to go through the library to throw out any terms produced by the model that are not specifically applicable to the respective concepts at 11 (e.g., accounting metric concept, etc.). Shown at 12 is the library output and elements incorporated into the library files.

In still other embodiments, the process can continue with testing and revision of the developed library. For example, the library can be tested against an independently scored benchmark of documents—for example, from companies within the same industry that were not previously analyzed or reviewed. In one example, benchmark documents are manually tagged to ensure completeness and appropriateness of inclusion at 13. Then the same documents are automatically tagged based on the generated library, and the results are evaluated on precision, recall and F1 (a combination score on precision and recall). For example, the threshold score can be set at 0.7 for the F1 metric. Regardless of the initial scores, review and evaluation can be focused on false negative keywords that were produced from the test to determine whether they should be added to the library to create a comprehensive, revised disclosure topic library at 14.

According to one embodiment, if 0.7 was attained on the F1 metric, the system saves the revised library as improved and completed. If the score falls between 0.6 and 0.7, further review can be executed to determine the state of the library following the inclusion of the missed false negative keywords. If not, or if the F1 measure was below 0.6, that result is considered a failure (not improved) and the process can be executed with new documentation.

Various embodiments invoke string matching approaches to generate results that adequately allow further development of the platform and tools. It is realized that string matching approaches can involve some limitations including: requires creation of an expansive Library of keywords; uses exact matching which is limited use in variations in words (example enhancement in some embodiments add Natural Language Processing (NLP) techniques such as stemmers and lemmatizations to resolve); large variations in words that have the same meaning are challenging (example enhancement include context matching and word re-ordering); and some words are only applicable when used in a specific context (example enhancements in some embodiments include context matching).

According to some embodiments, the use of dense vectors that are able to efficiently encode meanings of words, typically referred to as word embeddings, are employed. By encoding meanings of words using vectors, the system is able to circumvent the disadvantages of various approaches (e.g., string matching, etc.). Various embodiments develop large and high-quality training data to learn from, and augment the data sets with information ingested/analyzed on the information platform. In one example, reviewed and crowdsourced content can be developed for training AI models. In another example, the platform itself can generate the training data based on content that is reviewed using the platform's qualitative analysis tool.

According to some embodiments, the platform executes text classification models to identify disclosure topics that are then used to organize and/or tag information on the platform. In one example, the platform uses named entity recognition (NER) to identify disclosure topics. Shown in FIG. 12 is an example of NER where text classification is performed at a word level. The highlighted words show related disclosure topics (similar density shows words having related disclosure topics).

Typically, NER is employed to identify entities such as peoples, organizations, places, etc., but has been repurposed and improved in the context of sustainability and analysis. For example, NER methods can be thought of as a word level classification technique for obtaining annotation of source documents to a highly specific (word) level, which in turn gives better instructions to the machine learning model for which part of the text relates to a specific disclosure topic. In various embodiments these approaches can be extended to a sentence level or a paragraph level classification using simple preprocessing. In still other embodiments, NER provides an effective approach to identifying financial and extra-financial metrics.

Further techniques for analyzing source documents can be employed with the above approaches. For example, text classification at the sentence level can be used to build upon existing text classification models. Further, text classification at the sentence level can be executed to preprocess tagged documents into distinct sentences which enables the system to extend existing labels to those sentences, which can be used with text classification models.

TABLE XX below illustration example sentence level classifications:

| | sent | class |
|---|---|---|
| 0 | This is my book | stmt |
| 1 | They are novels | stmt |
| 2 | I have you read this book | question |
| 3 | who is the author | question |
| 4 | what are the characters | question |

In some examples, these extensions enable the system to label entire sentences in addition to entity labels that facilitate system identification of categories for the platform (e.g., qualitative, quantitative, SASB definitions, etc.). In further example, the system can present users with classified sentences that are relevant to particular disclosure topics, and further may be presented as part of or as a drill down on thematic presentation, which facilitates presentation and understanding of more complex topics—which can be done with limited amounts of data captured from the related and classified information. In some embodiments, sentence classifications can be readily integrated with other existing text classification models.

To highlight some of the features of various embodiments, described is a system review and analysis of source documents that relate to a financial services entity. The documents are ingested on the information platform and then tagged and scored using portions of the information platform libraries. For example, the system-based libraries that identify themes and metrics were used to evaluate the source documents. Once ingested, the system generated connection and tags enable consumption and/or integration of the documents into any desired user analysis. More specifically, the system operations allow users to access and view documents and/or selections within those documents that are relevant to research (e.g., workspaces) without having to find those documents via their own queries. For example, review on a first company or entity in a user workspace can be linked to the example documents (examples discussed below) on another company operating in the same industry having information on the user's research or similar topic. The system is configured to automatically integrate these documents and enable simple interface navigation to access comparative information which provides context and improves understanding. In various embodiments, this can be accomplished simply by transitioning the user interface view from one data type (e.g., qualitative, quantitative, metric identifiers, theme, etc.) to another.

In other embodiments, source documents ingested on the system can be commented on by the user population or identified by the system as relevant to a specific topic (e.g., earnings tied to emissions, water consumption and footprint, etc.). Linking of various source documents to the same or similar comments or the same or similar topics in the comments enables the system to associate massive numbers of source documents and present that information to the user in an understandable context. Further, the system is able to transition between directly responsive output to summaries of linked information, linked comments, and additional collaborative tools that enable even novice users to readily understand massive volumes of information. In some embodiments, the augmentation of source documents for access, linkage of related information, coupled with the system research tools yields a research environment that provides functionality and efficiency unavailable in many conventional search systems.

Stated broadly, one aspect of the information platform is to identify and direct users to financially material information within unstructured text. Various embodiments of the system enable users to access information seamlessly via transitions between types of data that are linked on the system by themes, concepts, and metric identifiers. The presentation enables unprecedented access to relevant and material information that otherwise would require numerous queries, refinements, and additional searches to locate contextual information and often additional queries to understand the meaning of what is being displayed.

To facilitate understanding and consistency for the user base, various embodiments of the system employ SASB's standards (and, for example, classifications) to identify the financially material sustainability issues within respective industry groups. For an entity that falls under SASB's "Security & Commodity Exchanges" industry grouping, an example of the system's analysis of source documents is discussed. Assuming a company and associated documents in "Security & Commodity Exchanges" industry grouping, the system analyzes the source documents against example disclosure topics for that respective industry. The topics analyzed include promoting transparent & efficient capital markets, managing conflicts of interest and managing business continuity & technology risks. In further embodiments, the system is also configured to analyze new source information against an existing system financial metrics library. Example accounting metrics include the following options with can be used alone or in various selections and combinations:

Promoting Transparent & Efficient Capital Markets
Accounting Metrics
[Quantitative] (1) Number and (2) average duration of (a) halts related to public release of information and (b) pauses related to volatility
[Quantitative] Percentage of trades generated from automated trading systems
[Discussion] Description of alert policy regarding timing and nature of public release of information
[Discussion] Description of policy to encourage or require listed companies to publicly disclose environmental, social, and governance (ESG) information
Managing Conflicts of Interest
Accounting Metrics

[Quantitative] Total amount of monetary losses as a result of legal proceedings associated with fraud, insider trading, anti-trust, anti-competitive behavior, market manipulation, malpractice, or other related financial laws of regulations

[Discussion] Discussion of processes for identifying and assessing conflicts of interest Managing Business Continuity & Technology Risks Accounting Metrics

[Quantitative] (1) Number of significant market disruptions and (2) duration of downtime

[Quantitative] (1) Number of data breaches, (2) percentage involving personally identifiable information (PII), (3) number of customers affected

[Discussion] Description of efforts to prevent technology errors, security breaches, and market disruptions In some embodiments, the analysis can be executed as described in, for example, FIG. 11A-B (below). In other embodiments, the analysis can be executed using AI models (e.g., word vectors) to classify source documents at word and/or sentence level. The classifications can then be used by the system in response to queries or as integrated context information accessible via the system research tools.

The results of the analysis on the source documents can be scored to determine relevance, accuracy and/or recall. In this example, the system achieved an F1 score of 0.64 or above, but also yielded strong Recall scores. Recall is calculated by taking the number of correct identifications divided by the number of times a set of text should have been tagged. As noted within the description above human assisted review can be used to test library performance on a given document, with teams to review for content to ensure nothing is missed. Various embodiments and library creation execution demonstrate that the system is able to identify material extra-financial signals, financial concepts, and direct users to that content which would not be returned by conventional search approaches.

Table XXI, below illustrates results obtained by the information platform when analyzing source documents that include unstructured text information to obtain information relevant to the user in financial topics and related to sustainability issues relevant to the user.

TABLE XXI

| Category Name | True Positive | False Negative | False Positive | Precision | Recall | F1 |
|---|---|---|---|---|---|---|
| Promoting Transparent & Efficient Capital Markets | 269 | 8 | 45 | 0.86 | 0.97 | 0.91* |
| Managing Conflicts of Interest | 81 | 17 | 75 | 0.52 | 0.83 | 0.64 |
| Managing Business Continuity & Technology Risks | 45 | 4 | 42 | 0.52 | 0.92 | 0.66 |
| Financial Metrics | 288 | 159 | 93 | 0.76 | 0.64 | 0.7 |

The F1 score highlighted with "*" is potentially misleading as approximately 80% of the matches were from the result of the term "GRI." However promoting the utilization of frameworks such as GRI to disclose material ESG information enhances market transparency. In this example, the presence of the term indicates content related to the promoting of transparent and efficient capital markets is present and the high-value shown is not of concern.

According to another aspect, the output from library creation and source document analysis can be leveraged by the various functions, components, and algorithms of the system. Various considerations are discussed to illustrate operation and, for example, why and how the system architecture organizes disclosure topics into themes, and how those themes are leveraged and/or proliferate on the platform. To provide an analogy, much like how a story can contain multiple storylines, plot details, and themes, any set up of unstructured text can also contain a bevy of interrelated elements and themes. Various embodiments of the system are configured to identify those interrelated elements and/or themes to create new functionality and/or opportunities to access that information (and, for example, without having to develop and/or execute new queries to hunt down that material).

Figure 13:
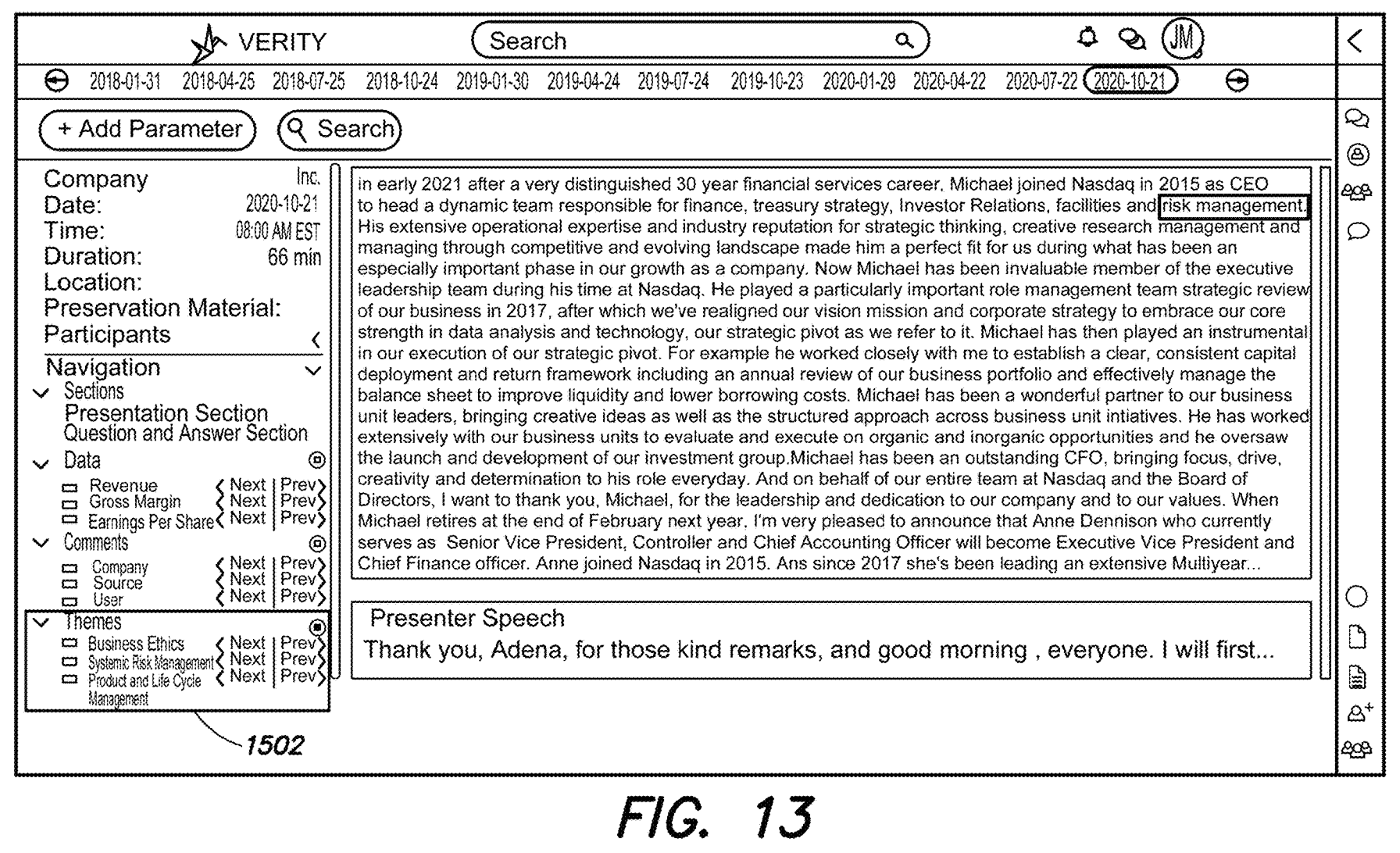

According to various embodiments, depending on the needs and intent of the user, analyzing the elements within the text can be just as challenging as understanding the prevailing themes contained therein. Starting with a domain in question "sustainable finance," very often "plot details" are anchored by (extra-) financial metrics (e.g., "we saw strong growth in Segment X with revenue increasing Y % q/q to $Z). In this example, the revenue metric is anchoring this "plot detail." The system analyzes the unstructured text to identify where (extra-) financial metrics are located within the text and then provides convenient navigation to these elements to any user via the system tools and displays. For example, the system can display where the financial metrics that anchor thematic information are present within a navigation panel of a document (as well as elsewhere on the platform). FIG. 13 illustrates an example navigation panel for documents.

The system is also configured to analyze how prevalent a given theme is within a set of text via a "major" and "minor" thematic classification. Generating this classification can facilitate user understanding without requiring any further search. For example, if a user is trying to research a given subject matter, knowing a theme is a "major theme" in a given set of text can make facilitating their research needs—interestingly, in some examples, the user no longer needs to read the document, but can rely on the major theme identified and text excerpts provided by the system. In other instances, a user may be interested in understanding whether a company's management team is addressing issues considered to be financially material to its industry by a standard-setting organization, such as SASB. Various embodiments of the system provide multiple options for understanding and interacting with such source/research material. For example, the tagging documents at the metric and "disclosure topic" level allows for more precise identification, however, displaying the results in this manner may result in a more fragmented user experience. Thus, architecting the data displayed in SASB's ~450 Disclosure Topics into a more manageable and intuitive 26 themes (SASB's General Issue Categories) greatly facilitates access and understanding of the information displayed. In various embodiments, the system does so without requiring the additional searching some conventional search systems require.

TABLE XXII

| Document | Major Theme | Minor Theme 1 | Minor Theme 2 | Minor Theme 3 |
| --- | --- | --- | --- | --- |
| Earnings Call Transcript Q3 2020 | None | None | None | None |
| Earnings Release Q3 2020 | None | None | None | None |
| 10-Q Q2 2020 | None | Promoting Transparent & Efficient Capital Markets | Managing Conflicts of Interest | Managing Business Continuity & Technology Risks |
| Sustainability Report 2019 | Promoting Transparent & Efficient Capital Markets | Managing Conflicts of Interest | Managing Business Continuity & Technology Risks | None |

According to one example, a transcript from an earnings call was analyzed by the system. In the example, none of the three sustainability themes reviewed were prevalent enough to rise to the level of major or minor themes—see table XXII. Thus, in this example, the document ("earnings call transcript") is not tagged within its contextual overlay (see box 1402 in FIG. 14) with a theme or routed to any of the platform's Thematic Hubs. That said, given SASB has determined that the underlying disclosure topics within these themes represent financially material issues for security and commodity exchange companies, the system identifies that a user could be interested in understanding whether any instances of these topics exist within the transcript. In further embodiments, the system is configured to display within the navigation panel of documents options to locate themes that have been determined to be financially material to a company's industry group (if they exist), regardless of whether it has risen to the level of major or minor theme in the analysis phase (see box 1502 "Themes" in FIG. 13). In further embodiments, the system is configured to provide users the ability to navigate to instances where financial metrics/concepts exist and areas where users have left comments or annotations. This flexibility enables users to locate key anchoring elements within a text, focus on a particular theme by only reviewing areas in source information where the theme appears, or to interact with other users, a relevant company or the source of the text on its content, for example, via collaborative tool integration. Also shown in Table XXII are the results of the example documents reviewed that produced matching major and minor themes.

According to various embodiments, the system is configured to allow for the application and incorporation of these techniques across numerous platform features, regardless of the original source of the unstructured text. For example, the signals identified within these documents will be routed throughout the platform to features that best enable a deeper understanding of the content. In still other embodiments, the machine learning tools employed can further develop based on newly ingested information sources, which in turn refines and enhances the quality of the respective platform features that leverage such analysis and/or linkage. For example, sidebar user recommendations, contextual overlay information, and engagement Intelligence (for engagements initiated on the platform or on a third-party website via an engagement widget), can leverage the above functionality.

Figure 32A:
Figure 32B:
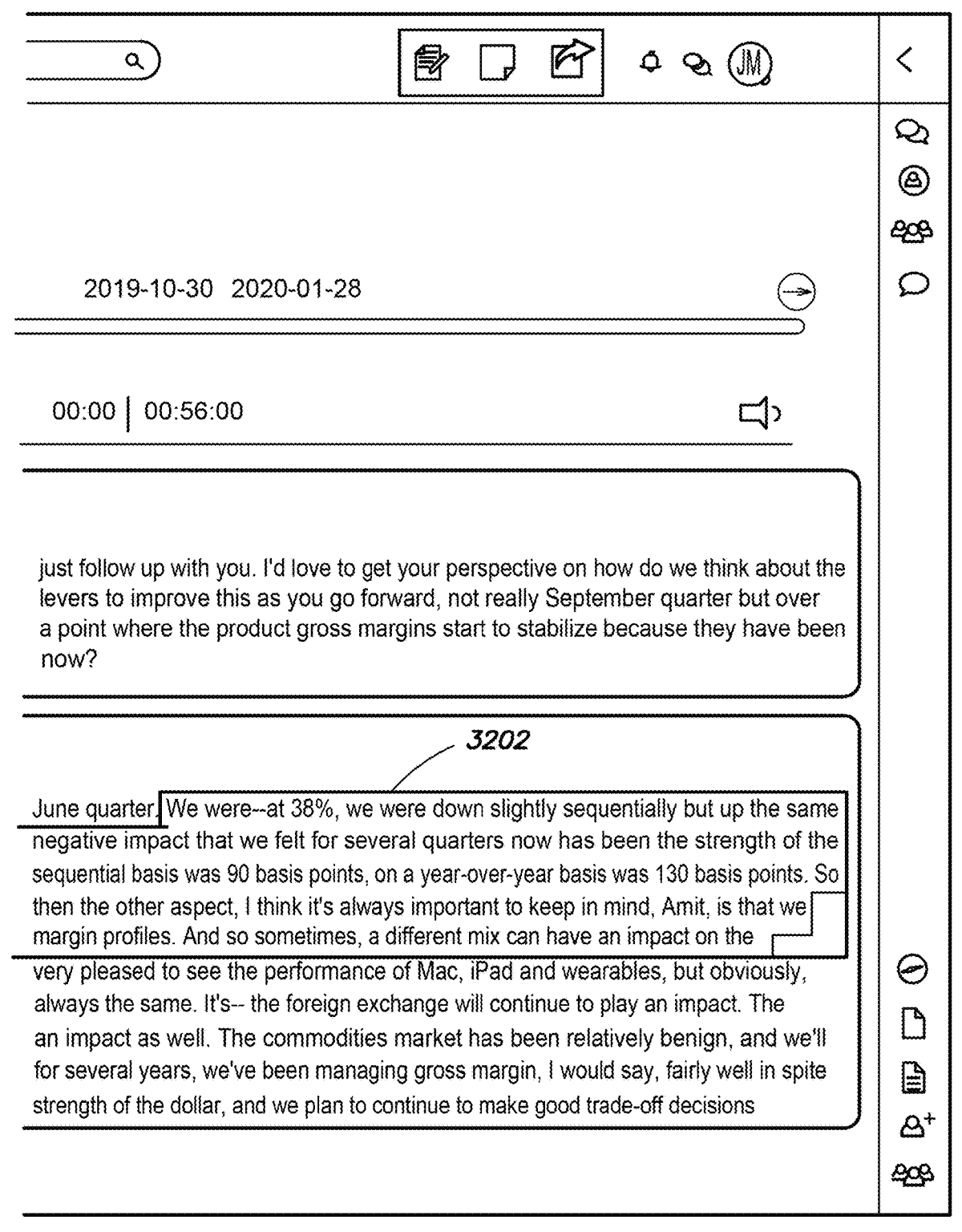

Various embodiments are configured to collect and leverage information on finance and sustainability, and deliver the information to a community of users that links actionable research into effective collaboration tools and that furthers decision-making. For example, embodiments of the information platform provide easily searchable financial and sustainability information delivered within social analytical tools to provide both historical and forward-looking insights for improved understanding. According to one embodiment, users are given access to holistic research analysis tools. In some examples, the holistic research analysis tools include at least a quantitative time series analysis tool (e.g., FIG. 3), a qualitative comparative analysis tool (e.g., screen captures shown in FIG. 21, FIG. 32A-B, etc.), and a document analysis tool (e.g., FIG. 13). While independently accessible, the platform enables the user to move between the tools (and for example, respective data types) while maintaining their research workspace. Responsive to the transitions the platform enables users to transform the subject of the analysis to the data type applicable to the tool in use, while preserving the state of their research in their workspace.

For example, if a user is reviewing a punchcard (e.g., FIG. 15) for a company, the system enables the user to add punchcard objects for other companies to compare how the companies perform in a given area (e.g., disclosure topic, theme, financial metric, etc.). In further example, if the user is viewing a punchcard for Apple Inc's 'Estimated Financial Impact from Climate Risk' (which can include a text-based explanation of the data point), the user can add the same card (e.g., the card covering the same disclosure topic, theme, and/or metric) for Cisco Systems, the user interface now renders a comparison of how the companies perform against each other in that space. The user can then transition to "Time Series Analysis" via the interface button resulting in the platform making a workspace shift to a time series chart displaying how the numerical value for 'Estimated Financial Impact from Climate Risk' for Apple Inc and Cisco Systems has trended over time. In this example, the user never has to develop their own query to find and/or access the extended information, rather user identifies, for example, a disclosure topic for a company that they are interested in, adds a new company punchcard (which the system provides that as a match to the current topic) for side by side comparison of that punchcard. The platform can also preserve the information from both punchcards in the transition to a time series analysis of the performance of both companies in the time series view (e.g., FIG. 3, FIG. 22, etc.).

While in the time series view, the user can add companies for additional comparison and review. For example, the user could then add HP Inc and click the Qualitative Comparative Analysis button to rigger the platform to execute a transition of the user's workspace to show the punchcards for the "Estimated Financial Impact from Climate Risk" for Apple Inc, Cisco Systems, and HP Inc.

According to various embodiments, the platform integrates a quantitative, time series tool with comment/contextual overlay features, and further community engagement tools. In some embodiments, the platform provides additional tools including a document analysis tool for drilling into source information while providing engagement and contextual overlay information and displays. The document analysis tools can include a rule-based interface that also provides access to community engagement information.

Figure 15:
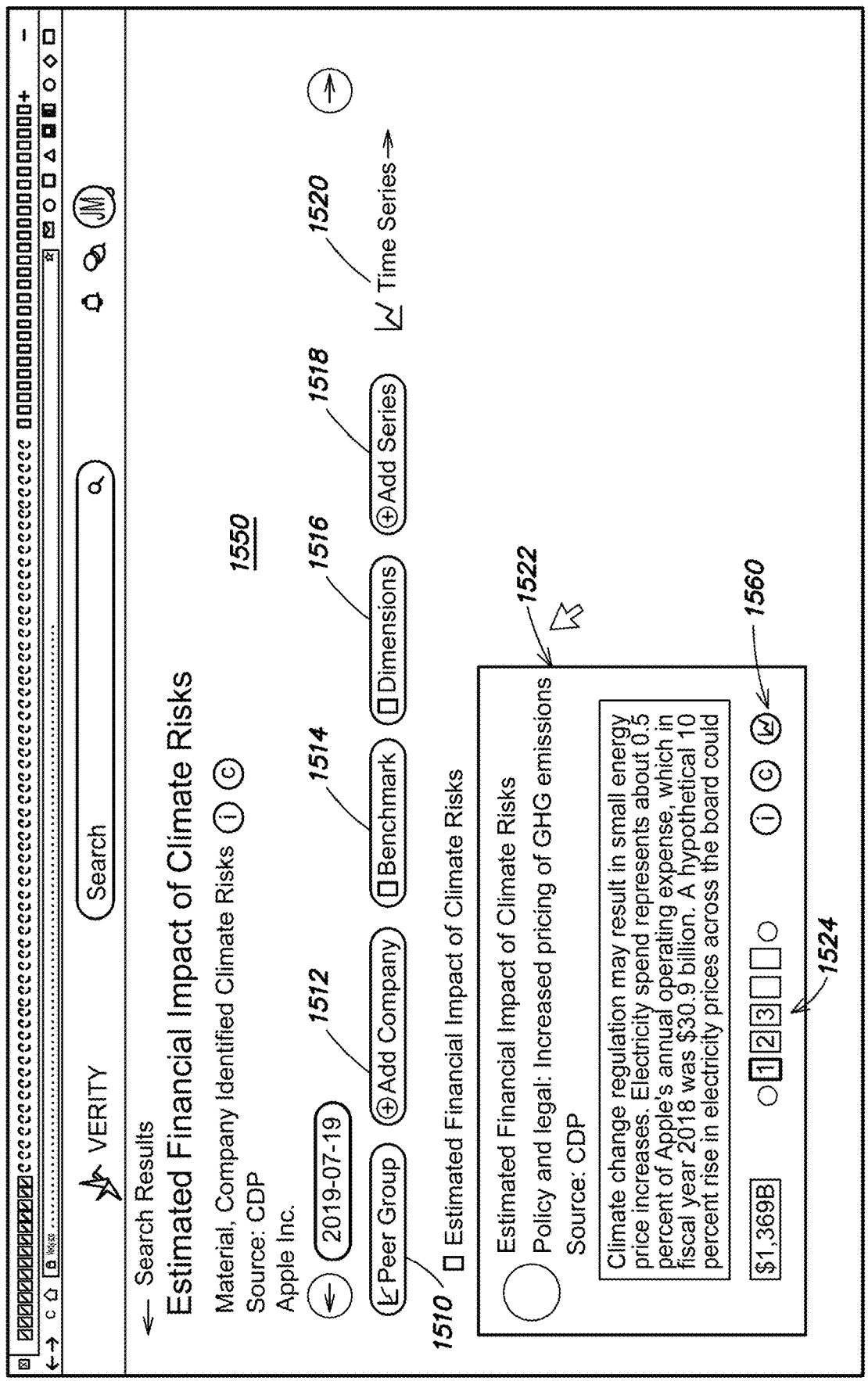
FIG. 15 is an example screen shot of a punchcard display, according to one embodiment.

In further embodiments, the platform includes a qualitative comparative analysis tool (FIG. 21, FIGS. 32A-B, etc.) that is configured to enable user to compare qualitative data series. In some examples, the user is able to set their context for qualitative analysis based on searches performed, disclosure topics selected, theme selected, metric selected, among other examples. Once the user sets their context (e.g., an originally searched company) the user can compare the visualized qualitative information against, for example, other companies, peer groups (e.g., peer groups can be defined based on the user's current context (e.g., based one or more selected companies the system can select corporate peers, based on a selected disclosure topics the system can select peers in an industry segment with information linked to the disclose topic, and similarly for theme, etc.), historical values, and/or benchmarks (e.g., industry established benchmarks (e.g., S&P500, Russel 3000, MSCI ACWI, etc.) and can also display benchmark sectors (e.g., S&P500 Energy Sector, S&P500 Oil Services Industry, etc.). In some examples, text-based information collections are displayed on the platform in the form of easy to digest "punchcard" objects. For example, punchcards can be displayed in in grid fashion with data types in columns and companies in rows. FIG. 15 illustrates a screen capture of a qualitative view showing a punchcard at 1522.

According to some embodiments, the platform displays various punchcards associated with the available dates for the originally searched company, and any associated data series are displayed along an easy to access timeline. In further example, contextual overlay and comment buttons are available for the originally searched for company and data series (FIG. 15 e.g., 1550). More focused contextual overlay operations are also made available on the system by, for example, 1560 which provides the contextual overlay, comment button and a time series button, functionality for the data point represented on the punchcard. In various embodiments, the feature in 1560 simplifies navigation for the user, for example, when there are twelve punchcards on the screen and the user wants to focus on just one. In other example, the options at 1560 further allow the user to isolate the punchcard quantitatively—and they can click the time series button on the card and view just that data series on the time series analysis as opposed to clicking the link 1520 which will convert the entire workspace currently visualized to a quantitative view.

In further embodiments, the platform displays a plurality of menu items to allow the user to manipulate the information displayed in the workspace and qualitative view. As shown in FIG. 15, a user is presented functions for:

1510 Peer Group—click the button to view company peers for the originally searched for company. The results are filtered to only show companies that are reporting this value. In some examples, non-reporting companies are visible, but grayed out.

1512 Add Company—search for any company and an associated punchcard, if available.

1514 Benchmark—select from available benchmarks for the originally searched for company.

1516 Dimensions—select a punchcard for a suggested, related data type and display it in the workspace. In some embodiments, the platform is configured to generate suggestions based on matching a user's context (e.g., discussion topic to other companies in the same or similar field, related comments or collaborative data linked to a current disclosure topic, etc.). The interface can include displays for Supplemental Research items within the contextual overlay.

1518 Add Series—search for an available data series and add it.

1520 Time Series—trigger the platform to transform the workspace into a time series analysis (e.g., transition to a view similar to FIG. 3).

Figure 36:
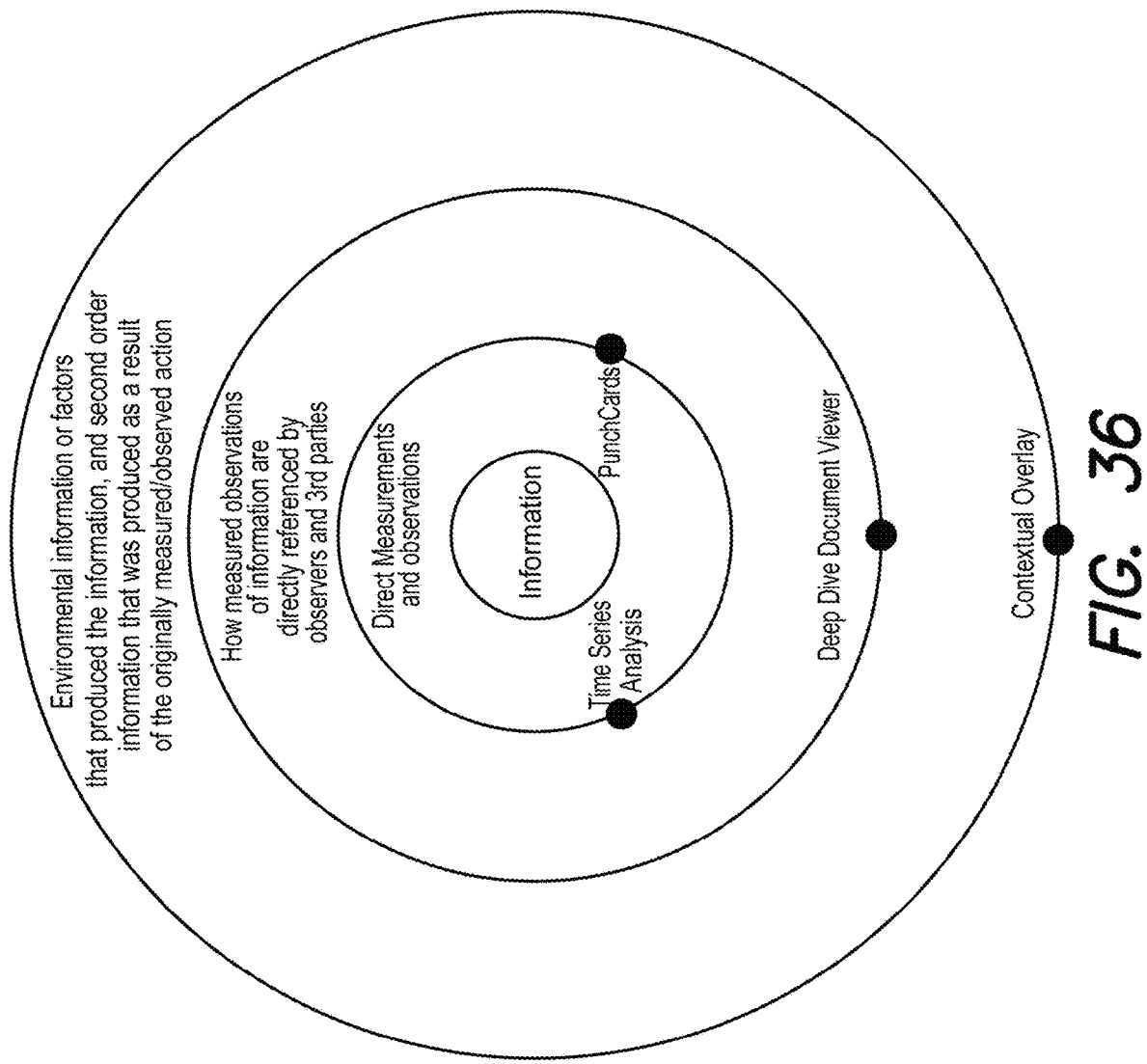
FIG. 36 is a logical architecture for an information hierarchy, according to one embodiment.

According to various embodiments, the platform is configured to generate punchcards based on a universal data template that aligns information around "concepts"/data series. For example, those concepts can be expressed quantitatively, qualitatively or through context-rich information. In various embodiments, the relationship of that information is organized within the template largely based upon a singular rule: "what is the immediacy of the information to the measurement/observation for the concept in question?" FIG. 36 illustrates an information hierarchy for presenting and managing user interaction with information in the guided search environment. In various embodiments, the architecture and search tools implemented on the system enable more efficient searching, lookup, and improved understanding over various conventional search systems. According to one embodiment, the result provides at least one or more of the following optimized system execution features: reduces the number of queries required to execute on the system, reduces the volume of data that is returned, reduces inclusion of bad information (e.g., matching but irrelevant data), improves network efficiency by reducing data requirement, etc.

Figure 35A:
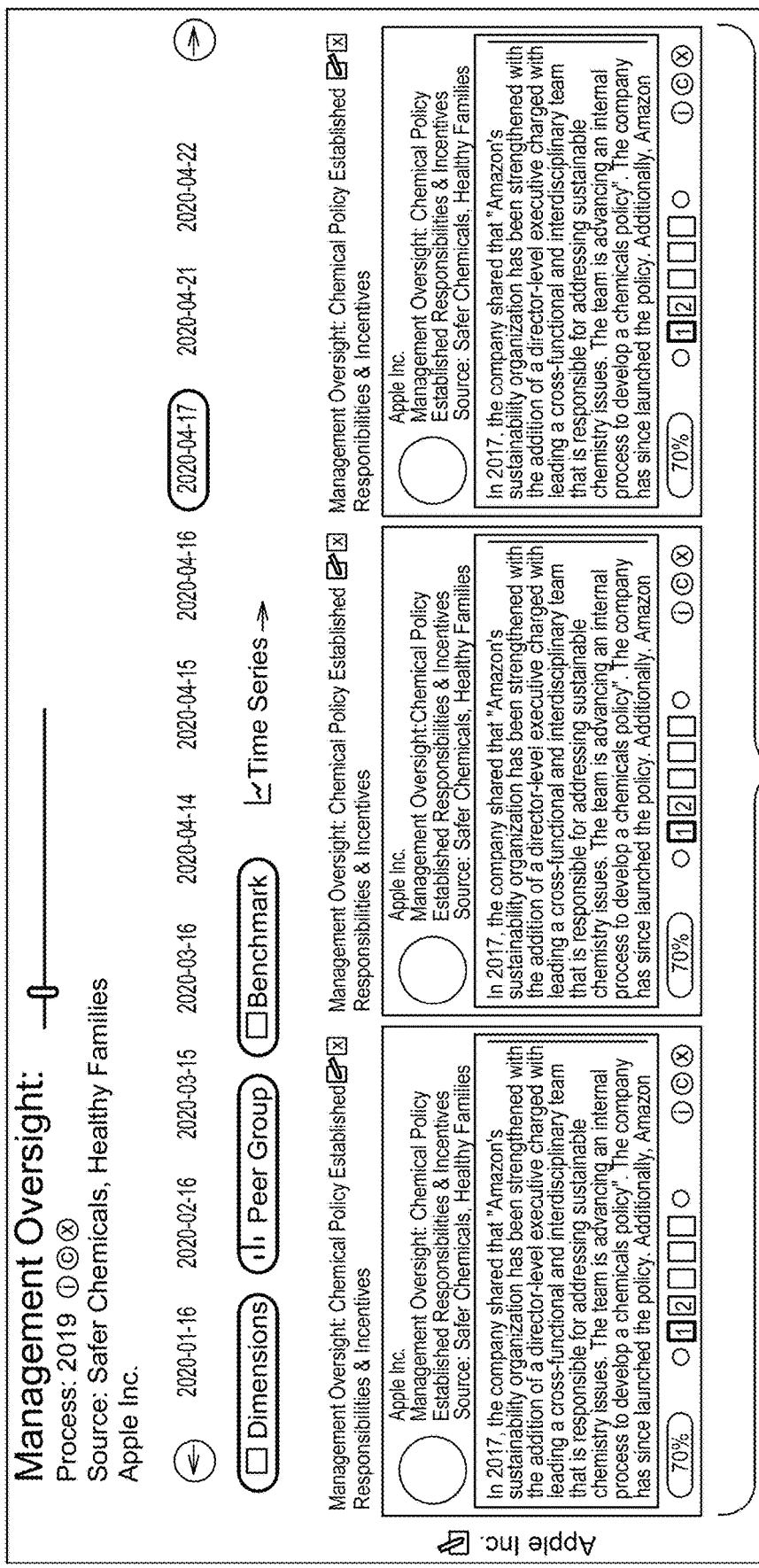
Figure 35B:
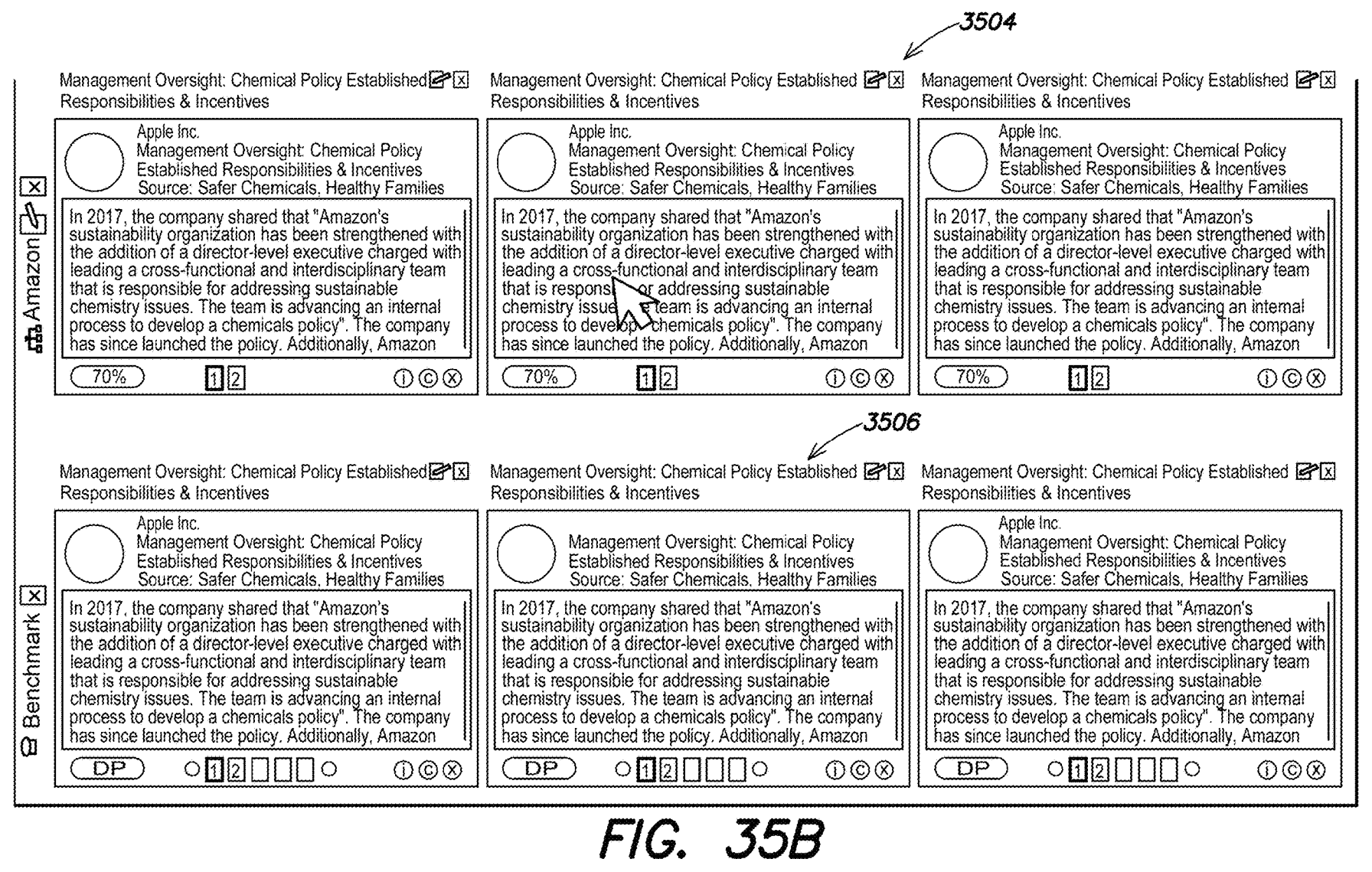

In various embodiments, punchcard objects shown in the user interface can be configured to aggregate various source information documents and/or excerpts from source information documents. For example, shown at 1524, is an integrated number series display. Responsive to selection, the user can trigger the information platform to transition between various source information documents and/or excerpts from source information documents that are organized by the "estimated financial impact of climate risk" disclosure topic. Respective punchcards can likewise organize source information documents and/or excerpts to provide a navigable interface object that streamlines information access according to a disclosure topic. To further facilitate information access and understanding (and even direct comparison of underlying source information), users can add punchcards from other companies (e.g., 1512) or add punchcards on additional topics and/or themes. Shown in FIG. 35 is a grid display of punchcards related to an original searched company in row 3502, and added company in row 3504, and a benchmark in row 3506. The respective punchcards can organize information on discreet disclosure topics or subject matter. As discussed above, the respective cards can also include interface elements for navigating between source information organized into the respective punchcard.

Figure 16:
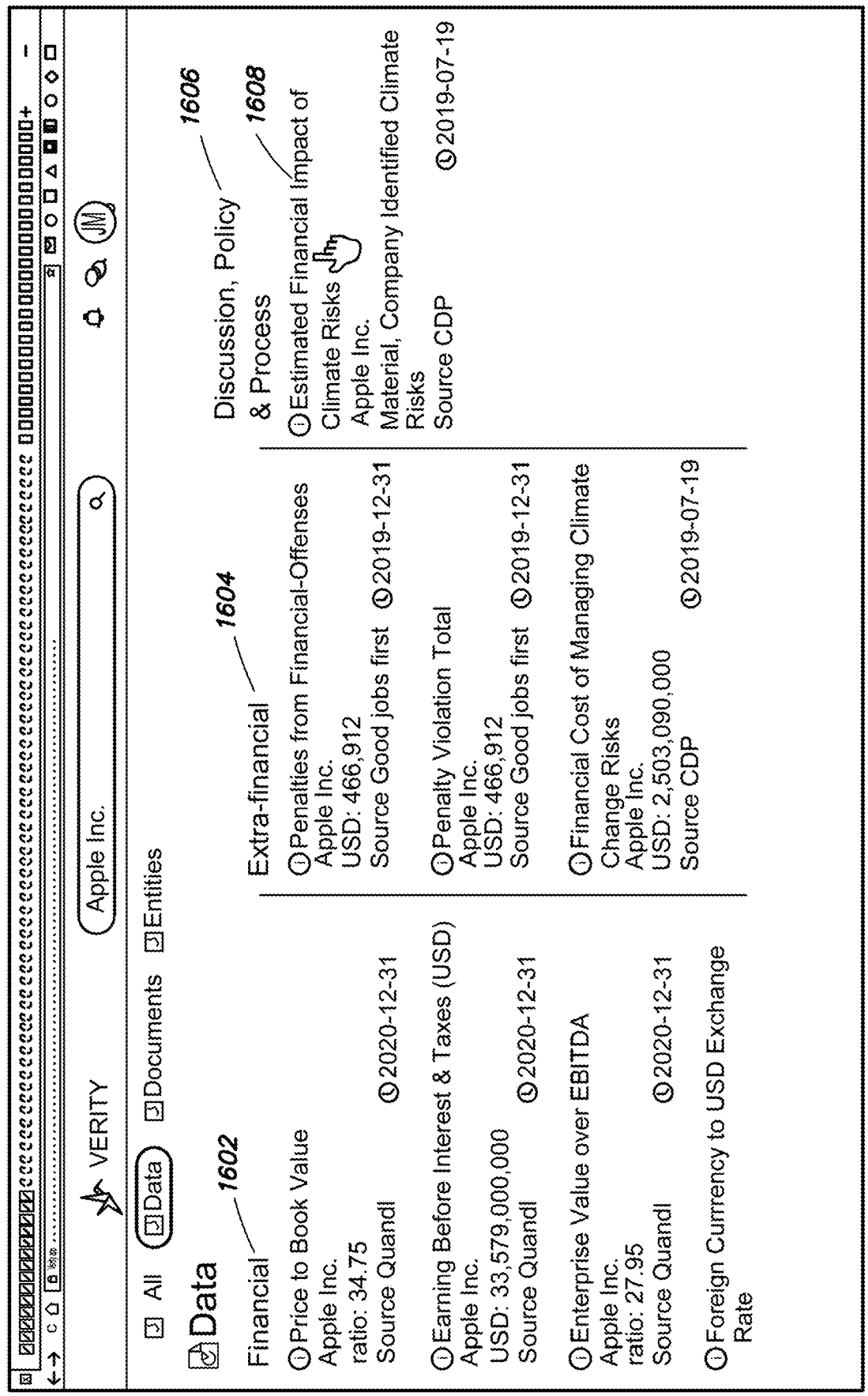
FIG. 16 is an example screen shot of a search result view, according to one embodiment.

According to various embodiments, the information platform provides access to a search bar and/or display. The search operation is configured permit a user to create a new workspace on an identified company or selected results. In some examples, within each view on the platform, where relevant, the user has quick access to contextual overlay and comments to quickly "surface" key information to help determine whether they wish to "dive" into deeper analysis. FIG. 16 shown an example screen capture of an initial search screen that can be display upon access to the information platform.

Shown in FIG. 16 is a data view display architected to display financial 1602, extra-financial data 1604 (including, for example, sustainability information) Data, and policy & process data 1606 (e.g., qualitative data). Upon clicking on a policy & Process result (e.g., 1608), the user is presented with a company policy/process/internal control (and other self-contained "chunks" of information) on the subject matter of the clicked link. The platform is configured to capturing and organize these self-contained pieces of information and present them as "punchcards" (modeled after punchcards that were used to "program" old computers). In this view (see e.g., FIG. 15), users can review the card for a "nugget" of information on one particular topic (e.g., disclosure topic, theme, metric, etc.) or add a company's peers to compare processes or issues between different companies. Users can also add additional levels so that they see how a particular process/internal control/issue is handled/managed throughout a company. Users can also add "best practice" punchcards to compare a company's process/mechanism/issue to an established best practice/standard. In some embodiments, the platform is configured to define a standard for a "qualitative data point" that merges the contextual detail available in text with the flexibility and capacity for manipulation found in quantitative/numerical/financial analysis. In various embodiments, the user interface allows for the multiple types of analysis found and seamless transition between them.

According to various embodiments, the system can manage a user's workspace and search operation to facilitate review and interactions with company information, and for example, financial information related to sustainability initiatives. According to some embodiments, the platform integrates an engagement library to improve user access to information and, for example, to automatically surface information relevant to a user's review and/or interest. For example, the engagement library is configured to provide a review location for users that stores all of the engagement records for the user and that can also be used by users to discover new engagements (e.g., searched for or that the system determines they may wish to participate in, among other examples). Users can filter records by type, stage, theme, sector and industry, or just search for a company name to see if there are any relevant engagements.

In further embodiments, the platform stores and manages engagement records configured to provide evidence of the existence of a collective engagement and company/investor/user participation in it. Each record has a permanent URL and can be accessed via the Engagement Library or via a 3rd party search engine such as Google. If accessed via a 3rd party search engine, the visitor can only access that single record. If accessed via the platform, the user is free to browse through all of the engagement records. In various examples, each engagement record contains the following information: collective engagement name, type, permanent url, overview, purpose, engagement visibility, engagement status, relevant themes, stage, participant profile, relevant organizations, documents from the engagement attached by the moderators, participants names and observer names. Some embodiments can include an engagement management tool for creating or participating in various engagements that can be designated public and available on the platform or private for access-controlled engagements. The engagement library can be used to access existing or historical engagements, among other options.

Example Information Platform Improvements

According to various aspects, the information platform achieves significant advances over the current state of the art. Various embodiments enable a community aspect to the information platform not found in other approaches. The community aspect utilizes social elements to inject additional user perspectives and guidance into any research process. The inventors have realized that in financial research spaces bias invades the analytics and/or research process currently used, and the community aspect allows for platform users to avoid such issues. Further, integration of community/social aspects into embodiments of the information platform enables "experts" to guide users to new information or a given answer more efficiently than a solitary user research experience. Various traditional research tools simply do not integrate/offer social guidance as an option to users in the research process.

Traditionally, investment research has been largely derived from information found within the income statement, balance sheet and cash flow statements. This information is largely numeric in nature and used within financial ratios, algorithms and projections. Recognizing the rise in sustainable investing the existing financial research tools looked at the subject matter of sustainability investing from the very same lens, assigning number scores or letter grades to a company's environmental processes (for example) or other issues applicable to sustainable investing. The inventors have realized that many problems result, number or letter grades, while maybe more efficient to rank, do not possess decipherable information and are not particularly helpful in truly understanding the subject matter. If an investor truly wants to pursue their fiduciary responsibility and perform bottom's up research on a company and their sustainability practices, very often they require non-numeric contextual information so they can better project (for example) how a company's chemical handling processes increase/decrease the risk of legal action against the company (and thus better risk the investment). Various embodiments, of the information platform differs from such conventional tools, for example, in that the platform integrates non-numeric responses along with traditional numeric financial information, and in further example, also provides an overlay with significant contextual information on every numeric and non-numeric data item.

According to another aspect, to truly transition to a stakeholder economy requires the perspectives of stakeholders to be considered within capital allocation decisions. Embodiments of the information platform enable collaboration with those stakeholders to help map their research to frameworks that are conducive to financial analysis. The platform can also ensure experts from those organizations are available to engage with users on the platform. Such implementation differs from traditional research tools in that the sources of information traditionally available to users are largely derived from companies and sell side "Wall St" research shops. Because the stakeholders have traditionally been "outside" of the financial sector, their input is often ignored in conventional approaches. Thus, various conventional systems fail to properly incorporate the perspectives of stakeholders in capital allocation. The information platform can provide direct engagement between stakeholders and organizations/individuals. For example, the platform provides tools to do so at-scale (e.g., via data comments, and contextual overlay, among other examples) as well as in more intimate settings (e.g., by defining and executing collective engagements or consultations). The integrations of first-hand perspectives and community information allows for more informed decision making and capital allocations.

Figure 7:
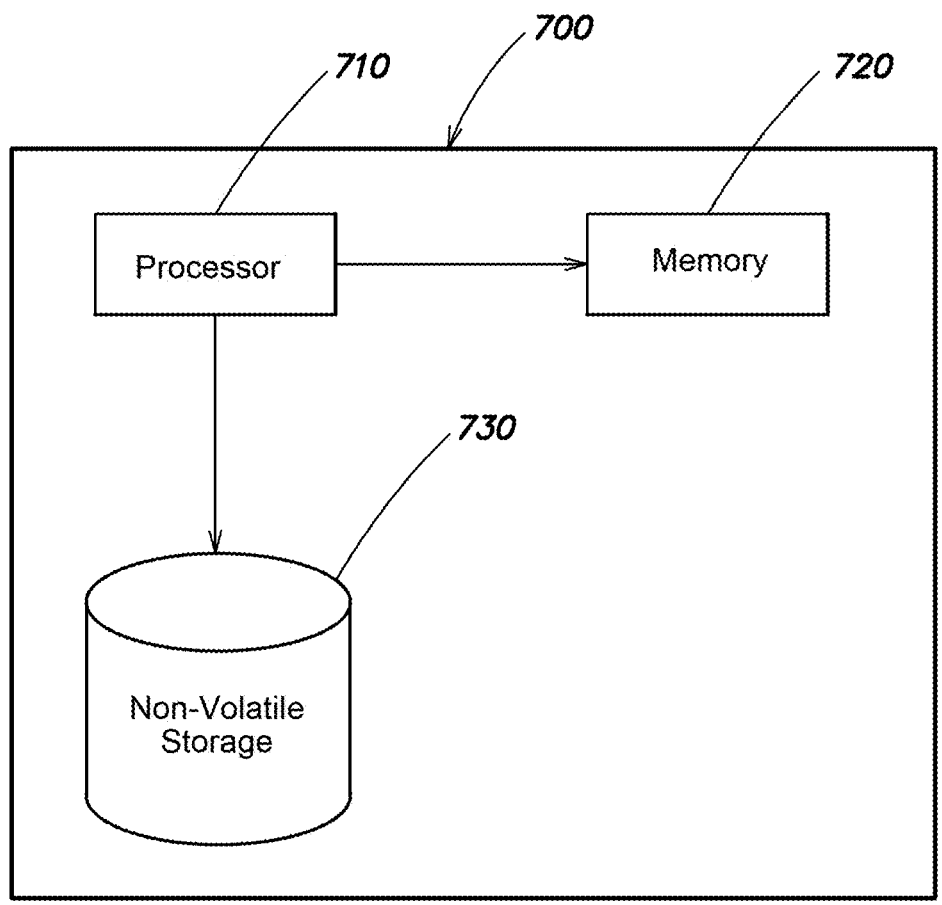
FIG. 7 is a block diagram of an example a distributed system, according to some embodiments.

An illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor 710 may control writing data to and reading data from the memory 720 and the non-volatile storage device 730 in any suitable manner. To perform any of the functionality described herein, the processor 710 may execute one or more processor-executable instructions stored in one or more non-transitory computer-readable storage media (e.g., the memory 720), which may serve as non-transitory computer-readable storage media storing processor-executable instructions for execution by the processor 710.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes (e.g., search process 900), of which examples have been provided. The acts performed as part of each process (e.g., search, integration of contextual overlay, generation of comments, display of qualitative tools, engagement tools, quantitative tools, etc.) may be ordered in any suitable way. Accordingly, embodiments may be constructed in which acts are performed in an order different than illustrated, which may include performing some acts simultaneously, even though shown as sequential acts in illustrative embodiments.

Data Source Integration Examples

Example embodiments of an information platform can include a variety of functions, management options, and operations to support, for example, finance and sustainability review and analysis. For example, various aspects provide for improved search and comprehension in a manner that is both unique and superior to existing implementations. Search in its current iteration simply delivers results to the user, the results can be clicked on and the user follows the link to a different website. Each website that is visited has its own formatting structure with information organized in its own way and requires the user to quickly orient and familiarize themselves in order to obtain the information they seek. On various embodiments of the information platform, before clicking on a result the user can click on the contextual overlay or comments to received critical contextual information from domain experts and then can choose to click on the result. The system delivers information and experience to the user such that a person is far more likely to understand information presented to them—and at a faster rate—as they already know the context for the information. Further, since system results are delivered in the same format based upon information type the user spends less time orienting themselves.

Various implementations of an information platform can support any one or more discussed functions, as well as any combination of the discussed functions, and can also include any combination of the following embodiments and/or examples and respective features described.

According to one embodiment, the information platform can support a variety of data integration sources, which can be processed by artificial intelligence ("AI") to improve accessibility and searchability on the system. The AI further improves introduction of data source into various displays on the platform while at the same time provide contextual information that improves understand. In some embodiments, a new data source for integration includes live audio. For example, live audio integration is available for collaborations, meetings, and/or break outs, which can include community overlay and access via the sidebar to provide in current view context information Any audio (e.g., meeting transcripts, meeting recordings, announcements, etc., can be linked to various system data points and made accessible and/or viewable in context via the sidebar. In some examples, AI processes are configured to analyze live audio for content and theme identification, to enable access to relevant live audio in various area of the information platform.

Various embodiments are configured to generate transcripts of any live audio and/or video presentation made on the platform (e.g., via engagements, etc.), which can be analyzed and tagged by AI models, and then integrated into the platform for search (e.g., depending on privacy settings).

Augmented Search and Data Presentation Examples

Various embodiments include augmented organization listings for displayed search results (See FIG. 17). FIG. 17 shows an example screen capture of the search interface that can be shown as an initial access screen on the information platform. For example, coalitions are configured to be searchable and viewable in an "entities" (e.g., 1808, FIG. 18) column of the search display. Shown in FIG. 18 is an example screen capture of a user interface for displaying and organizing search results for a user. FIG. 18 includes an organization of results into data results (1804), documents results (e.g. 1806), entity results (e.g. 1808), among other options. For example, output or search results can be shown with other organizations including data, documents, process and policies information (e.g. shown in FIG. 16).

Figure 19:
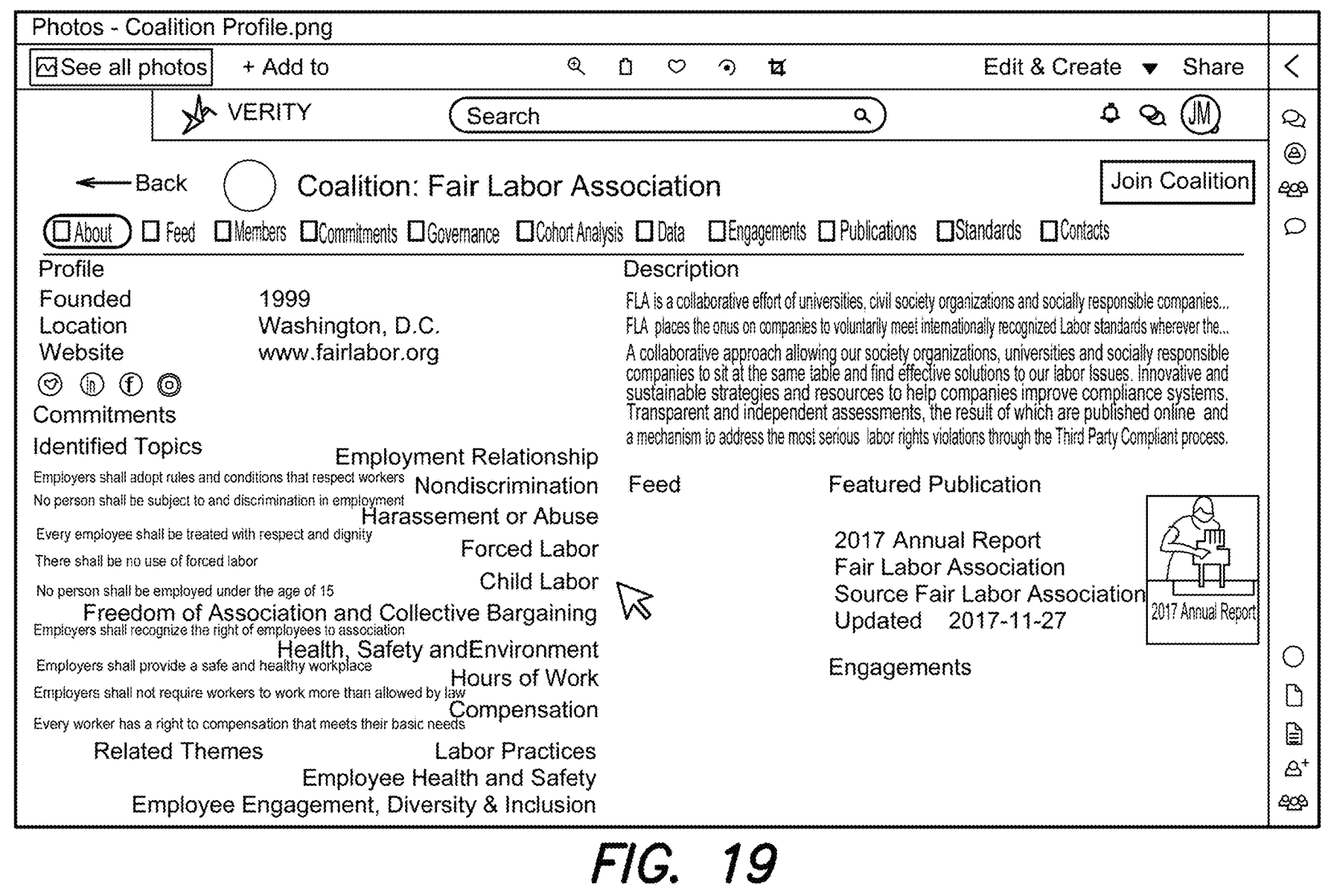

According to one embodiment, coalitions can include logical groupings, for example, of various entities, which join together on a specific topic or subject. FIG. 19 includes an example screen capture of an example coalition. According to some embodiments, the integration of coalitions allowed the information platform to present information on what commitments coalitions may require and can do so in the context of searching for information on specific entities. This type of information and level of integration in contextual review is unavailable or even unknown in some conventional systems.

Figure 20:
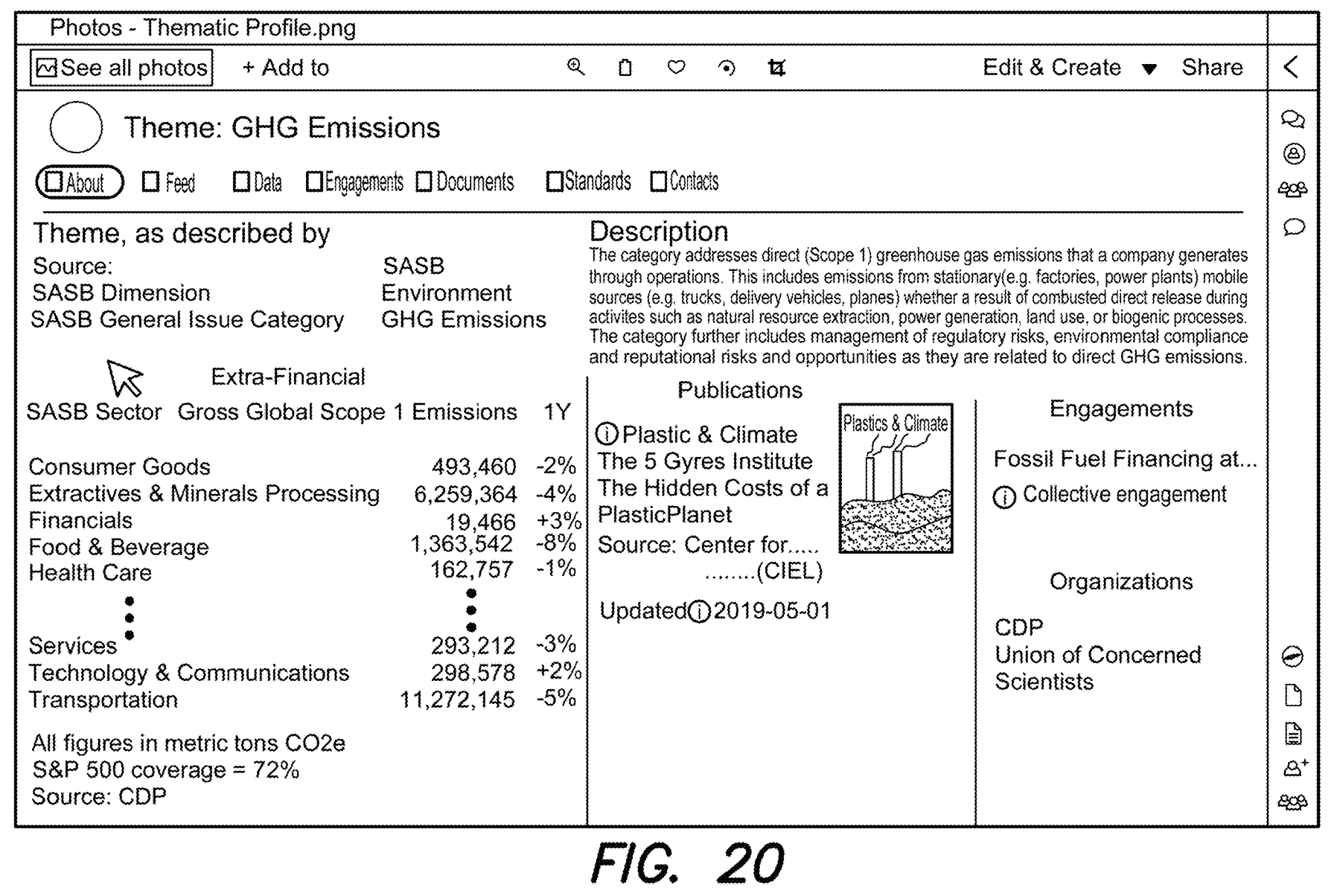

In further embodiments, search operations on the information platform can be configured to surface "thematic hubs." According to various embodiments, thematic hubs provide a central information collection point that can be based on specific investment/research topics. FIG. 20 includes an example screen capture of a thematic hub, and illustrates an example of tab based spokes that are navigable to various information sources that are relevant to understanding a particular theme. For example, the thematic hub can organize and group a variety of thematic source information. In one example, a main "about" page can provide a summary view of a selected theme— "GHG Emissions" and link to various additional information sources. For example, theme feed data, source data, engagements, documents, standards, and contacts, among other options. Additionally, engagements can also be displayed and accessible separately with any of the displayed organizations. In some embodiments, the listed organization can be founding members, or coalitions dedicated to a respective theme. Each option is also configured to link a user the respective engagement and/or organization while in the context of the thematic hub.

According to some embodiments, thematic hubs as a search option is enabled on the information platform based on artificial intelligence models that review and organize data sources, process the context of the data source (e.g., documents, publications, news feed, advertisement, etc.) and curate the respective data sources with theme information. The system can link such data sources based on them and make the collection a searchable output based on a thematic hub logical entity. In some examples, the AI models are configured to organize and link data sources according to the Sustainability Accounting Standards Board "SASB" framework. For example, AI models are trains to tag unstructured text based on word matching, sentence matching, and/or context matching with SASB framework definitions. As part of tagging various word substitutions can be employed, as well as supervised learning techniques (e.g., experts can provide examples or word extensions to be used by the machine learning processes). In further examples, the AI models are trained based on the operation of prior AI modeling and can be configured to recognize and cluster documents, and other data sources into AI generated themes.

According to various embodiments, AI clustering of data sources can be leveraged to include integration into a news feed of thematically organized data sources. In further embodiments, the information platform is configured to organize, manage, and translate large volumes of information that are sourced in unfamiliar formats into summarized views, with integrated context sources (e.g., via the sidebar, comment icon, notes icons, etc.) developed, at least in part by the review community, and tailored presentations that allow even novice users to consume huge volumes of information but in a context and format that they can readily understand. In further embodiments, the presentation/translation operations are bi-directional so that each user type or stakeholder type can see and consume data sources according to a format that they are most comfortable with and readily understand.

Figure 21:
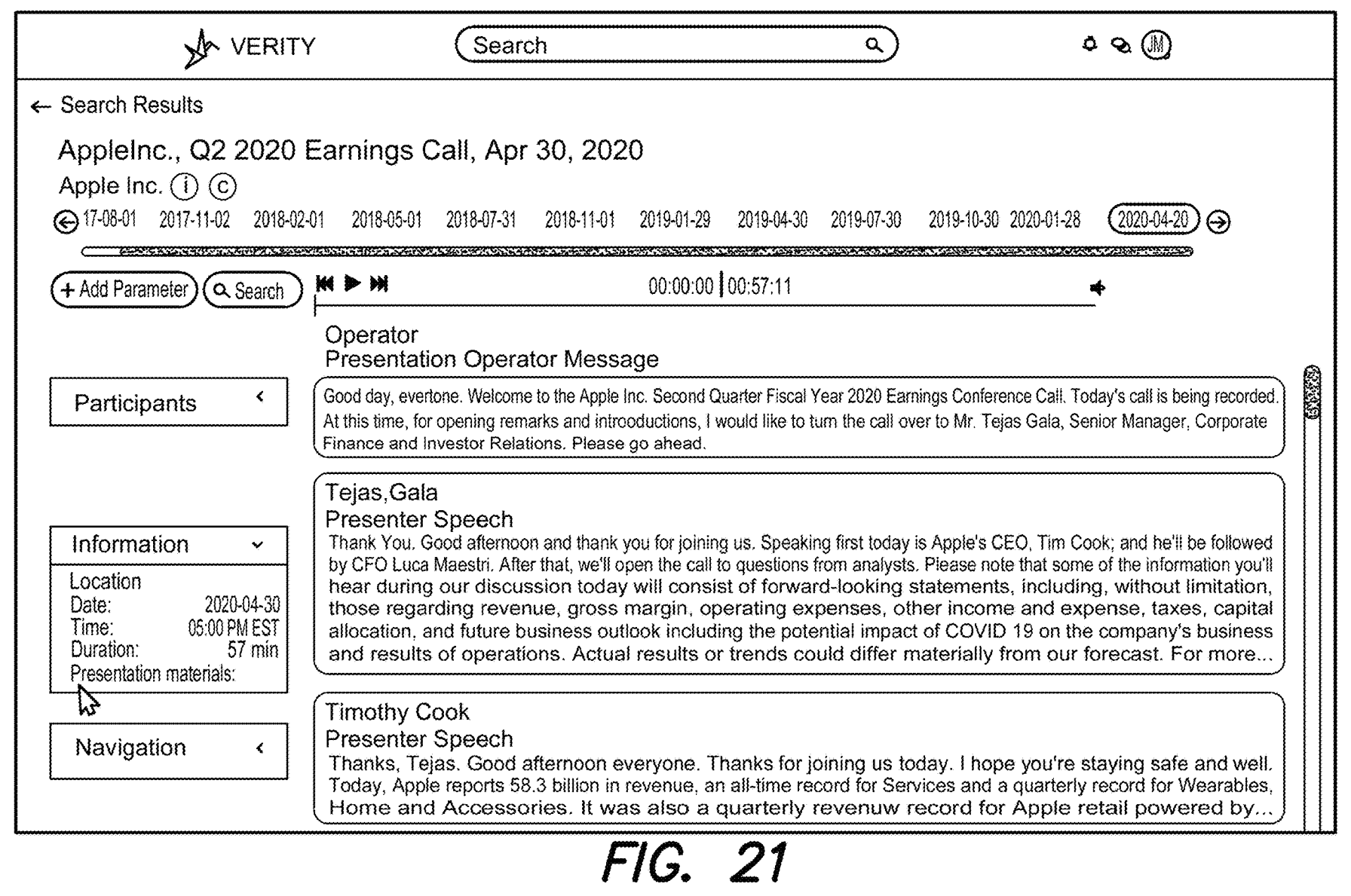

According to another aspect, as each data source is ingested on the system (e.g., transcript data) each data source is tagged and/or clustered by the AI tools, and each transcript becomes inter-linked with various relevant thematic hubs, are searchable via the search tool, and accessible in a company or entity view associated with the transcript. According to one embodiment, FIG. 21 illustrates an example transcript view access via a company visualization. The transcript view automatically organizes the relevant transcript into a timeline visualization and tags concepts and/or themes (e.g., via AI analysis) to make each transcript itself searchable, as well searchable on the concepts, themes, and/or context contained therein. In some embodiments, AI analysis can be configured to specially tag commitments made in various transcripts (e.g., will achieve X % reduction in GHG by deadline, will increase diversity on governing board, etc.). Such commitments and requirements become a source of evaluation, both in terms of aligned goals, but also based on whether a company/entity meets those stated goals. Various embodiments of the system enable AI identification, and then capture and clustering of such statements regardless of the data source. For example, by identifying such statements in whatever context and organizing them, the system enables identification and oversight that cannot be provided by various other conventional systems. In addition, the incorporation of social feedback into these groupings provide the ability to immediately understand and appreciate the information presented. For example, having both "insider" and "outsider" information presented in the context of the visualization limits the requirement to search and thus the processing associated with having to find related information in disparate sources and contexts.

Figure 22:
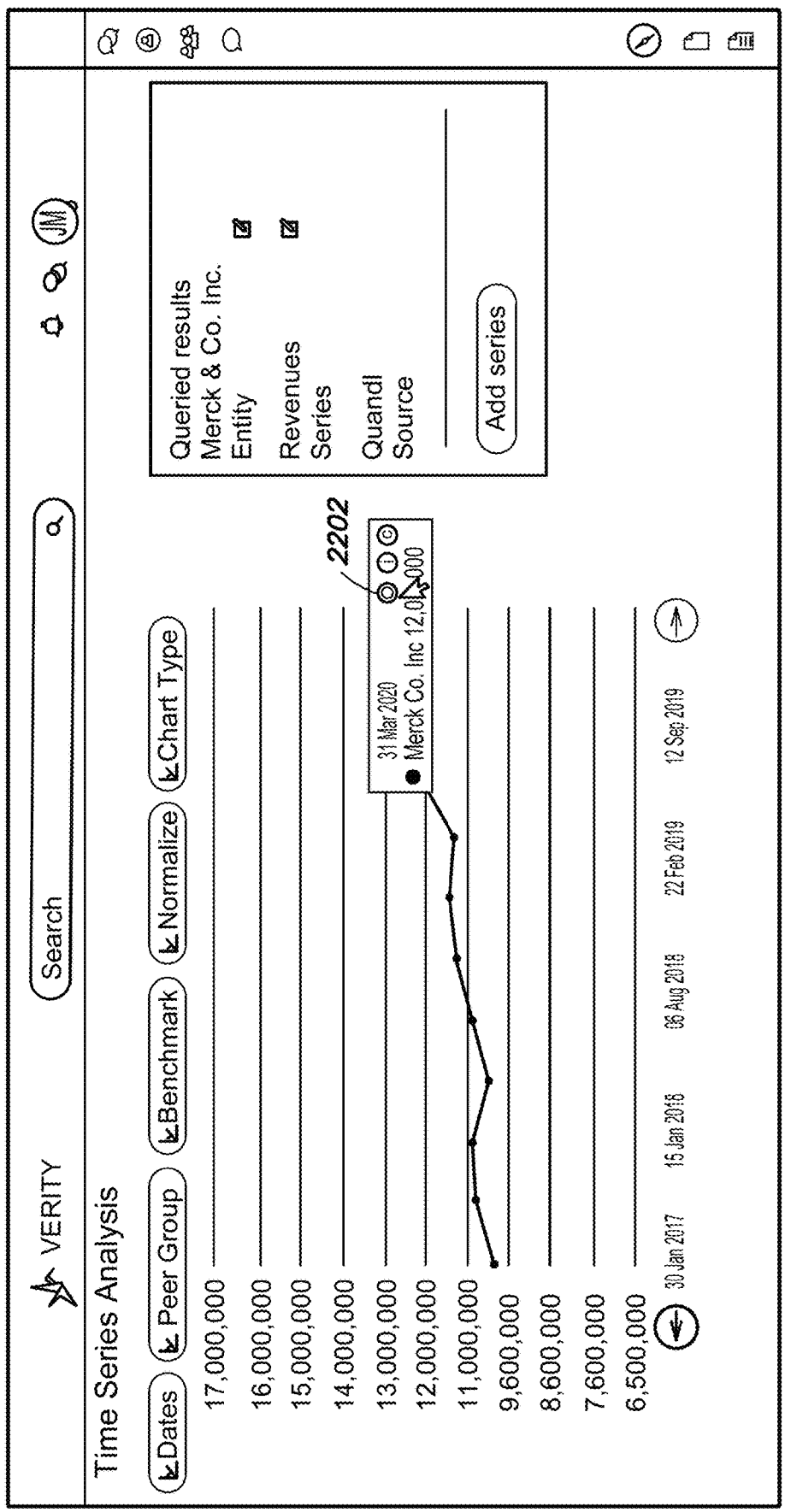

FIG. 22 illustrates an example screen capture of a user interface shown by the information platform configured to integrate news feed data as a context selection (e.g., open circle—at 2202) that is visualized upon hovering over a user interface display of data (e.g., graphical visualization of time series data). For example, the news feed makes news stories relevant to the data point accessible via a UI selection, and that eliminate the need to execute search operations to find the relevant data and/or context.

FIG. 23 illustrates an example visualization of integration of thematic information (e.g., built by AI models) that is accessible via the "data" tab selection in the main search UI, and via selection of one of the categories of display information (e.g., extra-financial). FIG. 24 illustrates an example screen capture of a user interface configured to display drill in information options. For example, the user interface is configured to provide users the option to access further detail on any displayed data. In various embodiments, the drill in feature on the information platform connects various data sources and eliminates the need to search for relevant data from disparate data sources. In further example, the display provides information on how data sources and decision points trend over time. For example, the system displays information on the various contexts and how the company treats them over time (e.g., water utilization, resource consumption, climate issues, employee incentive tied to the forgoing, deforestation, data security, data privacy, etc.)

Interchange Tool Examples

According to further embodiments, a refined set of search functionality can be predicated on interchange information/ engagement information. In various embodiments, the interchange information is a portal into engagement, which can be based on personal information/interaction, company engagements, thematic engagement, etc. In some examples, the interchange tool is managed as a social hub for various users. According to some embodiments, the social hub can be provided as an interchange tool, and in other embodiments, as an engagement tool, and the organization and respective display may vary. However, the functionality provided in such social hubs is not exclusive and any function or display executed in one can be implemented and executed in other respective environments.

Various embodiments of the information platform include scheduling tools for engagement between users and/or companies, and/or collectives. Depending on settings defined for the engagement, the opportunity to participate can become searchable on the system and accessible to the various groups of users or even publicly accessible on the system. Privacy settings can be used to limit such availability. In various embodiments, once an engagement is started the display can be presented in the sidebar (e.g., right side of screen) and the engagement can be automatically transcribed. In some examples, the transcription is made accessible for later users, and in other embodiments, or alternatively, the transcript can be limited access and summary information on the engagement can be made available. In other examples, privacy settings can be used to limit any access to the engagement during and following its execution.

Figure 25:
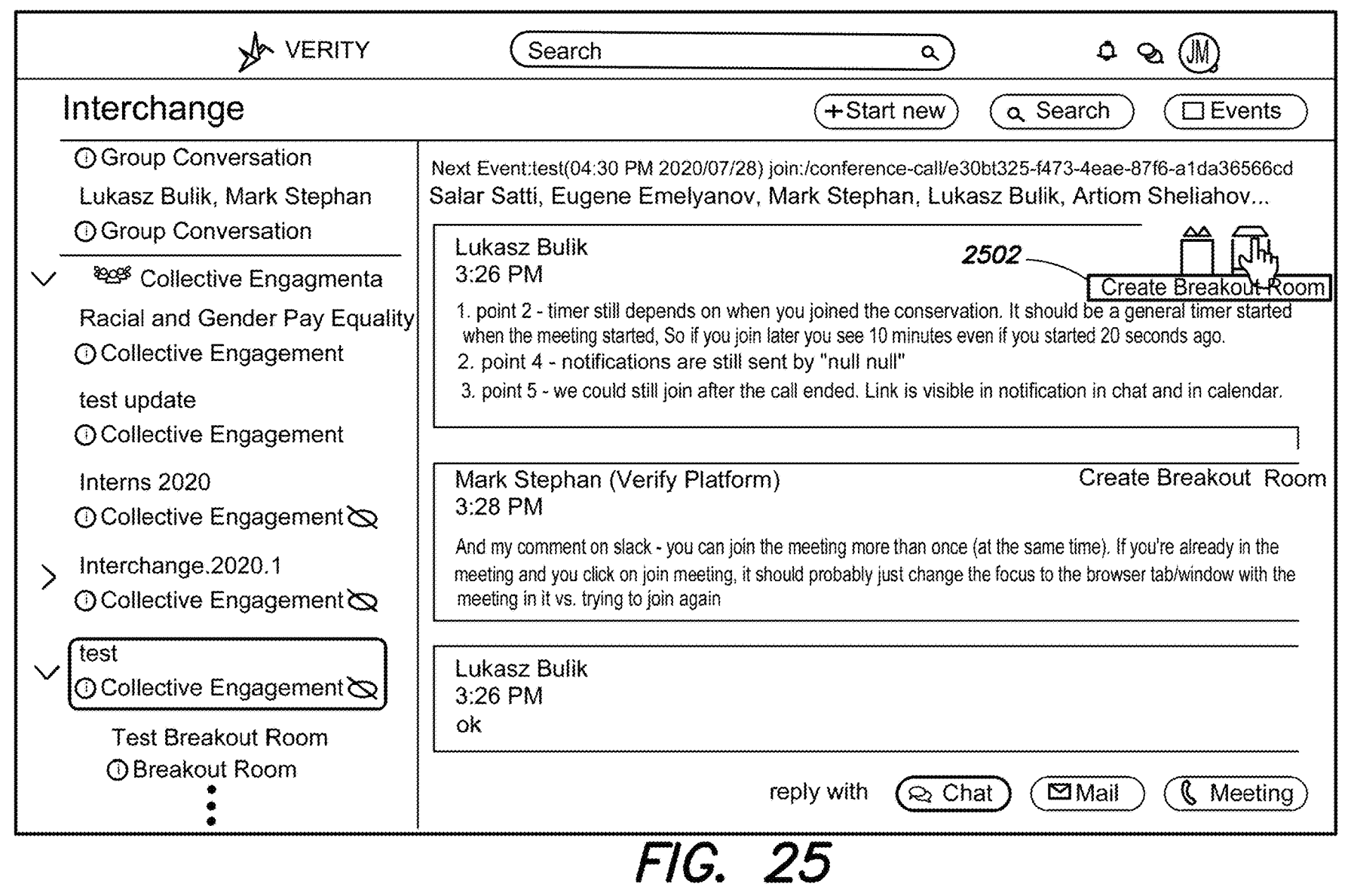
Figure 26:
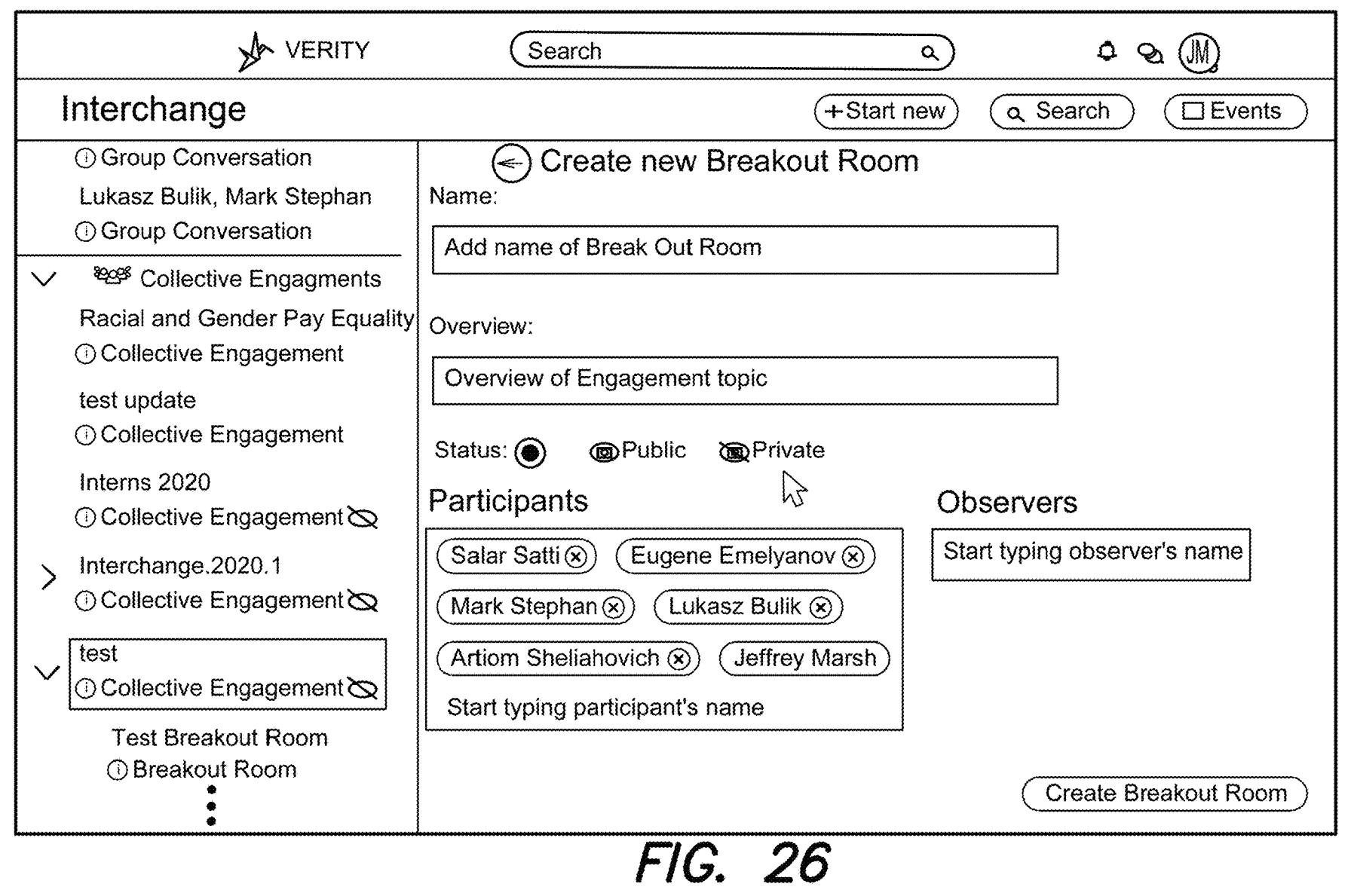

In further embodiments, the information platform can also enable creation and execution of breakout rooms, which can be implemented in the interchange tool and/or an engagement management tool (FIG. 25, 2052 and FIG. 26—example breakout room). According to one example, selection of 2502 triggers the system to create a breakout room within an engagement session. For example, in the breakout session privacy settings can limit participation and data capture functions to allow for private discussions to occur within the engagement as it is executed. In other examples, the breakout room can be made public (e.g., transcription for later access, among other options).

In further embodiments, engagement operations can be scored by the system-based on how transparent their execution is/has been. According to various embodiments, the system is configured to provide information on how engagements are conducted by generating a transparency score (e.g., based on a level of public access (e.g., defined as a percentage of public versus private executions, time spent in public access versus private, among other options)).

FIG. 27 is an example screen capture of a company engagement view, which can include document links (e.g., public, etc.) that are relevant to engagements, collective engagements. In various examples, the company engagement view includes documentation of engagements, actions taking, responses, etc., can be used, for example, to provide evidence that supports public statements and positions for companies regarding various sustainability issues. FIG. 28 illustrates an example screen capture of a governance collection of information.

Various embodiments allow users (e.g., reviewers, researches, company or entity employees/representatives) to participate and find relevant information on the platform. Further embodiments can enable users to set default or interaction levels for interactions with other users. For example, the platform can include and display management screens that are configured to enables users to manage an engagement level for information participation (e.g., communication, notification, etc.). In further embodiments, a user can maintain their own notebook or collection of data on the platform, which permits the user to keep comments and thoughts on entities, engagements, and/or other users that are private to the creating user. In certain further embodiments, such users can make their respective notebook and/or collection of data available for purchase and/or subscription to other users. For example, if the user has a note in any of their Notebooks that contains elements/objects/references to the page they are currently on, a "sticky note icon" atop the screen will light up in a blue color. Clicking the icon will present the user with a list of those notes. If the user does not have any relevant notes, the "sticky note" icon may light up green to indicate there are notes for sale in the marketplace that are relevant to the content the user is viewing. According to various embodiments, the platform is configured to present the user with context-aware tools/guides to help them better understand the information/material they are interested in as indicated by their current actions.

Figure 29B:
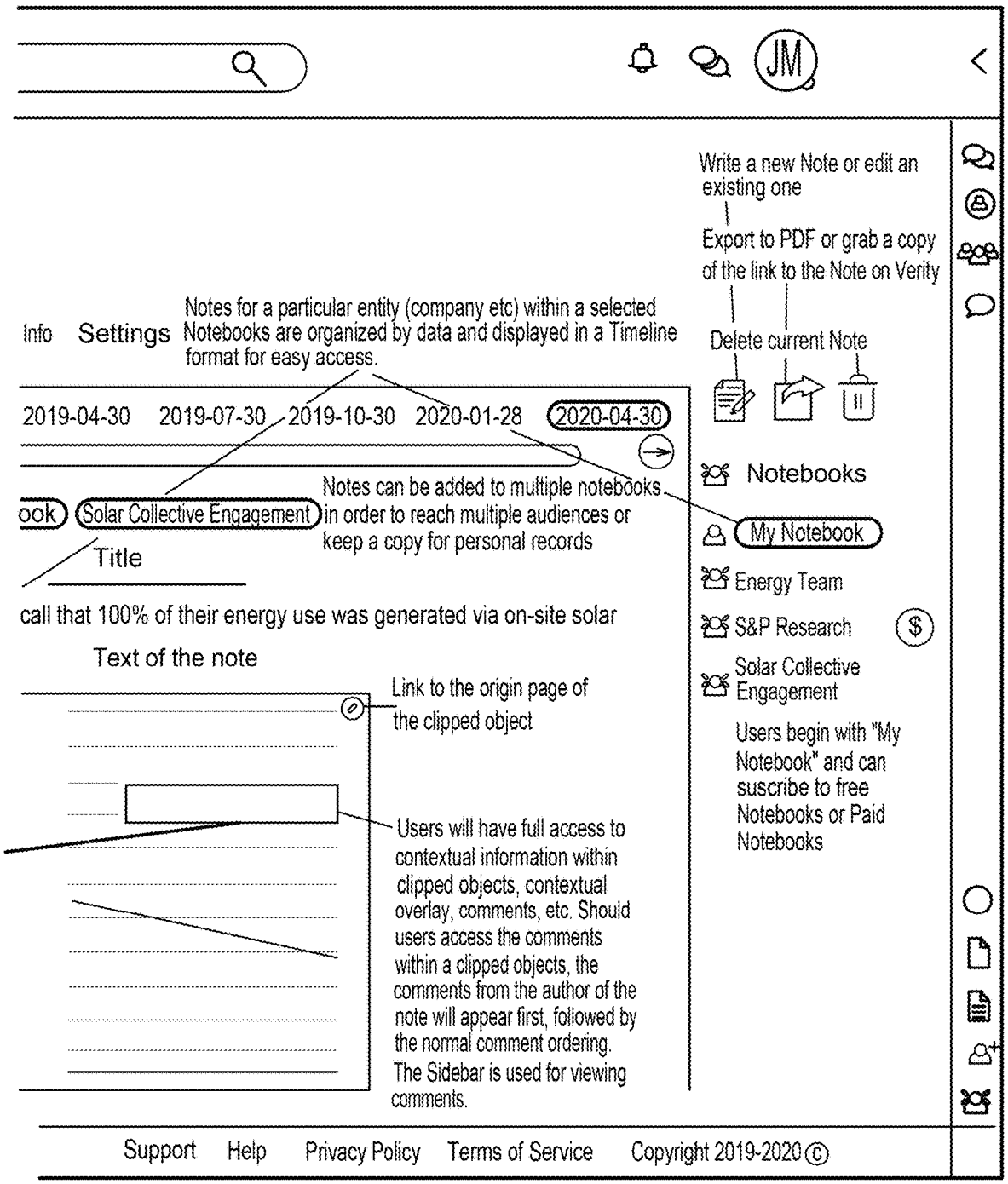
Figure 30:
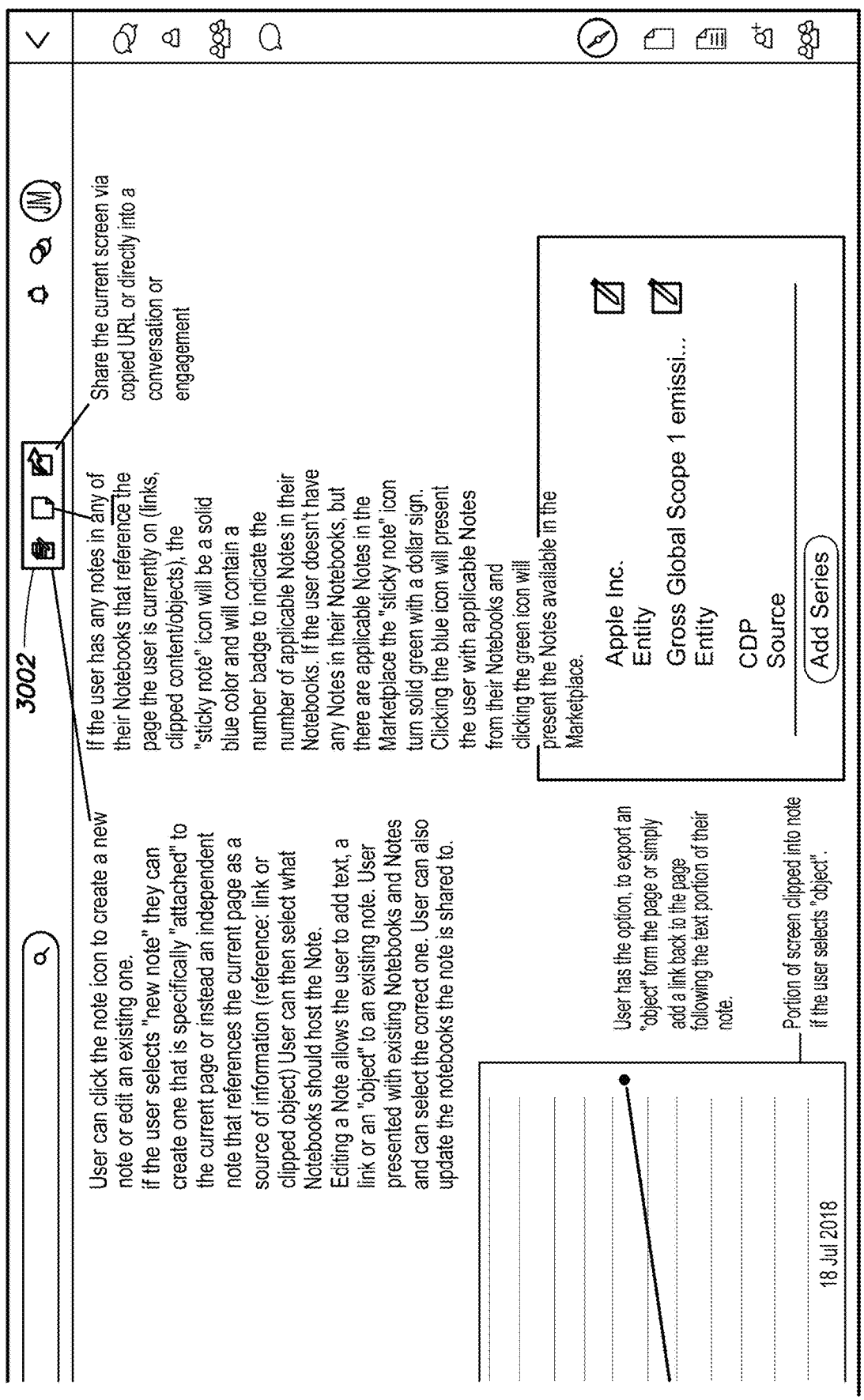
FIG. 30 is a partial screen shot of an example user interface according to one embodiment.

According to some embodiments, the information platform can provide suites of functions to facilitate understanding and targeting of information. For example, some additional functions for various "Notebooks" shown on the platform are shown in FIGS. 29A and 29B. Other platform embodiments can implement the notebook functionality in different ways having different displays. FIGS. 29A-B are a left side and right side screen capture of a display on an information platform, and include notation of example functions made available on the information platform. For the purposes of illustration, various features of the display and architecture of a unique notebook object available on the system are shown and described by indicators (e.g., lines) and descriptive text (e.g., text description). The functional description is included to show optional features that can each be used separately, combined with the other features in various combinations, and for example, combined as illustrated in FIG. 29A-B. Some embodiments can include additional options to provide access to other users' notebooks. For example, the system can provide access to notebooks that are associated with an entity, coalition, and/or theme based on whether they are made public, and manage payment options for paid access notebooks, shown by way of example on FIG. 30. Various features of the display and architecture on the system are shown and described by indicators (e.g., lines) and descriptive text (e.g., text description). At 3002 is a group of notebook icons that when selected provide access to notebook functionality on the information platform.

Figure 31A:
FIGS. 31A-B are a right side and left side capture of a user interface and respective functionality, according to one embodiment.
Figure 31B:
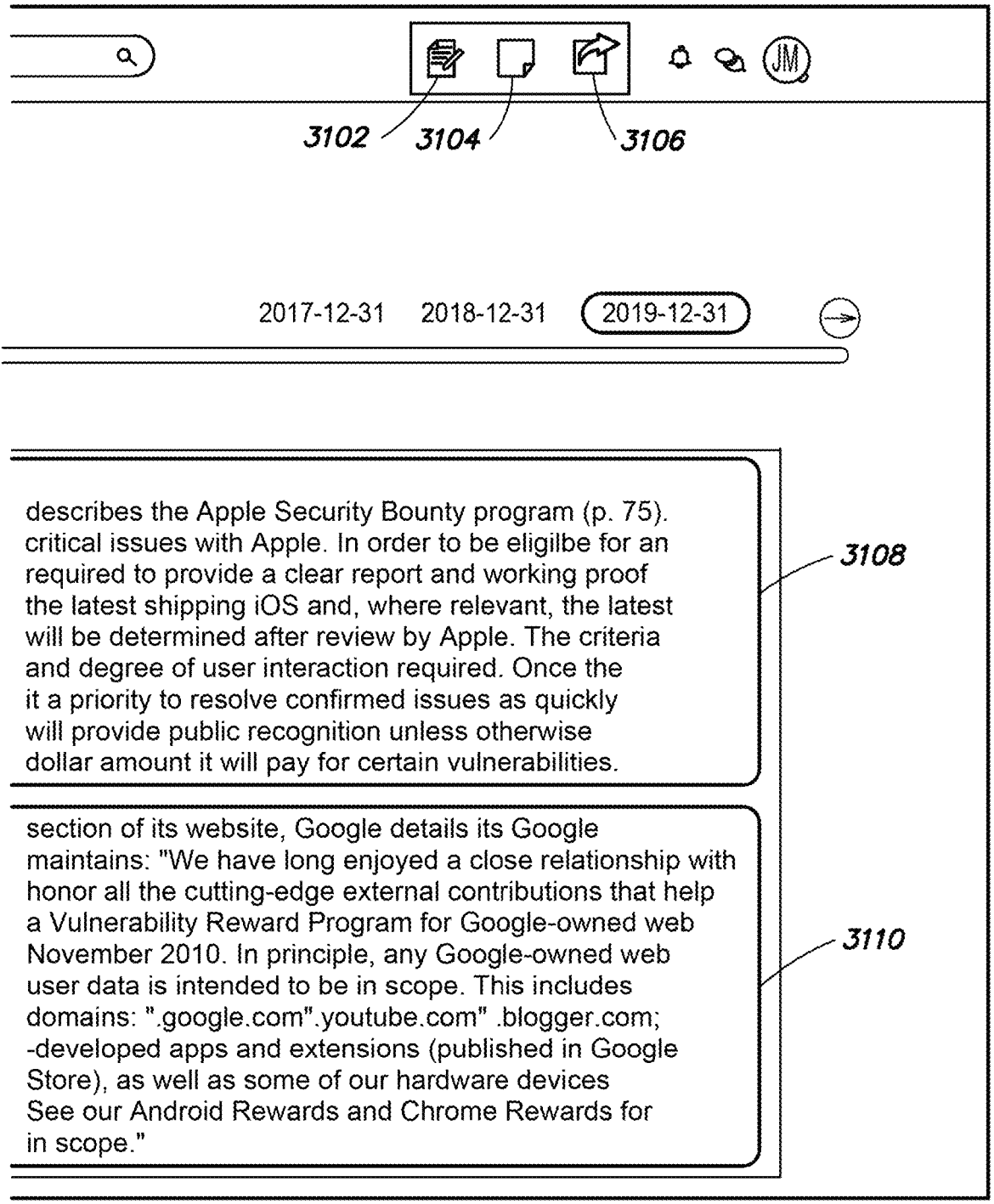

In some embodiments, notebook functionality can be integrated throughout user interfaces presented on the platform. For example, FIG. 31A-B illustrates an example screen shot (left and ride sides of the screen respectively) showing example functions available to users that are enabled on that platform. The example functions include selectable display options to create notes (e.g., 3102), or notebooks, access existing notes or notebooks (e.g., 3104), and/or share information with other users and across the platform (e.g., 3106.). Various features of the display and architecture on the system include options to trigger the information platform to export an object from a displayed page, or add a link to a display on the page following, for example, a text portion of a user generated note (e.g., 3106). At 3108, shown is an example portion of the screen that can be clipped into a note responsive to selection in the user interface.

FIG. 32 illustrates another example of notes/notebook functionality enabled by various embodiments of the information platform. For example, a user can clip portions of any displayed data to incorporate into a note or notebook, among other options. In this example, the transcript generated by the platform can be annotated by user executing "notes" functions. Shown at 3202 is a box around a portion of the transcribed text that the user finds relevant. As discussed here, the highlighting on selection by the current users can also be leveraged by the platform to surface such annotations to other users in similar contexts. In other embodiments, the platform can automatically identify relevant portions of unstructured text and bring the users directly to such portions of a document or other information source.

FIG. 33 is an example capture of an about page for a company or entity, that is configured to provide a snapshot of a given company. In this example, the system is configured to integrate extra-financial information, link engagements, etc., to provide improved access to a variety of data sources associated with a company.

Example Feature Sets According to Various Embodiments

Example embodiments of an information platform can include a variety of functions, management options, and operations to support, for example, finance and sustainability review and analysis. Various implementations can support any one or more, as well as any combination of the following features:

- Collect and leverage information on finance and sustainability, and deliver the information to a community of users that links actionable research into effective collaboration tools and that furthers decision making
- Easily Searchable Financial & Sustainability Information Delivered Within Social Analytical tools to provide both historical and forward-looking insights for improved understanding
- Quantitative, time series tool with comment/contextual overlay feature; community engagement
- Drill down to individual data points, accessing contextual overlay, user comments and news for improved understanding
- Qualitative, document tool with engagement/contextual overlay and rule-based interface; community engagement
- Drill down to individual words/phrases/sentences, highlight them and either add a comment or share them via a unique URL
- Load templates of saved rules to quickly consume a document and uncover key elements
- Ability to compare two documents for key differences
- transcripts can contain audio files and accompanying presentations (where applicable)
- Within a navigation box, users can view the themes or topics associated with a given document and by clicking on the theme jump to the point in the document where that theme/topic is being discussed.
- Key points in the document (as determined by user activity and/or AI modelling) can also be jumped to via the Navigation window.
- Search Example Functions:
  - Within each view, where relevant, the user has quick access to contextual overlay and comments to quickly "surface" key information to help determine whether they wish to "dive" into deeper analysis
  - Contextual Overlay functions available on every data point, document
  - Comments enabled for every data point and document
  - User can subscribe to every data set type, document series or any information relevant to a given entity or theme
  - Example Data View: Financial, Extra-Financial (Sustainability) Data, and Policy & Process According to some embodiments, the information platform can include search organization pages that group financial results, extra-financial results, and process & punchcard results into columns. Upon selection in the user interface of a processes & punchcards result, the user is presented with a company process/mechanism and other self-contained "chunks" of information on the subject matter of the clicked link on individual cards. In some examples, this functionality is referred to as "punchcards." Other embodiments can organize the results in different columns, for example, "financial," "extra-financial," and "discussion, policy & process" columns. Similarly, selection in discussion policy & process column can enable a user to access punchcards describing a searched company or entity (see e.g., FIG. 34, 3402).

Each punchcard captures a logical unit of information associated with a company, company target, and/or theme. Conceptually, punchcards are modelled after punchcard used to program legacy computer systems. In various embodiments, users can review the card for a "nugget" of information on one particular topic (e.g., FIG. 15 on "Estimated Financial Impact of Climate Risk" and in other examples on "Security Vulnerabilities," "Integrating Climate Issues," etc.). In some embodiments, the punchcard view is configured to enable a user to add a company's peers or peer group to compare processes or issues between different companies. In further example, users can also add additional levels so that they see how a particular process/mechanism/issue is handled/managed throughout a company. Users can also add "best practice" punchcards to compare a company's process/mechanism/issue to an established best practice/standard. Users can manipulate and move around the punchcards to design flow charts/supply chains/etc.

In some examples, the system enables users to establish a standard for a "qualitative data point" that merges the contextual detail available in text with the flexibility and capacity for manipulation found in quantitative/numerical/financial analysis. For example, the system provides an interface configured to present at least three types of analysis found in traditional approaches: historical (time line allows the user to see how these processes evolve over time), vs peers (user can access a company's peer group using the Peers button) and vs a benchmark (which can include for example, a "Best Practice" button that triggers the benchmark functionality in some examples), with the updated and augmented functionality discussed herein. In some examples, each card can also contain the "contextual overlay", "comments" and news buttons to provide additional dimensions of analysis and contextual information.

- Example Document View: Publications, Filings, Collective Engagements, Events & Transcripts, News stories and Investor Statements/Letters
- Example Entity View: Company, Organization and Persons, Collective Engagement Records, Thematic Hub
- Example "All" combined view
- Example Screening Implementation(s)
  - Users can be able to screen on all forms of data (Financial, Extra-Financial, Policy & Process ("P&P" delivered via Punchcards) on the platform to generate new ideas and better understand the relative characteristics/performance of companies.

For example, the system enables a screening tool configured with a built-in heat map and/or a bar chart visualizations to segment results. Traditionally screening tools simply show the results for the companies that passed all parameters of a screen, however, often just as important is understanding what companies didn't pass and why. For example, users can easily click on the green box in the heat map and system is configured to show the results with the companies that passed the screen, or a user can click on a yellow box and the system is configured to display what companies missed passing the screen due to one factor/parameter and which factor/parameter it was. Within the results portion of the screen that column can be highlighted.

Contextual Overlay Examples
- Displays contain both an "insider" and "outsider" perspective on a given piece of information in order to provide a more holistic view.
- Insider Perspective is delivered via a curated experience provided by either Verity Platforms or the owner/creator of the information
- Description/Definition/Statement describing the selected piece of information (data point, document, etc.) and categorizing tags, such as themes, UN SDGs or other frameworks
- Additional Quantitative and Qualitative Values to help define the selected piece of information (date of measurement, units, etc.)
- Background information contains contextual information in paragraph/text form to help the user better understand the selected information and project/look forward as to how it may change/evolve
- Audit Trail information; including transparency around how a value is calculated or the source document where it can be found.
- Supplemental Information provides next steps or suggestions of other related data points, documents, entities or collective engagements the user may want to check out to help better understand the topic.
- Contacts provides contact information for the owner/creator of the data so the user can reach out to them for further information
- Outsider Perspective: provided by other users on the platform (not Verity Platforms or the owner/creator of the information) through the form of comments on that item. Often, individuals that are not too close to a topic—or are viewing it with "fresh eyes"—can provide a differentiated opinion or perspective on it.
- Comments sections highlights the top x (e.g., 3) value-add comments (as determined by the community) by users of the platform tied to this piece of information.

Sidebar Implementation Examples
- Persistent presence on screen. Available to inject social elements or provide next-step guidance into user workspace(s), and in some examples, includes at least two components: Engagements and Compass AI
- Ability to minimize Sidebar—and thus all social elements—allows the user to eliminate and potential distractions or noise in the event they need to deeply focus on a given analysis, but quickly expand to reintroduce those social elements when needed.
- Depending on the context, Engagements can display Comments tied to individual data points or document or a User's own engagements: Personal, Collective, Comments or the live comment feed from a meeting/conference call
- For example, the Comment Trail provides users insights on any given data point or document, including links to additional analysis.
  - A user can link to a document or notebook with additional analysis that is for sale in the system marketplace. The ability to tie such analysis to an individual data point provides unprecedented targeted product placement. The analysis is available for sale at the very moment the user has indicated it's of value to them by interacting with the data point.
  - When a user's engagements are displayed it allows for them to quickly interact with any of their ongoing engagements at any time and with any device.
- The Compass AI tool provides guidance of next steps to the user—for example, the AI can provide at least four ways: other relevant data points, other relevant documents, other relevant users or other relevant collective engagements.
  - The Compass AI is configured to include suggestion from subject matter the user is researching and the activity they are participating in at that time. This can include the series of searches, selections or actions in a given research session or the content of an engagement or comment trail.
  - In various embodiments, the Compass AI is initially be trained on numerous years of earnings transcripts, conference transcripts and annual shareholder meetings. In one example, the preceding events tend to highlight the most important issues and drivers for companies/industries uncovered/asked by the best analysts in finance.

Example Engage Button/Widget
- The Engage Button/Widget comes include multiple versions
- When clicked, the Engage Button is configured to transition the user from a $3^{rd}$ party website to the entity's profile and Engagement tab on the Verity platform. This allows the user to review past, present and future collective engagements in which the entity is a participant. If the user is a subscriber, they can request to join a collective engagement as an observer or participant.
- When clicked, the Engage Widget Button is configured to transition the user into visualizing current collective engagements on the $3^{rd}$ party website of the participating organization. The organization may also use the widget to allow users to directly interact with members of the organization or perhaps in a real-time "customer service" capacity. A link within the widget directs the user to the Engagement Tab on organization's profile page on Verity (for a more complete collection their collective engagements, i.e. past and future engagements)

Engagement Tool Examples
- In one embodiment, the engagement tool has at least two components: The Global Community Page and the Personal Engagements Page. The Personal Engagements Page is comprised of a plurality of elements including at least three components: (Personal) 1v1/Group Conversations, (Public) Collective Engagements and (Public) Comments.
- In another embodiment, the engagement tool can be managed via at least two components that comprise: an Engagement Library and Engagement Management Tools. The engagement tool is comprised of a plurality of elements including at least three components: (Personal) 1v1/Group Conversations, (Public) Collective Engagements and (Public) Comments.

Conversations between two individuals or a group of individuals are private and only available to participating persons.

1v1 conversations can be initiated by clicking the "Start New" button.

Collective Engagements are public or private conversations between more than one person.

Collective Engagements can be "hidden" or private/invite only or "Discoverable"/public. Public or "Discoverable" Collective Engagements can be found via Search or within the engagement tab of an entity's profile, in alternative embodiments with the Compass AI tool or within the engagement tab of an entity's profile. Applicable Collective Engagements can also be found in the Engage Widget.

In one example, Collective Engagements can be created either by clicking the "Start New" button or by clicking the "multi-person" icon above the text of any Personal Conversation.

Clicking the "multi-person" icon or "Start New" button to create a Collective Engagement presents the user with a form to complete with the following fields: Name, Overview, Purpose (of Engagement), Participants (that would help make the engagement a success), Relevant Organizations (entities are discussed in engagement), Relevant Themes, Relevant Data, Archive Days (makes the transcript publicly available the entered number of days after the engagement has been closed), Status (Discoverable/Public or Hidden/Private). There's also a section that can show added participant or observers as well as an optional section to show existing participants, which is populated if one is creating a collective engagement as an "extension" of a pre-existing conversation.

The person creating the collective engagement becomes the de facto moderator, responsible for accepting new participants or observers and maintaining the contextual overlay of the engagement.

Other users that have discovered the collective engagement can request to join as a participant (if they believe they can add value to the engagement) or as an observer (if they simply wish to learn from it).

Once Collective Engagements have been closed and have exceeded the number of designed archive days the transcript of the collective engagement becomes public and is available to all on the platform to provide the highest level of transparency, inform users and/or act as the foundation of a future collective engagement on a similar topic.

Collective engagements: past, current and future; have their own unique URL.

Users can create breakout rooms within a collective engagement to better help organize the engagement. Breakout rooms can be public or private.

Following the completion of a collective engagement, a transparency score can be assigned to convey to users how "complete" its transcript is or how much of the engagement occurred in the public eye. Only conversation that happens in a public room can be added to the "public transcript." A "private transcript" can be created and provided to users within the engagement based upon the rooms they had access to Typing @ before a user's name—sends a direct message to them. If that user is not online they receive a notification both on platform and via email Events can easily be exported to a user's personal calendar via the Events interface.

The "Global Community Page" icon sits beside the Personal Engagements icon at the top of the Interchange Engagement tool. Clicking the icon displays a "front page" of sorts for all of Verity. It highlights new and trending engagements, documents (of any variety), data sets, user comments, etc. The page's main sections are listed down the left-hand side of the page (tentatively Featured, Corporate Advocacy, Educational and Public Policy). Users can also filter on any of these sections by: theme, UN SDG (or other frameworks), time (new, dates, closed, etc.), company, sector or region.

The Comments section includes all of the comments a user has left on various data points or documents throughout the platform.

A brief description (name, value, unit, source, date, etc.) of each item commented is presented in the Comments section. Clicking on one description presents the user with the entire Comment Trail for that item.

A user can respond to other comments or add another comment to that item from within the engagement tool.

Additional users can be added by clicking the "Person+" or "Person" icon, clink "Add New Member+" and then either searching for their name or dragging the icon of one of your contacts into the conversation.

Clicking the "Search" button allows the user to search within the conversation/engagement currently displayed.

Clicking the "Events" button allows users to either schedule a new event or review scheduled events applicable to currently viewed conversation/engagement.

Clicking the "briefcase" icon allows the user to load a saved screen/template to an existing conversation/engagement.

Clicking the "paperclip" icon allows the user to attach an external document that is not native to the platform.

Clicking the "@" button allows the user to search for a user participating in the conversation/engagement and then select and address them in the message box.

For a given conversation/engagement the user can communicate via Chat/text, Email, Phone and Video and it is all contained within one "room".

Conventionally collective engagements are clunky, formal processes with extended (~90 days) sign-up periods, often exclusive to various member organizations (PRI, CERES, etc.) and carried out across disparate systems such as email, spreadsheets, phone calls, etc., resulting in missed information. With various embodiments of the engagement tool anyone can create or participate in the engagement, instantly create it and all facets of managing it are housed within one "room" and do so with less operations and in less time than conventional implementation.

Example Entity Views

There can be several different entity views; including: company, stakeholder, coalition, Thematic Hub and investor.

Example Company& Example Engagements

Users can view past, present and future (scheduled) collective engagements that the entity is a participant in. Subscribers can request to join as a participant or an observer and review its contextual overlay or publicly shared documents, such as an investor statement. Non-subscribers can review their contextual overlay to get details on it.

If closed—collective engagement—a full transcript can be available for all users (however any subsequent comments by users that was not part of engagement itself—visible to subscribers in the same way they are for any other document).

Engagements tab provides evidence of fiduciary duty, shareholder engagement or evidence of impact to donor organizations (depending on the entity type).

Example Cohort Analysis

Review what data/documents/information is being utilized by what kind of user: Company Employees, Investors or Stakeholders. Drill down for more specific information: type of company, buy side vs sell side investors, type of stakeholder organization, etc.

This information gives entities a better sense of the kind of output they should focus on (a very common question) and also prepare them for future engagements with these counterparties (i.e. a company walking into a meeting with a buy side investor can be better prepared for such an interaction)

Example Feed Functions

Captures all information either shared by an entity or all information in which that entity has been tagged. Users can filter down by the type of information or using rules to uncover precise data points/document (e.g., Date >2019 Jan. 24, Number=200)

Standards

Includes sustainability frameworks such SASB, GRI, UN SDGs, TCFD

Verity maps data shared to our platform to those Standards for every company so users can more easily utilize it in their analysis and make apples to apples comparisons between companies Example Governance Features System creates a comprehensive profile/record of an entity's corporate governance Data is presented in a timeline fashion so the user can observe the changes in time Ex. If the Board recommends against a given ballot item, analysts wish to know which of those board members are still present in another time period to better forecast company actions.

Initial example categories include: management, board, remuneration, proxy/ballot items, top shareholders and governance documents The remuneration page is broken down into the different types of compensation received by a member of a company's management team (i.e. cash, equity, etc.).

Data Examples

Data is broken down by financial, extra-financial data, policy and process. When clicking on the financial tab users can view the "financials" of a company with data displayed via a simple income statement, balance sheet and cash flow statement.

Example Investor Functionality

Engagement Linking (as described above)

Data Example

If the investor chooses to share any data (e.g., earnings estimates, etc.)

Governance Example

Similar to the company Governance page, can provide less emphasis on remuneration.

About Example

A unique element to an Investor About page is the focus on their Investment Philosophy & Methodology, any Coalitions they are members of, a Featured Publication and any active engagements. System contains a Feed to display their most recently shared work.

Stakeholder Example

Engagements (see description above)

Data Example

In a vast majority of cases stakeholder data contains extra-financial and policy & process data Governance Example Similar to the company Governance page, however, can have less emphasis on remuneration Standards Example Standards in the stakeholder context highlights the themes that are most applicable to their work About Example The unique elements to a Stakeholder About page is the focus on the Stakeholder Programs, any Coalition they manage, Themes found in their work (used to map to Thematic Hubs), a Featured Publication and any active engagements. It also contains a Feed to display their most recently shared work.

Thematic Hubs Example

Thematic Hubs can be configured to gather data, documents, engagements, organizations, coalitions and persons related to the given theme.

Engagements (see description in Company above)

Data Example

Thematic data can contain extra-financial and policy & process data related to that theme Standards Example Standards in the thematic context highlight the disclosure topics that fall under the applicable theme Coalitions Example The page contains a list of coalitions that our AI tool has determined create content related to this theme About Example The unique elements to a Thematic Hub About page is the featured extra-financial data point (broken down by sector averages), Featured Publications, most relevant stakeholder organizations as determined by traffic/endorsements and any active engagements.

Coalitions Example

Engagements link (see above)

Data Example

Data can contain extra-financial and process & policy data related to the issues the coalition is focused upon Members Example The page contains a list of members of this coalition Commitments Example The page contains a list of commitments that members of the coalition agree to.

Governance Example

Similar to the company Governance page, however with emphasis on remuneration

About Example

A unique element to a Coalition About page is the summary of commitments, Themes related to the work of the Coalition (as determined by our AI tool and for use in mapping to the appropriate Thematic Hub), Featured Publications and any active engagements.

User Profile Example Functions

Subscription Examples

Allows the user to closely track information tied to a given entity, theme or data set. Any time an item is shared tied to one of those subscriptions it is automatically pushed to the user's Subscription Feed.

Users can also subscribe to other external, feeds such as RSS, an Organization's email listserv (i.e. Goldman Sachs Renewables) or Social Feeds so they have all their "daily research" in one place Proactive multi-channel tool for pulling information feeds For example, within a user's profile they can access their Notebook which contains personal notes they have left about various profiles. Users can be able to easily do this by accessing a "note" button that is omnipresent on every entity profile on the site. In later iterations the user can be able to share these notes with other users.

Notebook Functionality Examples

Notebooks can be accessed via a tab within a User's Profile page. In some embodiments, the notebook functionality is configured to together and integrated various features of the information platform.

Users can begin with "My Notebook" which collects Notes that the User has authored. Notes can be individual page Notes, i.e. notes specifically regarding a single page on the platform (likely for personal use or reference), such as a Company or Stakeholder Profile page. Notes can also be independent of any one page and be on any number of topics, such as research on a company, issue or something else entirely. These Notes can clip/grab elements/objects (charts, text, punchcards, etc.) from any page on the platform and insert it into the Note as an interactive exhibit/example/object. Readers of the note won't be able to change the underlying data within the exhibit, however, they will be able to access any relevant contextual overlays or comments. If the author of the Note has left a comment on any of the clipped elements/objects, there comments will appear first. These interactive exhibits will provide unprecedented levels of contextual information within research Notes.

In some embodiments, Notes are automatically organized by entity (and can be grouped by the SASB or equivalent framework) and formatted as a "formal" research note, however users can easily click and arrow to move it back to a single screen if it's simply for scratch/scraps or personal consumption. If it is more formal users can also export the notes they have authored to PDF format; however the benefits of interactive exhibits are only present when the Note is viewed on Verity. Notes written and exported from Verity will contain the Verity Hummingbird logo and a short tagline.

Users can add a Note to any number of Notebooks that they are Owners or Shared Owners of. Notebooks can be owned by: individuals, groups of individuals, companies/organizations, collective engagements, or any other combinations of multiple users. Notebooks can be free or paid (subscription).

Three Notebooks related buttons can be omnipresent along the top of the screen.

The "notepad icon" allows users to write a new note or edit an existing one. New Notes can be specifically attached to the page the user is currently on or can independent of the page and pull in objects/elements from the page. If they choose to Edit a Note, the User will be presented with Notes they've authored and contain elements/references to the current page they are on.

If the user has a Note in any of their Notebooks that contains elements/objects/references to the page they are currently on, "sticky note icon" will light up in a blue color. Clicking the icon will present the user with a list of those notes. If the user does not have any relevant notes, the "sticky note" icon may light up green to indicate there are notes for sale in the marketplace that are relevant to the content the user is viewing. The system is configured to present the user with another context-aware tool/guide to help them better understand the information/material they are interested in as indicated by their current actions.

The "sharing icon" allows the user to share the current screen via URL directly into a conversation, engagement or externally.

Within their user profile users can access their "engagement level" and "auto-reply" message to they can set expectations for how engaged they can be on the platform and reply to users even when they are unavailable.

Example Marketplace Functionality

Users can sell one-off or subscriptions to research publications, notebooks, videos, consultations, engagements services, research services or tools.

Users can link their publications/videos to individual data points, other documents, entities/companies and collective engagements.

Users can find the publication in a comment on a given data point or document, on the author's profile, as a suggestion on a contextual overlay, as a suggestion within the Compass AI tool or using a search engine.

System configured to take a transaction fee of either $1 or 7.5% of the price, whatever is higher (fee structure has not been finalized).

Users can spend money from their wallet to invest in (generally sustainability-themed 3rd party) projects Example Consultation Tool Functions Users may want to arrange a 1v1 consultation with another user/organization on the platform to gain a better understanding on a given issue and can use our tools to arrange such an engagement.

Users can set their own rates on a per time period basis (e.g., 15 minute basis) or structure an ongoing "retainer-like" relationship through a subscription.

System can take a 7.5% cut from the final total price of the consultation (fee structure not finalized).

Users are likely to discover possible consultant via the supplemental section of the contextual overlay, as a suggestion from the Compass AI tool or using a search engine.

Users can leave comments on individual organizations that only they can see when they visit another entity's profile page. These notes can be consolidated within their own Notebook Wallet Example A user's wallet contains their (endorsement) tokens, money from tips and any money the user may have deposited to it.

Initially the wallet is configured to hold USD and platform tokens, eventually it can be able to hold other fiat and crypto currencies Ungrouped Functionality Example All text inputs on any engagement vehicle includes auditing/versioning to ensure complete transparency and to prevent nefarious use of the platform.

System Search tool may not customize results to users based on prior search activity. For example, the system is configured to deliver the single best result to satisfy a given query and in some embodiments does so absent user bias (e.g., to minimize the echo chamber effects plaguing much of the internet). The Compass AI tool however, can take prior user history into account as it seeks to cater results that compliments the user's unique approach to research, but perhaps something they would not have uncovered on their own.

The inventors have realized that the current approach to search is unique and superior to existing implementations. Search in its current iteration simply delivers results to the user, the results can be clicked on and the user follows the link to a different website. Each website that is visited has its own formatting structure with information organized in its own way and requires the user to quickly orient and familiarize themselves in order to obtain the information they seek. On various embodiments of the information platform, before clicking on a result the user can click on the contextual overlay or comments to received critical contextual information from domain experts and then can choose to click on the result. The system delivers information and experience to the user such that a person is far more likely to understand information presented to them—and at a faster rate—as they already know the context for the information. Further, since system results are delivered in the same format based upon information type the user spends less time orienting themselves.

Example Platform Enhancements

According to various embodiments, the information platform can improve access to data over conventional approaches. In one embodiment, users can subscribe to data feeds that are configured to capture and present information either shared by an entity or information in which that entity has been tagged. In further embodiments, users on the platform can subscribe to feeds on entities, other users, and/or engagements. In other embodiments, the platform is configured to allow users to filter feed information by the type of information or use rules to uncover precise data points/documents (e.g., Date >2019 Jan. 24, Number=200).

In other embodiments, the information platform can be configured to associate information on various entities and/or engagements to known standards for evaluating a company. The various standards that can be used include sustainability frameworks such as those developed by SASB (the Sustainability Accounting Standards Board), GRI (the Global Reporting Initiative), UN SDGs (the United Nations Sustainable Development Goals), TCFD (the Task Force on Climate-related Financial Disclosures), among other options (e.g., GIIN's IRIS+framework: Global Impact Investing Network's Impact Reporting and Investment Standards).

In some embodiments, the information platform is configured to map data shared on the platform to the standards, and can include any standards based analysis for any company analyzed on the platform. The standards analysis can be presented by default and/or selected for display in the user interface. The standard's analysis can provide a consistent benchmark for users to better understand how companies rate relative to a given standard. In still other embodiments, the platform is configured to capture include engagement information into the standards analysis yield improved insights over conventional systems. In one example, evaluations against a standard metric provides users with "apples to apples" comparisons between companies.

According to one aspect, quantifying governance issues has long plagued investment analysis and reporting. Various embodiments of the information platform resolve at least some of such issues. According to one embodiment, the information platform generates a comprehensive profile of an entity's corporate governance. For example, the system can generate a profile on board members or other officers of the company. The information platform is configured to build a profile from captured public information, engagements, community developed information that maintains public statements associated with ESG goals, voting patterns (e.g., deviations from stated company ESG objectives, compliance, etc.), incentive announcements, strategy directives, investment calls/announcements. In further embodiments, the track record of such officers can be maintained as they transition between companies, and their prior voting record and/or any history can be used to evaluate a confidence in their ESG commitments at a new company, among other options.

In some embodiments, the information platform can generate and display any one or more of a governance profile, timeline data of governance data, governance decision timeline, common members of decision making body, etc. Various governance data items can be tracked and displayed on the platform and include any one or more of the following: management identity, board identity, profiles for each, remuneration, proxy/ballot items, top shareholders or governance documents.

In addition to subscribing to feed data (e.g., on entities, users, engagements, etc.), users can incorporate data streams external to the information platform. For example, users can also subscribe to RSS feeds, an organization's email listserv (e.g., Goldman Sachs Renewables) or Social Feeds so they have all their "daily research" in one place. In various embodiments, these information sources can also be analyzed by the information platform, shared in engagements, and/or commented on by users of the platform. Various embodiments enable multi-channel tools for pulling information feeds.

In some embodiments, the information platform is configured to host an information marketplace. In the information marketplace, users can offer subscriptions to their analysis, research publications, videos, tools, notebooks, etc. The offers can be for a set time, one-time, etc., According to one embodiment, platform users can search for user content (e.g., a publication), or may find the information in a comment on a given data point or document, further user content can be accessible on the author's profile, and may be provided as a suggestion on a contextual overlay. In some examples, user content can be surfaced as a suggestion within the Compass AI tool or using the platform's search engine.

User accounts may be associated with wallets, and any balance can be used in the marketplace to request or pay for user content. In further embodiments, users can link payment accounts or access payment gateways to provide for purchasing user content.

Additional options for leveraging other users' knowledge are also made available in various platform embodiments. For example, information platform can manage consultations between users, and facilitate one on one or one to group information exchanges that require payment. In various embodiments, the information platform can provide consultation tools that enables users to arrange one to one consultation with another user or an organization on the platform. Such interaction enables users to gain a better understanding on a given issue. Users can set their own rates based on any time increment or the users can structure an ongoing "retainer-like" relationship through a subscription. The platform enables users to establish one time, retainer, and subscription interactions between users. In various embodiments, the information platform can provide access to consultations and/or experts via presenting contextual overlay information, as a suggestion from the Compass AI tool, or based on results returned from a search operation.

According to some embodiments, each user is associated with a wallet at registration. The user's wallet is configured to account for endorsement tokens, money from tips, and any money the user may have deposited, among other options. The wallet can be configured to hold USD and/or platform tokens, however, other currencies and/or cryptocurrencies can also be used.

Reputation Scoring Embodiments And Examples

According to various aspects, the information platform is designed to ensure that users have an equitable voice and equitable opportunity to amplify their voice in the information exchanges managed by the platform. In various embodiments, the system can invoke a reputation sub-system or component that is configured to adjust user reputation as they participate, contribute, author content, interact with other users, among some examples. According to further embodiments, the information platform is configured to define a reputation currency in the form of endorsement tokens, and the endorsement tokens can be used to develop reputation scores for users.

Broadly stated, users attain the highest reputation scores based on contributing the highest value to the information platform. Determining value added to the platform can be based on analyzing the utility of the user's action, and/or platform activity, which may be reflected by receiving endorsement tokens from other users. In further embodiments, user groups or constituencies of users on the information platform can provide differing levels of contribution to a reputation score. In some embodiments, endorsement tokens from one group of users can be valued higher relative to other user groups. In some aspects, a goal for the reputation system and any associated score it provides can be a feedback mechanism from the user constituencies to encourage users to think more holistically and give greater consideration to their engagements.

Various scoring implementations are configured to capture a user's commitment to engagement, quality of that engagement, and the engagement's impact within the marketplace. According to some embodiments, individual user scores can also be used to develop institutional scores or company scores that are based on respective users within the company. For example, the platform can combine scores of users associated with a company to yield an aggregate company reputation scores. In various embodiments, the company reputation score can provide an indicator of a company's commitment to engagement. The degree of commitment can be used to evaluate the company, its position on ESG, and whether the commitment is valid.

According to various embodiments, the platform can evaluate user actions based on type, and various action types can impact reputation scoring differently. For example, a type of engagement a user enters into has different benefits—a more intimate collective engagement or consultation is more likely to result in an endorsement as there will be closer collaboration, however comments and documents are more likely to be seen by more people and thus there's more potential for the absolute number of endorsements. Thus, the value of an endorsement in each setting and type of action can be adjusted on the information platform.

In some embodiments, information on how reputation scores are calculated can be made available on the platform, in others general information on reputation scoring is provides, and in yet others scoring approaches are not disclosed. How reputation is calculated should be simple, transparent and understood so that the community can benefit and utilize it as a tool.

Scoring Implementation Examples

According to various embodiments, the platform can be configured to not display the number of endorsements or tips a comment or document has received to limit influencing other users into thinking of its perceived value. While result displays can be ordered in various examples and order will imply importance (e.g., and reflect if an item has received an endorsement or tip), actual counts of endorsements and/or tips can be excluded from the display. In further examples, information items (e.g., data points, comments, documents, etc.) can be highlighted in the display to show that they have been endorsed or tipped.

In various embodiments, the scoring algorithm is configured to account for user input, and capture endorsements or tips and/or other user behavior on the platform. According to some aspects, the information platform is designed to provide a sense of value or that there is something at stake to match the fact that decisions derived from information on the platform will very much have something at stake. In various embodiments, the platform is configured to provide such valuation based on creating a limited supply of endorsement tokens, this may also include assigning a real monetary value to them.

According to some embodiments, the platform is configured to keep the real value assigned to endorsement and/or tips low (~$0.25), which enables users to participate and prevents any potential users from being priced out of the endorsement and/or tipping activity. Further, various embodiments are configured to make endorsements and/or tips as simple as possible—e.g., a single click should execute an endorsement when viewing an information item.

Various embodiments of the scoring algorithm can leverage the values and desires of the user population to incentivize value add behavior. For example, users of the information platform desire any one or more of the following: easily verified quality data/research; easily verified quality contact/source; professional environment; large volumes of research; large volumes of persons/sources to connect; and/or establish identity/expertise. These values can be reflected in example endorsement and/or tipping approaches. In addition to platform user values, various embodiments of the scoring algorithm also incorporate the value and desires of the platform operator, which can include any one or more of the following: service user; enroll a large volume of quality users; provide a large volume of quality research; and incentivize large volumes of quality comments; and/or preventing manipulation or coordinated attacks on reputation score (e.g., artificially inflate or decrease reputation scores).

Example Scoring Vehicles

Various embodiments define and use endorsement tokens and/or tips from users to adjust a user's reputations scores. According to one embodiment, endorsement tokens are assigned a monetary value (e.g., $0.25). In some embodiments, endorsement tokens have value but cannot, initially, be redeemed.

In some examples, receipt of an endorsement token contributes a point value (e.g., add 1, 2, 3, 4, etc.) to the user's reputation score, the user's reputation score can affect item visibility in the user interface (e.g., in a comments display, marketplace document display, and/or search results ordering). In further embodiments, point values for each action can also be adjusted based on reputation tiers assigned and/or earned by respective users (reputation tiers are described in greater detail below).

In some embodiments, the platform is configured to limit some scoring to a threshold number of time per time period. For example, the platform may enforce limits so that users cannot endorse an organization more than once per quarter. In further embodiments, the platform is configured to enable users to remove or switch an endorsement to a new information item. In various settings, endorsements do not decay (e.g., lose value) as it pertains to reputation or visibility. In other implementations, time thresholds or decay rates may be applied.

According to some embodiments, the platform can implement a profit sharing plan. For example, the profit sharing plan is meant to compensate content creators for the value contributed to the platform. The system can analyze a number of interactions on content created or shared by an organization (e.g., engagements, etc.) compared to the total number of interactions that occur on the platform in a given quarter and then apply that percentage to the portion of profits that the platform determines in appropriate to distribute to the content creators. In various embodiments, the platform enables content creators to accept their portion as cash or instead apply towards an in-kind service from an organization on the information platform.

According to various embodiments, users may endorse any information item on the platforms. Users may also be given the opportunity to tip another user on the system. Tips are generated separately from endorsement tokens, and are debited from a user wallet and/or account. Similar to endorsement tokens, tips can be assigned monetary value (e.g., $0.25) and their monetary value can be used on the platform (e.g., in the marketplace, for pay subscriptions, etc.). In various embodiments, tips value can be used and applied to a user account, however, the platform can prevent use of the value for further tips. In response to receiving a tip, a display score adjustment is applied (e.g., +1 point, +2 points, etc.). The increased score can affect display ordered for any information item linked to the score. For example, the reputation scores can affect display order of user comments, marketplace documents, and search results.

According to some embodiments, tips differ from endorsement scores as the score adjustment for a tip can be applied to a display score (e.g., affect display ordering) but not applied to an underlying reputation score for a tipped user. In various embodiments, tips do not contribute to a user reputation score, however, the tip increases visibility & capacity for endorsement of information items subject to the tip. In further embodiments, the effect of the tip action on display order is configured to decay (e.g., reduce over time). In one example, a tip effect is set to decay after a one year period (e.g., as it pertains to visibility). The decay rate can be set to any amount, and in one example, is set at 0.25 points per 365 days.

Example Calculation of Reputation Scores

Various embodiments implement a trailing twelve month reputation score defined on a scale of 1-10, wherein the score is combined from four components: endorsements from companies; endorsements from investors; endorsements from stakeholders' and score of user activity.

Example Scoring Category: Endorsements from Companies:

According to some examples, reputation scores can include a plurality of components. For example, a reputation score can include a scoring category associated with companies participating on the platform. In one approach scoring can include a category associated with company endorsements that can be executed by the platform. In another embodiment, company endorsement scores can be further broken down by quality and reach scores. Quality score accounts for the number of engagements a company enters into and may be based on the following algorithm:

(Endorsement Tokens from Companies/Engagements Entered Into)*1.5=Quality Score (e.g., capped at 1.5)

In another embodiment, a reach score can account for a number of endorsement tokens awarded by a company and may be based on the following algorithm:

Number of Company Users Awarding Tokens/Endorsement Tokens Awarded=Reach Score (e.g., capped at 1)

Various combinations of quality and reach can be used. One example include the following algorithm:

Quality Score+Reach Score=Companies Reputation Sub-Score (e.g., capped at 2.5).

Example Scoring Category: Endorsements from Investors:

In some embodiments, a reputation score can include a scoring category associated with investors participating on the platform. In one approach, scoring can include a category associated with investor endorsements that can be executed by the platform. In another embodiment, investor endorsement scores can be further broken down by quality and reach scores. Quality score accounts for the number of engagements an investor enters into and may be based on the following algorithm:

(Endorsement Tokens from Investors/Engagements Entered Into)*1.5=Quality Score (e.g., capped at 1.5).

In another embodiment, a reach score can account for a number of endorsement tokens awarded by an investor and may be based on the following algorithm:

Number of Investor Users Awarding Tokens/Endorsement Tokens Awarded=Reach Score (e.g., capped at 1).

Various combinations of quality and reach can be used. One example includes the following algorithm:

Quality Score+Reach Score=Investors Reputation Sub-Score (e.g., capped at 2.5).

Example Scoring Category: Endorsements from Stakeholders:

In some embodiments, a reputation score can include a scoring category associated with stakeholders participating on the platform. In one approach, scoring can include a category associated with stakeholder endorsements that can be executed by the platform. In another embodiment, stakeholder endorsement scores can be further broken down by quality and reach scores. Quality score accounts for the number of engagements an investor enters into and may be based on the following algorithm:

(Endorsement Tokens from Stakeholders/Engagements Entered Into)*1.5=Quality Score (e.g., capped at 1.5)

In another embodiment, a reach score can account for a number of endorsement tokens awarded by a stakeholder and may be based on the following algorithm:

Number of Stakeholder Users Awarding Tokens/Endorsement Tokens Awarded=Reach Score (e.g., capped at 1).

Various combinations of quality and reach can be used. One example include the following algorithm:

Quality Score+Reach Score=Stakeholder Reputation Sub-Score (e.g., capped at 2.5).

Example Scoring Category: Activity

Example approaches for scoring activity include any one or more of the following rules:
- each flagged item is worth 1 activity point, decays 0.25 points every 90 days
- Each incorrectly flagged item deducts 1 activity point, decays 0.25 points every 90 days
- Each Engagement entered into is worth 0.25 activity points, decays to 0 after 90 days.
- Each Publication is worth 1 activity point, decays 0.25 points every 90 days
- Linking LinkedIn profile to the information platform profile is worth 1 activity point
- Doesn't decay if remained linked
- Each Endorsement provided is worth 0.125 points, decays after 30 days
- Score capped at 2.5.

According to some embodiments, the system can implement a cumulative reputation score. For example, endorsements can be determined as above with a twelve month trailing reputation score, and with an activity score that is calculated by using the average activity score across the days a user has been active on the platform.

In further embodiments, users can obtain different reputation tiers based on their reputation score. Example tiers and rules include any one or more of the following:
- User reputation tiers: 0-2.5: Base User, 2.6-5: Bronze User, 5.1-7.5: Silver User, Moderator ×2, 7.6-10: Gold User, Moderator ×3.

According to some embodiments, Moderator ×2 and Moderator ×3 reflect a user's potential influence in identifying quality on the platform is 2 or 3 times greater (their voice amplified) than a Base or a Bronze level user. In some examples, the platform is configured to assignment a value to moderator endorsement tokens that reflect the multiplier (e.g., are worth 2 and 3 points respectively). In some examples, endorsement tokens retain their monetary value regardless of user type. Moderators can also be allowed to purchase additional tips per week to distribute (e.g., 2× and 3× respectively). In further embodiments, moderator ×3/gold users can be enabled to help moderate collective engagements on the platform.

Example User Tier And Example Permissions
- Base users can access primary research tools: Search, Quantitative, Qualitative and Engagements, and endorsement tokens are displayed in black and are worth 1 point to base users
- Bronze users can be granted access to listing items in the marketplace and can participate as consultants, and endorsements tokens are displayed bronze and are worth 1 point
    - Additional rules for bronze users can include one or more of the following:
        - allowed to purchase 4 tips per week for $2; hold up to 20 at a time
        - Awarded 5 one-time coupons for a free month of service, one for own use and 4 to be shared
- Silver Users can have at least the preceding rights/access and be awarded moderator ×2 level, allowed to purchase 8 tips per week for the same $3 cost; hold up to 40 endorsement tokens which are displayed silver and worth 2 points; awarded 5 one-time coupons for a free month of service, one for own use and 4 to be shared
- Gold users can have at least the preceding rights/access and can be awarded Moderator ×3 level, allowed to purchase 12 tips per week for $3; hold up to 60 endorsement tokens which are worth 3 points, awarded 5 one-time coupons for a free month of service, one for own use and 4 to be shared, option to act as an additional moderator within collective engagements to help enhance the user experience.

Additional Scoring Options

One or more of the following rules can be applied for endorsement tokens, according to some embodiments:
- All users receive a baseline amount of tokens (e.g., 1) per timeframe (e.g., week)
- Users can remove endorsement tokens or switch endorsements from one item to another
- Users cannot endorse the same user more than once per quarter
- Users can only hold a limited number (e.g., 3, 4, 5, 6, etc.) Endorsement Tokens at a time. If one is added over the limit (e.g., $6^{th}$), the system is configured to bump the oldest one out. Such embodiments are incentivized to use them and prevent sudden bulk use.
- Endorsement Tokens are dated with a start date (e.g., the Monday each week).
- Endorsements provided during a collective engagement remain hidden until the engagement has ended. The user can see they have received one, but the source will be hidden to prevent the feeling of obligated reciprocation.
- Endorsement tokens are worth 1 point for Base and Bronze users, 2 points for Silver users and 3 Points for Gold users as it pertains to calculating user reputation and the visibility of an item, however they are always worth $0.25.

One or more of the following rules can be applied for tipping/promoting, according to some embodiments:
- Users cannot ever tip the same item twice
- Users can hold a limited number of tips at a time (depending on user's tier), but only buy a week's worth at a time. Tips do not disappear if they are not used, but again there is a limit on how many can be held.
- Similar to the value of endorsement tokens, tips are worth 1 point for bronze users, 2 points for silver users and 3 points for gold users as it pertains to calculating the visibility of an item.

One or more of the following rules can be applied for reputation scoring, according to some embodiments:
- Reputation score do not get "turned on" until a user participates in their first engagement or publishes a document.
- Reputation score is not visible to others until the user has entered into 5 engagements or published one document.
- Quality score component is calculated by the number of endorsements from a given constituency over the number of engagements.
- engagements include a collective engagement, consultation, a comment trail (not measured per comment, but rather adding a comment means you are entering into that engagement) or publishing a document (i.e. user is contributing to the dialog/knowledge in the space). Personal Conversations do not count.

The Reach Score aims to understand how many different users one's research reaches. For example, if the same 5 users endorse your work, it's not necessarily a negative thing, but if your work impacts 20 different people across numerous constituencies it suggests the reach of your work is more significant and valuable to the community. It also provides an additional measure to counter astroturfing or coordinated manipulation of Reputation Scores.

Activity Score can be easily capped out, but decays quickly so users can demonstrate ongoing investment to engagement activity.

Aside from flags for vulgar behavior, it isn't necessary to include down votes for unhelpful information as a lack of endorsement already has a negative impact on a user's score. Down votes (or whatever) may be extra punitive—but can be implemented. Given the platform has the capacity to inform financial decisions it's critical that the best information is identified and earning the highest reputations challenging.

Users flagged for vulgar behavior (that is verified) will have all of their engagements hidden for 90 days and lose all of their value within the activity portion of their reputation score. A $2^{nd}$ flag will see them permanently removed from the platform.

User reputation can determine order/visibility of comments in the absence of any direct endorsement or tipping Users are notified when their reputation score goes live, when they are at risk of falling to a lower tier or close to rising to a higher tier.

If a user gives an endorsement token to another user and later moves up in tiers in so that their endorsement token increases in value, the user that received the token will also benefit from the increased value. For example, there's no reason to believe that the user who has moved up tiers had any better or worse judgement at the time of the original awarding of the token and thus the recipient of the earlier token shouldn't be penalized simply due to timing.

Users must wait at least 120 seconds before posting consecutive comments to mitigate spamming/bots.

Default Ordering Examples

In the absence of any endorsements or tips, the default ranking for an information item is based upon the reputation scores of the users generating the item. When endorsements or tipping is present, ranking can be based upon a simple sum (e.g., discussed above) that takes into account the relative point values of base, bronze, silver and gold users as well point decay.

According to some embodiments, users cannot re-tip money earned from dollars. Users can however, spend it in the marketplace, on consultations or withdraw it from their wallet. In further embodiments, the user's profile should display endorsement tokens, which in some examples can be coded by color, and provide a display similar to a "trophy room." In some embodiments, a user's reputation score can also be displayed in the user profile. In some examples, component scores making up a reputation score can also be visible.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The term "stakeholder entity" as used herein should be understood to refer to any legal person or entity that has an interest in a given company and can either affect or be affected by such company's business and operations, including without limitation such company's investors, employees, customers, suppliers, as well as any directly or indirectly related non-governmental organization and/or community, government or trade association, etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. An information platform, comprising:
at least one processor operatively connected to a memory, the at least one processor configured to:
generate a search display for accessing information associated with a plurality of companies or entities;
accept user input and search an information knowledge base responsive to the user input to output a plurality of data elements;
accept user input to curate one or more of the plurality of data elements output by the search of the information knowledge base to provide curated information;
assign to each of the plurality of data elements, one of a plurality of data types comprising a qualitative data type, a quantitative data type, and an interactive information data type;
generate a plurality of data type displays comprising:
a qualitative data type display consisting of one or more of the plurality of data elements having an assigned qualitative data type;
a quantitative data type display consisting of one or more of the plurality of data elements having an assigned quantitative data type;
an interactive information data type display consisting of one or more of the plurality of data elements having an interactive information data type;
transition between showing on a screen electrically coupled to the processor a first one of the plurality of data type displays and a second one of the plurality of data type displays, the second data type display different than the first data type display and maintain a current search state on one of the data type displays shown on the screen; and
integrate the curated information into the one of the data type displays shown on the screen.

2. The information platform of claim 1, wherein the at least one processor is configured to generate a side bar display for integrating community moderated information into search result displays.

3. The information platform of claim 1, wherein the at least one processor is configured to:
accept user input identifying an information item in the user interface display;
accept user submitted content to associate with the information item; and
create a contextual overlay for any subsequent view of the information item associated with the user content.

4. The information platform of claim 3, wherein the information item includes a data point in a time series display, and the user content includes an explanation for the context of the data point.

5. The information platform of claim 1, wherein the at least one processor is configured to manage an engagement between a user and a respective stakeholder entity and/or representative users of the respective stakeholder entity.

6. The information platform of claim 1, further comprising a plurality of information views for accessing information returned as search results based on a type of information returned.

7. The information platform of claim 1, wherein the at least one processor is configured to adjust a user reputation score responsive to activity on the information platform.

8. The information platform of claim 7, wherein the at least one processor is configured to increase a reputation score responsive to a user generating curated content.

9. The information platform of claim 8, wherein the curated content includes posting a comment associated with a data point in a result display.

10. The information platform of claim 1, further comprising an engagement component configured to manage creation of a communication session between a current user and a stakeholder entity and/or stakeholder entity representative.

11. The information platform of claim 10, wherein the at least one processor is further configured to generate an engagement display configured to accept identification of a company, and/or contact, and one or more users as participants on a communication thread.

12. The information platform of claim 11, wherein the current user can specify an access permission of the communication thread.

13. The information platform of claim 12, wherein responsive to selection of a public access permission, the communication thread, topic, and company are queryable as results on the information platform.

14. The information platform of claim 1, wherein returned results include at least contact information for a company in the returned results.

15. The information platform of claim 1, further comprising an engagement component configured to standardize and manage creation of a communication session between a current user and a stakeholder entity and/or stakeholder entity representative.

16. The information platform of claim 1, further comprising a notebook component configured to collect and display user selected or authored data items.

17. The information platform of claim 16, wherein the notebook component is further configured to provide a navigation option displayed in a community menu for accessing a notebook object related to the page or data in question, or associated with a related entity, collective, and/or theme.

18. The information platform of claim 1, further comprising a punchcard object associated with at least one of an entity, collective, or theme.

19. The information platform of claim 18, wherein the punchcard object is configured to display a summary of information on selected targets based on user input, or artificial intelligent modeling of a topic relevant to or selected by a current user.

20. The information platform of claim 19, wherein the platform further comprises an artificial intelligence (AI) component configured to ingest data objects and extrapolate information targets matching entity governance issues or thematic issues.

21. The information platform of claim 1, wherein the at least one processor is configured to:
define a search workspace based on the current search state; and
display search output not directly responsive to the user's query within the search workspace.

22. The system of claim 21, wherein the at least one processor is configured to:
access and integrate into the search workspace relevant information based on matching the current search state to artificial intelligent ("AI") tags made on information sources stored on the information platform.

23. The system of claim 22, wherein the at least one processor is configured to:
execute AI models on information source documents;
tag unstructured text contained in the information source documents; and store the unstructured text documents and associated AI tags for responding to user searches.

24. A computer implemented method for managing search execution on an information platform, comprising:
- generating, by at least one processor, a search display for accessing information associated with a plurality of companies or entities;
- accepting, by the at least one processor, user input and search an information knowledge base responsive to the user input to output a plurality of data elements;
- accepting, by the at least one processor, user input to curate one or more of the plurality of data elements output by the search of the information knowledge base;
- assigning to each of the plurality of data elements one of a plurality of data types comprising a qualitative data type, a quantitative data type, and an interactive information data type;
- generating a plurality of data type displays comprising:
  - a qualitative data type display consisting of one or more of the plurality of data elements having an assigned qualitative data type;
  - a quantitative data type display consisting of one or more of the plurality of data elements having an assigned quantitative data type;
  - an interactive information data type display consisting of one or more of the plurality of data elements having an interactive information data type;
- transitioning, by the at least one processor, between showing on a screen electrically coupled to the processor a first one of the plurality of data type displays and a second one of the plurality of data type displays, the second data type display different than the first data type display and maintain a current search state on one of the data type displays shown on the screen; and
- integrating, by the at least one processor, the curated information into the one of the data type displays shown on the screen.

25. The information platform as in claim 24 wherein the processor is further configured to:
- accept user selection of a visual object on the one of the data type displays shown on the screen; and
- trigger the transition from the first one of the plurality of data type displays to the second one of the plurality of data type displays in response to selection of the visual object.

26. The computer implemented method as in claim 24 further comprising:
- accepting, at the at least one processor, user selection of a visual object on the one of the data type displays shown on the screen; and
- triggering the transition from the first one of the plurality of data type displays to the second one of the plurality of data type displays in response to selection of the visual object.

\* \* \* \* \*